US012415714B2

(12) United States Patent
DiCarlo

(10) Patent No.: US 12,415,714 B2
(45) Date of Patent: Sep. 16, 2025

(54) MULTI-CONTAINER FILLING MACHINE TECHNOLOGIES

(71) Applicant: ABC FILLERS, INC., Ipswich, MA (US)

(72) Inventor: Joseph A. DiCarlo, Chester, NH (US)

(73) Assignee: ABC FILLERS, INC., Ipswich, MA (US)

( * ) Notice: Subject to any disclaimer, the term of this patent is extended or adjusted under 35 U.S.C. 154(b) by 62 days.

(21) Appl. No.: 18/437,433

(22) Filed: Feb. 9, 2024

(65) Prior Publication Data

US 2024/0182288 A1 Jun. 6, 2024

Related U.S. Application Data

(63) Continuation-in-part of application No. 16/831,458, filed on Mar. 26, 2020, now Pat. No. 11,897,747.

(Continued)

(51) Int. Cl.

| | |
|---|---|
| ***B67C 7/00*** | (2006.01) |
| ***B67C 3/22*** | (2006.01) |
| ***B67D 3/00*** | (2006.01) |

(52) U.S. Cl.

CPC .............. *B67C 7/004* (2013.01); *B67C 3/225* (2013.01); *B67D 3/009* (2013.01); *B67C 2007/006* (2013.01); *B67C 2007/0066* (2013.01)

(58) Field of Classification Search

CPC ..... B67C 7/004; B67C 7/0073; B67C 7/0086; B67C 3/222; B67C 3/225; B67C 3/26;

(Continued)

(56) References Cited

U.S. PATENT DOCUMENTS

| | | | | |
|---|---|---|---|---|
| 2,650,013 | A | 8/1953 | Nilsson | |
| D191,589 | S | 10/1961 | Schlumbohm | D7/312 |

(Continued)

FOREIGN PATENT DOCUMENTS

| | | | |
|---|---|---|---|
| DE | 102013107260 | 1/2015 | B67C 3/26 |

OTHER PUBLICATIONS

Kinnek, "How a Moonshine Distiller Found The Right Supplier", Apr. 21, 2017 [earliest online date], [site visited Dec. 21, 2017]. Available from Internet, URL:https://www.kinnek.com/article/matchmaker-stories-murphys-law-distillery/#/. (Year: 2017).

(Continued)

*Primary Examiner* — Jacob A Smith

(74) *Attorney, Agent, or Firm* — HAYES SOLOWAY P.C.

(57) ABSTRACT

An apparatus for closing fluid containers includes a rotary gassing station. In the rotary gassing station, at least one container containing a quantity of fluid within an interior space thereof receives a quantity of gas in the interior space. A rotary seaming station is positioned proximate to the rotary gassing station. In the rotary seaming station, a lid is seamed to an opening of the container to seal the quantity of fluid and the quantity of gas in the interior space. At least one container piston of the rotary seaming station is movable around a center axis of the rotary seaming station. The container piston holds the container between a first radial position when the container is within the rotary gassing station to at least a second radial position when a lid is seamed to an opening of the container in the rotary seaming station.

20 Claims, 38 Drawing Sheets

Related U.S. Application Data

(60) Provisional application No. 62/824,862, filed on Mar. 27, 2019.

(58) Field of Classification Search
CPC ...... B67C 2003/2657; B67C 2007/006; B67C 2007/0066; B67C 2003/2688
USPC ............................................. 53/79, 281, 432
See application file for complete search history.

(56) References Cited

U.S. PATENT DOCUMENTS

| | | | | |
|---|---|---|---|---|
| 3,097,671 | A | 7/1963 | Bonetti et al. | |
| 3,455,350 | A | 7/1969 | Hinxlage | 141/367 |
| 3,477,192 | A | 11/1969 | Brown et al. | 53/22 |
| 3,516,455 | A | 6/1970 | Carter | |
| 3,626,996 | A | 12/1971 | Bingham | 141/5 |
| 3,670,786 | A | 6/1972 | Levin et al. | 141/92 |
| 3,911,640 | A | 10/1975 | Rausing | 53/21 |
| 4,170,252 | A | 10/1979 | Peterson | 141/331 |
| 4,602,473 | A | 7/1986 | Hayashi et al. | 53/510 |
| 4,674,547 | A | 6/1987 | Simonazzi | 141/181 |
| 4,750,533 | A | 6/1988 | Yun | 141/312 |
| 4,977,723 | A | 12/1990 | Dubrulle et al. | 53/110 |
| 5,060,449 | A | 10/1991 | Klarl | 53/88 |
| 5,085,255 | A | 2/1992 | LaWarre, Sr. | 141/147 |
| 5,150,740 | A | 9/1992 | Yun | 141/40 |
| 5,156,200 | A | 10/1992 | Mette | 141/287 |
| 5,343,886 | A | 9/1994 | Beswick | 134/131 |
| 5,474,113 | A | 12/1995 | Rademacher | 141/116 |
| 5,501,253 | A | 3/1996 | Weiss | 141/40 |
| 5,860,782 | A * | 1/1999 | Campbell | B21D 51/32 413/31 |
| 5,896,727 | A | 4/1999 | Egli et al. | 53/426 |
| D417,847 | S | 12/1999 | Rush | D7/629 |
| 6,038,833 | A * | 3/2000 | Beringer | B67C 3/26 53/272 |
| 6,155,314 | A | 12/2000 | Ding | 141/192 |
| 6,185,910 | B1 * | 2/2001 | Achhammer | B67C 7/0073 53/426 |
| 6,457,299 | B1 | 10/2002 | Schwenke et al. | 53/510 |
| D480,969 | S | 10/2003 | Owens | 220/4.27 |
| 6,668,877 | B2 | 12/2003 | Fehland et al. | 141/70 |
| 6,698,473 | B2 | 3/2004 | Decarne | B65B 31/00 |
| 6,705,062 | B1 | 3/2004 | Varlet | 53/510 |
| 6,817,386 | B2 | 11/2004 | Tsukano | 141/57 |
| 6,830,084 | B1 | 12/2004 | Friede | 141/144 |
| D525,127 | S | 7/2006 | Cogley | D9/456 |
| 7,299,832 | B2 | 11/2007 | Hartness | 141/144 |
| 7,350,545 | B2 | 4/2008 | Ruble | 141/144 |
| 7,357,159 | B2 | 4/2008 | Popplau | 141/92 |
| 7,661,449 | B2 | 2/2010 | Stavrakis | 141/302 |
| D643,912 | S | 8/2011 | Bowman | D23/269 |
| D648,427 | S | 11/2011 | Bowman | D23/269 |
| 8,132,598 | B2 | 3/2012 | Mastio et al. | 141/51 |
| D662,767 | S | 7/2012 | Hotell | D7/396.2 |
| D681,176 | S | 4/2013 | Chacko | D23/269 |
| D682,611 | S | 5/2013 | Carder | D7/392.1 |
| D696,751 | S | 12/2013 | Beagan, Jr. | D23/269 |
| D697,180 | S | 1/2014 | Van De Klippe | D23/269 |
| D716,653 | S | 11/2014 | Balembois | D9/435 |
| D718,136 | S | 11/2014 | Harrity | D9/499 |
| D731,035 | S | 6/2015 | Lo Cicero | D23/269 |
| D744,068 | S | 11/2015 | Turner | D23/260 |
| 9,180,991 | B2 | 11/2015 | Dupont et al. | B65B 31/025 |
| D752,975 | S | 4/2016 | Gatto | D9/434 |
| D761,398 | S | 7/2016 | Murphy | D23/269 |
| D761,649 | S | 7/2016 | Buck | D9/447 |
| 9,409,722 | B2 | 8/2016 | Bruch et al. | B65G 45/22 |
| D802,326 | S | 11/2017 | Beaver | D6/515 |
| 9,957,144 | B2 | 5/2018 | Cluesserath | B67C 7/0086 |
| 9,969,603 | B2 | 5/2018 | Krulitsch | |
| D821,133 | S | 6/2018 | DiCarlo | D7/312 |
| 10,214,406 | B2 | 2/2019 | DiCarlo et al. | B67C 3/225 |
| 10,954,112 | B2 | 3/2021 | DiCarlo et al. | B67C 3/22 |
| 2001/0045242 | A1 | 11/2001 | Clusserath | 141/144 |
| 2005/0178466 | A1 | 8/2005 | Tanikawa | 141/57 |
| 2007/0012377 | A1 | 1/2007 | Popplau | 141/89 |
| 2009/0277135 | A1 * | 11/2009 | Mastio | B67C 3/242 53/283 |
| 2010/0018168 | A1 * | 1/2010 | Bruijns | B67C 7/0033 53/317 |
| 2010/0212260 | A1 | 8/2010 | Cluesserath | 53/403 |
| 2017/0001848 | A1 * | 1/2017 | DiCarlo | B67C 3/24 |

OTHER PUBLICATIONS

Brew Boss, "Fill-Boss Counter Pressure Bottle and Growler Filler", 2017 [earliest online date], [site visited Dec. 21, 2017]. Available from Internet, URL:https://www.brew-boss.com/Fill-Boss-Counter-Pressure-Bottle-Filler-p/fill-boss.htm. (Year: 2017).

Alibaba, "Automatic Glass Bottle Beer Filling Machine", 2018 [earliest online date], [site visited Jan. 25, 2018]. Available from Internet, URL:https://www.alibaba.com/product-detail/Automatic-Glass-bottle-beer-filling-machine_60075611591.html?spm=a2700.7724857.main07.200.6afa5f2aW1vJmX. (Year: 2018).

* cited by examiner

MULTI-CONTAINER FILLING MACHINE TECHNOLOGIES

CROSS REFERENCE TO RELATED APPLICATION

This application is a continuation-in-part application of U.S. application Ser. No. 16/831,458 filed Mar. 26, 2020, which claims benefit of U.S. Provisional Application Ser. No. 62/824,862, entitled, "Multi-Container Filling Machine Technologies" filed Mar. 27, 2019, the entire disclosures of which are incorporated herein by reference.

FIELD OF THE DISCLOSURE

The present disclosure is generally related to container filling machines and more particularly is related to multi-container filling machine technologies.

BACKGROUND OF THE DISCLOSURE

A variety of types of filling machines are used throughout the food and beverage industries to fill containers with beverages and liquid food products. Many large productions utilize filling machines that are designed to fill a specific container type, which has a specific container dimension and fluid volume. These machines are commonly expensive and only used by large-scale productions. Small productions, such as micro-breweries, are often unable to afford these large-scale machines due to their high cost and the large-scale production of goods that makes them economically viable. As a result, small productions must resort to having their products packaged off-site by third party companies, or utilize packages or containers which are different from what the production company desires.

In addition to these above-noted shortcomings in the industry, there are a number of other drawbacks that come with using conventional filling machines to which the subject disclosure provides substantial improvements over. These drawbacks of the conventional filling machines may include issues relating to the efficiency of operation and the mechanical and electrical components used with the machines.

On particular issue relates to process efficiency of the filling machine and how, typically, each stage of the filling process is handled by a separate unit or piece of machinery which is connected by a belt or another device for transporting containers between the separate unit. As an example, in conventional filling machines, after a container is filled with a beverage at a filler station, the container moves along a transportation belt for a particular distance, usually 10-15 feet, until it reaches a seaming station, where the container is gassed and seamed. Having separate machines handling different parts of the process is beneficial, especially with regards to separate manufacturing and installation of the machines, and the use of separate machinery is carried over from the origin of beverage container manufacturing where the manufacturer of the container would often provide a device of lidding or sealing that container, while the filler machine to fill the container with a beverage is manufactured by a separate company. However, the use of separate machines separated by transportation belts in modern settings is often not ideal, since it occupies a greater spatial footprint and requires installation of numerous container transportation devices.

Thus, a heretofore unaddressed need exists in the industry to address the aforementioned deficiencies and inadequacies.

SUMMARY OF THE DISCLOSURE

Embodiments of the present disclosure provide an apparatus for closing fluid containers. Briefly described, in architecture, one embodiment of the apparatus, among others, can be implemented as follows. The apparatus has a rotary gassing station. In the rotary gassing station, at least one container containing a quantity of fluid within an interior space thereof receives a quantity of gas in the interior space. A rotary seaming station is positioned proximate to the rotary gassing station. In the rotary seaming station, a lid is seamed to an opening of the at least one container to seal the quantity of fluid and the quantity of gas in the interior space. At least one container piston of the rotary seaming station is movable around a center axis of the rotary seaming station. The at least one container piston holds the at least one container between a first radial position when the at least one container is within the rotary gassing station to at least a second radial position when the lid is seamed to the opening of the at least one container.

Embodiments of the present disclosure provide an apparatus for closing fluid containers. Briefly described, in architecture, one embodiment of the apparatus, among others, can be implemented as follows. The apparatus has a container infeed. A filling station receives at least one container from the container infeed. In the filling station, the at least one container is at least partially filled with a quantity of fluid in an interior space of the at least one container. A rotary gassing station receives the at least one container from the filling station. In the rotary gassing station, the at least one container containing the quantity of fluid within the interior space thereof receives a quantity of gas in the interior space. A rotary seaming station is positioned proximate to the rotary gassing station. In the rotary seaming station, a lid is seamed to an opening of the at least one container to seal the quantity of fluid and the quantity of gas in the interior space. At least one container piston of the rotary seaming station is movable fully around a center axis of the rotary seaming station. The at least one container piston holds the at least one container between at least first radial position when the at least one container is within the rotary gassing station to at least a second radial position when the lid is seamed to the opening of the at least one container.

Embodiments of the present disclosure provide an apparatus for closing fluid containers. Briefly described, in architecture, one embodiment of the apparatus, among others, can be implemented as follows. The apparatus has a rotary seaming station. At least one container lift piston is in the rotary seaming station. The at least one container lift piston holds at least one container at and between a first radial position when the at least one container is within a rotary gassing station to at least a second radial position when a lid is seamed to an opening of the at least one container in the rotary seaming station.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
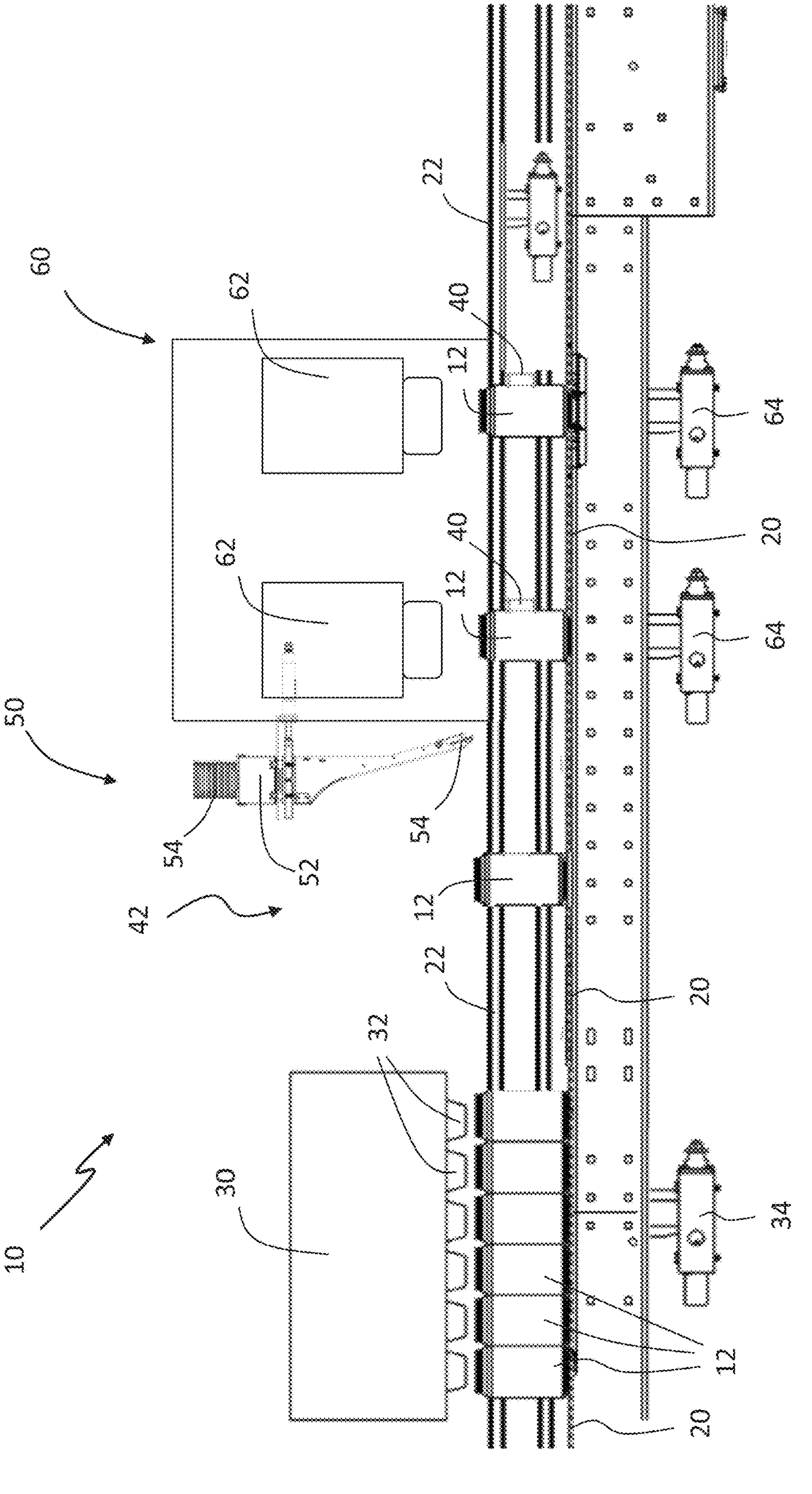
FIG. 1 is a side view illustration of an inline container filling machine, in accordance with a first exemplary embodiment of the present disclosure.

FIG. 1 is a side view illustration of an inline container filling machine 10, in accordance with a first exemplary embodiment of the present disclosure. As shown in FIG. 1, the container filling machine 10, which may be referred to simply as 'machine 10', is an inline filling machine that is designed to move containers 12 along a substantially linear path through a filling operation. In contrast to inline filling machines, the subject disclosure may also be applicable to rotary filling machines, as discussed relative to FIGS. 6-8.

The operation of filling the containers 12 may begin with appropriate cleaning of the containers 12 and loading them on to the machine 10. The containers 12 may be moved on a belt 20 which is positioned underneath the containers 12 such that the bottom surface of the containers 12 contacts a top surface of the belt 20. The belt 20, which may also be referred to as a conveyor, may be formed from a number of linkages connected together, e.g., metal, plastic, or other linkages, or from one continuous belting material, such as a rubberized belt. On the sides of the belt path, various guardrails 22 may be used to ensure the containers remain on the belt 20.

A predetermined number of containers 12, such as six (6) containers as shown in FIG. 1, may be moved via the belt 20 to a position below a counter pressure filling tank 30 which contains a quantity of filling liquid (or other filling substance) which is dispensed into the containers 12 through a plurality of filling heads 32. Appropriate nozzles, valves, and other electro-mechanical equipment may be used to complete the filling of the containers 12, including, for example, filling lifting devices 34 which raise a container 12 off the belt 20 so an exposed opening of the container 12 can be engaged with a filling nozzle. To maintain the containers 12 in the appropriate position under the filling heads 32, one or more stop gates 40 may be used to physically prevent movement of the containers 12 as the belt 20, on which the containers 12 are positioned, maintains a constant movement. Alternatively, the belt 20 may be designed to stop and start movement to position the containers 12 in the desired location.

After the containers 12 are filled, the belt 20 transports them to a staging area 42 where the containers 12 are waiting to be closed with lidding and sealing operations. Another group of containers 12 may then be moved to the filling station to provide a continuous operation of the device 10. At a lidding station 50, a lidding device 52 may dispense individual lids 54 on to the containers 12 as they pass underneath the chute of the lidding device 52. For example, as the container 12 is moved via the belt 20 past the lidding device 52, an individual lid 54 may be held above the container 12 such that the container 12 makes contact with the lid 54 as it moves past. The contact between the container 12 and the lid 54 causes the lid 54 to fall on to the top opening of the container 12. After the lidding station 50, a stop gate 40 may prevent the container 12 from moving to the seaming station 60 until the desired time.

At the seaming station 60, a seaming device 62 may be used to seal the lid 54 on to the top opening of the container 12, thereby sealing the beverage or other substance contained within the container 12 inside it. While this disclosure discusses a seaming station 60, it is noted that the station is generally understood as a closure station, whereby the actual sealing of the containers 12 may be achieved with capping, crowning, sealing, or another process. FIG. 1 depicts two seaming devices 62 used on the filling line, such that two containers 12 can be sealed concurrently. In this regard, when the containers 12 go past the lidding station 50, a series of gates 40 can be used to stop the containers 12 at one of two (or more) seaming devices 62 which can then seal the containers 12. The use of two or more seaming devices 62 can increase production of the machine 10 because the containers 12 can be sealed twice as fast (with two seaming devices 62—or even faster with more seaming devices). It is estimated that in full production, the machine 10 with two seaming devices 62 may be capable of achieving a 100 container/minute production rate, which is significantly higher than comparably-sized machines. The seaming devices 62 may use a closure lifting device 64 which raises the container 12 off the belt 20 so the top opening of the container 12 can have the lid sealed thereto. Once the containers 12 are sealed, they may be moved to a subsequent step in the production process, such as to cleaning and packaging.

It is noted that the production line of the machine 10 may include many additional components, features, and functions which are not explicitly detailed herein. For example, a CO2 atmosphere may be applied to all or part of the operation line, thereby preventing the beverages from being exposed to oxygen during production. It is also noted that the containers 12 may be any type of container which is used to hold a substance, commonly a beverage or food, but also non-edible substances. The containers 12 may have varying sizes and shapes, and they may be constructed from different materials. For example, the containers may be aluminum cans, glass or plastic bottles, growlers, champagne bottles or the like. In accordance with this disclosure, the machine 10 is described relative to filling canned beverage containers, such as those commonly used to contain soda or beer, but other containers may also be used with the machine 10.

Figure 2:
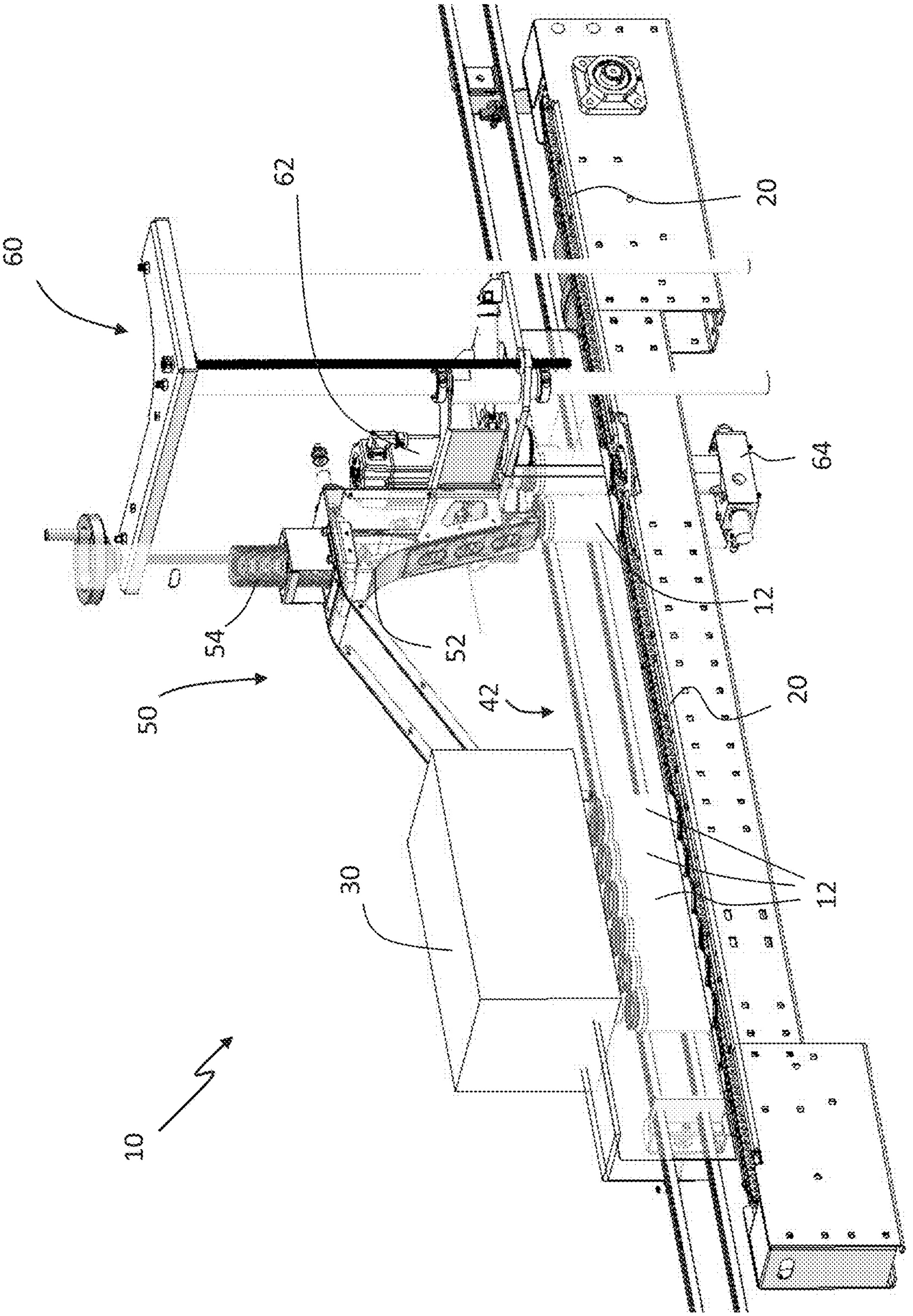
FIG. 2 is a side, isometric view illustration of the inline container filling machine of FIG. 1 illustrating further detail, in accordance with the first exemplary embodiment of the present disclosure.

FIG. 2 is a side, isometric view illustration of the inline container filling machine 10 of FIG. 1 illustrating further detail, in accordance with the first exemplary embodiment of the present disclosure. In particular, FIG. 2 illustrates additional details of the lidding and seaming stations 50, 60. With reference to FIGS. 1-2, as can be seen, the containers 12 are showing receiving the lids 54 from the chute of the lidding device 52. The lids 54 may be stacked within the lidding device 52 and dispensed on to the container 12 openings as they pass underneath. The seaming station 60 may be positioned immediately adjacent to the lidding station 50, such that the containers 12 can be appropriately sealed as quickly as possible. It is noted that FIG. 2 illustrates only a single seaming station 60, but additional seaming stations can be included.

Figure 3A:
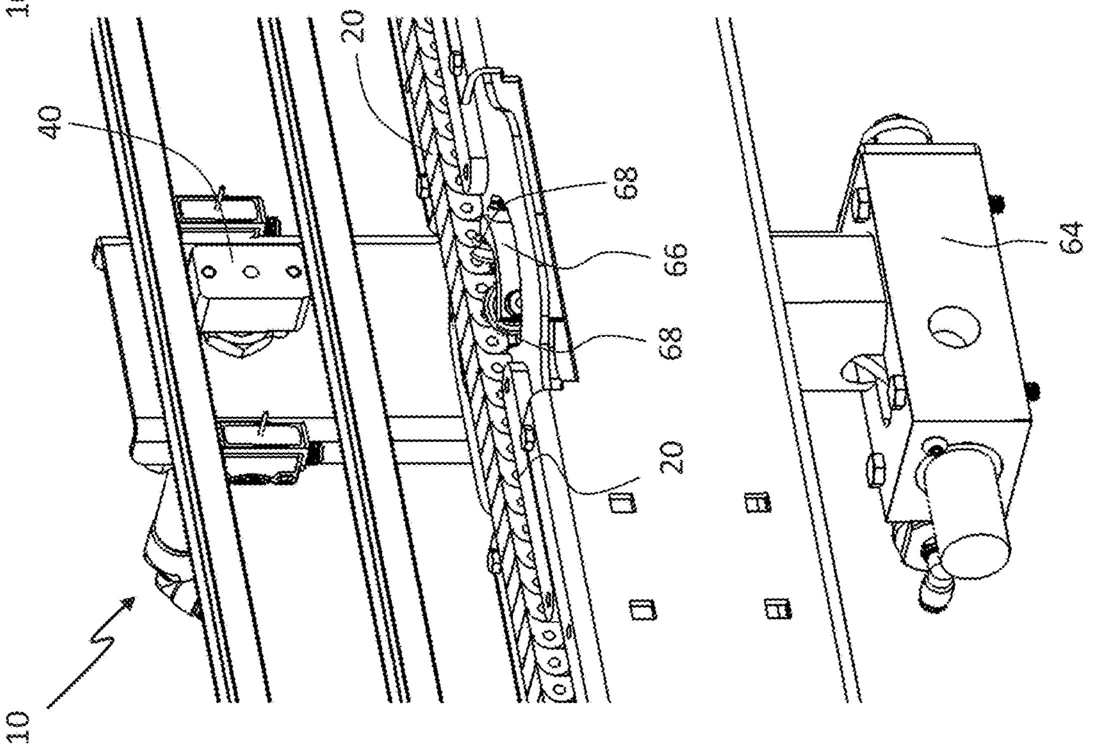
FIGS. 3A-3B are side, isometric view illustrations of a narrow belt and lifting device of the inline container filling machine of FIG. 1, in accordance with the first exemplary embodiment of the present disclosure.
Figure 3B:
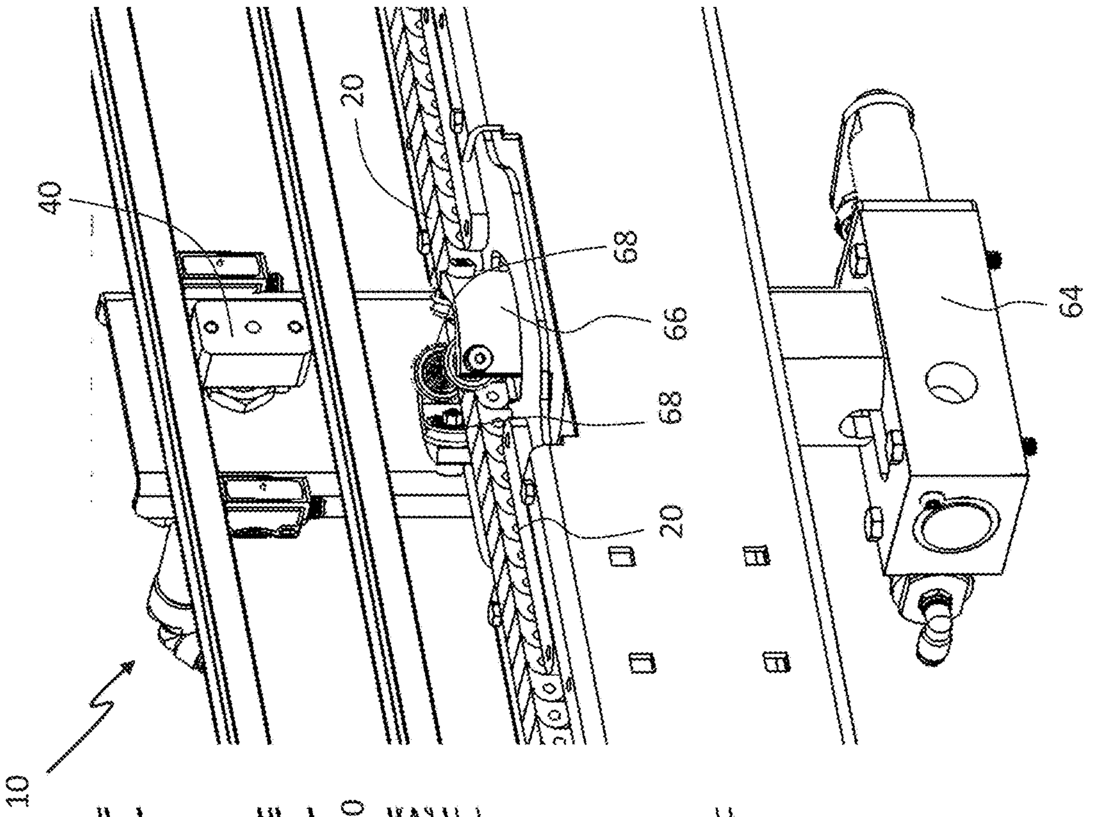

FIGS. 3A-3B are side, isometric view illustrations of a narrow belt 20 and lifting device 64 of the inline container filling machine 10 of FIGS. 1-2, in accordance with the first exemplary embodiment of the present disclosure. With reference to FIGS. 1-3B, and as can be seen in FIGS. 3A-3B specifically, the belt 20 is a narrow belt formed from a plurality of linkages or interconnected members which together are capable of conveying the containers 12 through the machine 10. This type of belt 20 may be generally referred to as a 'narrow belt' because the width of the belt 20 is less than the diameter distance of the container 12. It is noted that the term 'narrow belt' may be used relative to the container size with which the belt is used, such that the actual width of the narrow belt 20 can vary but will always remain less than the diameter of the container on the belt.

In contrast to the use of a narrow belt 12, conventional devices commonly have a belt which is wider than the container's diameter, such that the belt can properly transport the container. However, with these conventional devices, when the container needs to be raised or lifted off the belt, such as during filling or seaming, the container must be pushed off the belt to allow for a lifting device to lift the container 12 without contacting the underside of the belt. For example, most conventional fillers need to either have a star wheel to move the containers off of the belt to add the lids or caps, or they push the containers off a belt to add caps, crowns, then be pushed to another belt to move them away. The use of the narrow belt 20 can avoid the need to move the containers 12 off of the belt 20 for these processes.

In particular, the narrow belt 20 allows for a lifting device 64 to raise a closure lift mechanism 66 on either side of the narrow belt 20, such that the lifting device 64 can raise the container 12 off of the narrow belt 20 vertically. The closure lift mechanism 66 may include two or more members which are positioned on the lateral sides of the narrow belt 20 and which each have a rotatable guide wheel 68. The lifting device 64 may raise and lower the closure lift mechanism 66 and the rotatable guide wheels 68 relative to the top surface of the narrow belt 20. For example, in a retracted position (non-lifting position) of the lifting device 64, the uppermost part of the closure lift mechanism 66 and the rotatable guide wheels 68 may be positioned below the top surface of the narrow belt 20, such that containers 12 can freely move along the narrow belt 20 without contacting the closure lift mechanism 66 and the rotatable guide wheels 68. In a raised or lifted position, the closure lift mechanism 66 and the rotatable guide wheels 68 may raise to a position above the upper surface of the narrow belt 20, as shown in FIG. 3B. The operation of the machine 10 may be controlled with appropriate sensors to raise the closure lift mechanism 66 and the rotatable guide wheels 68 when a container 12 is positioned immediately vertical or overhead, such that the rotatable guide wheels 68 make contact with the underside or bottom of the container 12 and raise it upwards. In the raised position, the container 12 may be sealed or capped appropriately, at which point the lifting device 64 can lower the closure lift mechanism 66 and the rotatable guide wheels 68 back downwards until the container 12 is sitting on the narrow belt 20 again.

As can be seen, with the narrow belt 20 design, the containers need only be simply stopped with a stop gate 40 while they are still on the belt. Then the lifting device 64 from underneath, and from both sides of the narrow belt 20, raises the containers 12 to add a cap, crown or spin the can if a lid was placed on top beforehand. The use of the narrow belt 20 is important for allowing the closure lift mechanisms 66 and the rotatable guide wheels 68—or other equivalent structures—to contact the bottom of the container 12 without needing to contact the belt 20 itself.

Figure 4C:
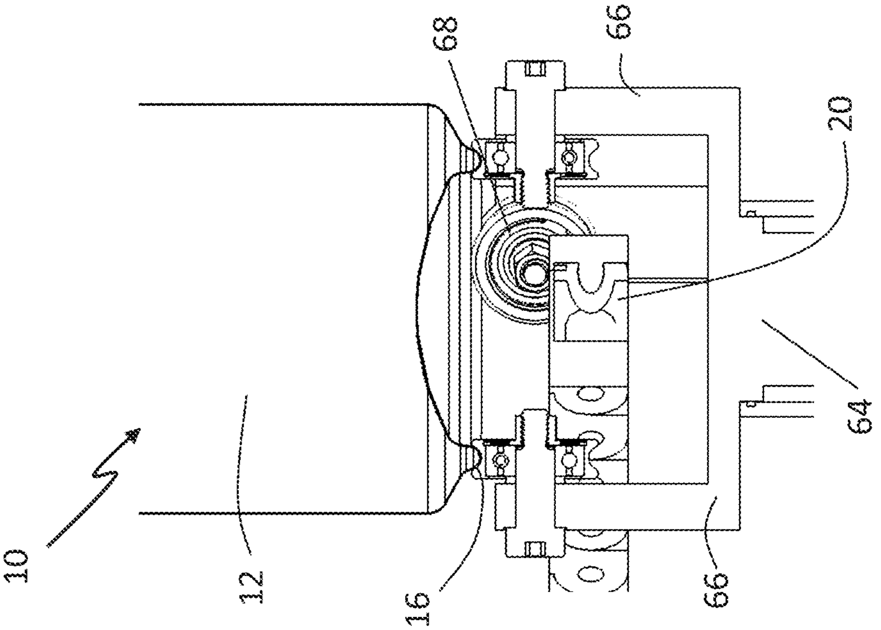
FIGS. 4A-4C are front view and side, partial cross-sectional view illustrations, respectively, of a narrow belt and lifting device of the inline container filling machine of FIG. 1, in accordance with the first exemplary embodiment of the present disclosure.
Figure 4B:
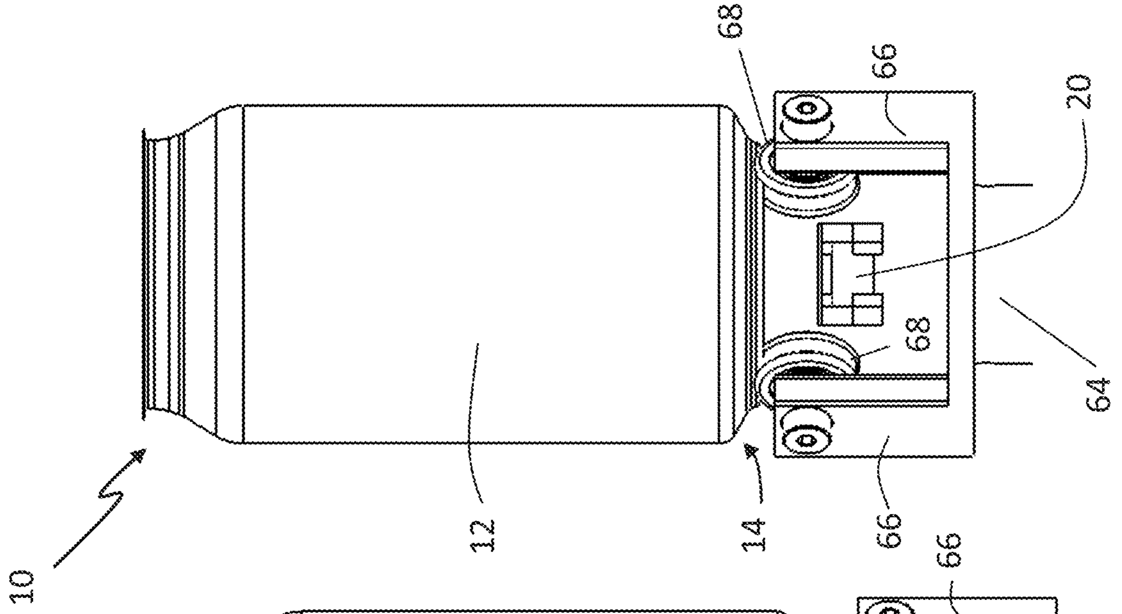
Figure 4A:
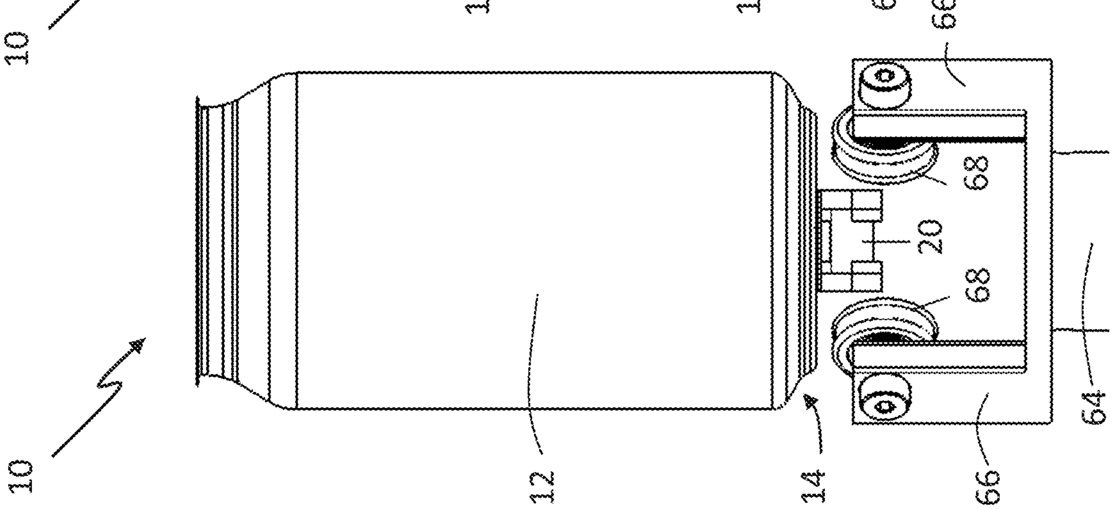

FIGS. 4A-4C are front view and side, partial cross-sectional view illustrations, respectively, of a narrow belt 20 and lifting device 64 of the inline container filling machine 10 of FIG. 1, in accordance with the first exemplary embodiment of the present disclosure. In particular, FIG. 4A depicts the container 12 positioned on the narrow belt 20 with the lifting device 64 in the lowered or retracted position. As can be seen here, the guide wheels 68 are connected to the closure lift mechanisms 66 which are raised and lowered by the lifting device 64, and in the lowered or retracted position, the bottom 14 of the container 12 can move along the narrow belt 20 without contacting the guide wheels 68. FIG. 4B depicts the lifting device 64 in the raised or extended position, where the guide wheels 68 are moved upwards on either side of the narrow belt 20 to contact the bottom 14 of the container 12 and raise it vertically off the narrow belt 20. As can be seen, the narrow belt 20 being more narrow than a diameter of the container 12, ensures that there is adequate space for the closure lift mechanisms 66 to move upwards on the lateral sides of the narrow belt 20. The closure lift mechanisms 66 may be positioned to locate the guide wheels 68 to match a general position of a bottom ridge 16 of the bottom 14 of the container 12, such that an annular groove of the guide wheels 68 receives the bottom ridge 16 of the container 12. FIG. 4C depicts the bottom ridge 16 of the container 12 being positioned within the annular groove of the guide wheels 68.

Figure 5B:
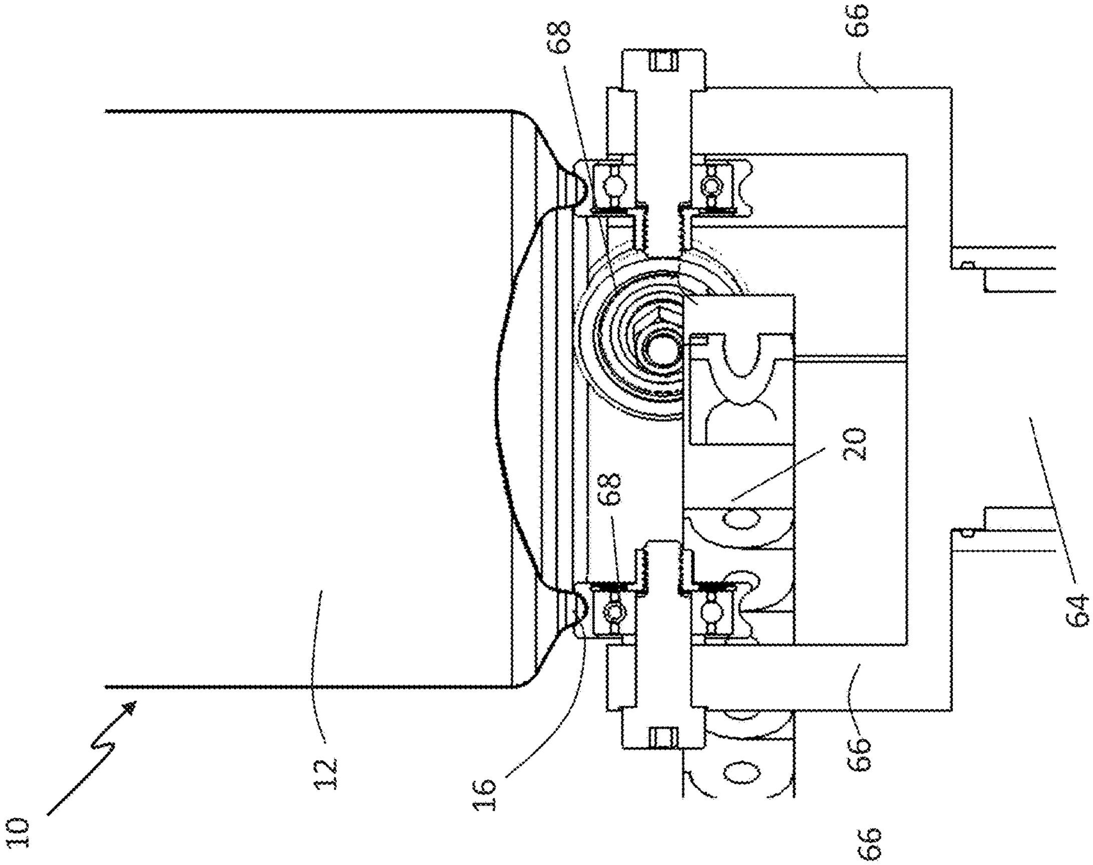
FIGS. 5A-5B are front, partial cross-sectional and side, partial cross sectional view illustrations, respectively, of a narrow belt and lifting device of the inline container filling machine of FIG. 1, in accordance with the first exemplary embodiment of the present disclosure.
Figure 5A:
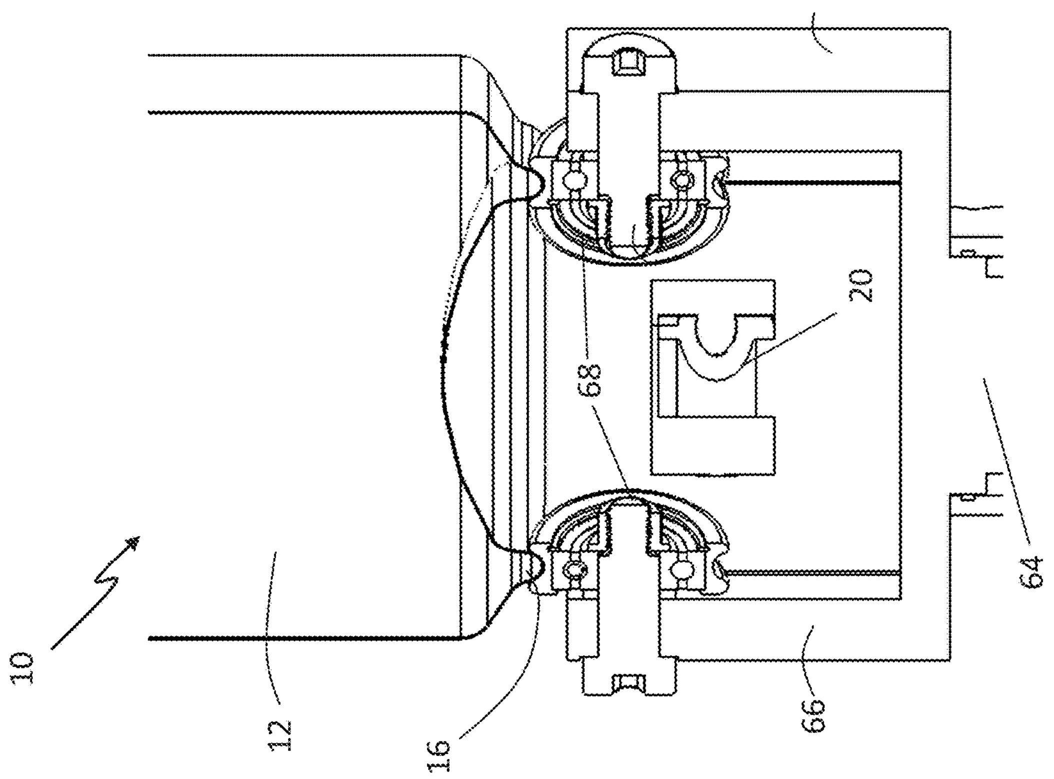

FIGS. 5A-5B are front, partial cross-sectional and side, partial cross sectional view illustrations, respectively, of a narrow belt 20 and lifting device 64 of the inline container filling machine 10 of FIG. 1, in accordance with the first exemplary embodiment of the present disclosure. The use of the guide wheels 68 to raise the container 12 off the narrow belt 20 may not only lift the container 12 vertically off the narrow belt 20, but it may also allow for the container 12 to be rotated when it is in this lifted position. Specifically, when the container 12 is raised towards a seaming device, for example, the seaming device may contact the upper rim of the container 12 and rotate it along the container's 12 vertical axis, thereby allowing the seaming device to seam the lid around the circumference of the container 12. The guide wheels 68 may continue to support and guide the container 12 as it is rotated, whereby the bottom ridge 16 of the container 12 is moved through the annular groove of each guide wheel 68 used. It is noted that the number of guide wheels 68 used may vary depending on the machine 10. For example, there may be four wheels, two on each side of the belt for aluminum cans, where the guide wheels 68 match the bottom profile of the cans, so not to damage the cans while spinning them, from the upwards force that is required to seam the cans. Moreover, different containers 12 may have differently-shaped grooved wheels 68. Additionally, for containers 12 that do not need to be spun or rotated in order to be sealed, such as glass bottles which receive a cap which is 'crowned' on the bottle, the grooved wheels 68 may be replaced with a solid plate which pushes the bottle up to crimp the crown onto the bottle.

While the use of the lifting device 64 with closure lift mechanisms 66 and guide wheels 68 (or another container-interfacing structure) is described relative to the use of sealing the container 12, it is noted that these devices can also be used for any other portion of the container processing, including aspects of processing which requires a container 12 to be lifted off the belt 20 or otherwise moved from a belt. For example, this same technique can be used to raise the containers up to a filling head, below a counter pressure tank, fill the containers, and then drop them back down onto the belt, where the belt would carry them to the closure stations while the next batch of cans or bottles are being filled. The use of these devices can improve the processing speed of the machine 10. For example, these devices with the narrow belt 20 design could more than double the thru put in most cases than what is currently on the market, in the same overall space of the machine 10.

Figure 6:
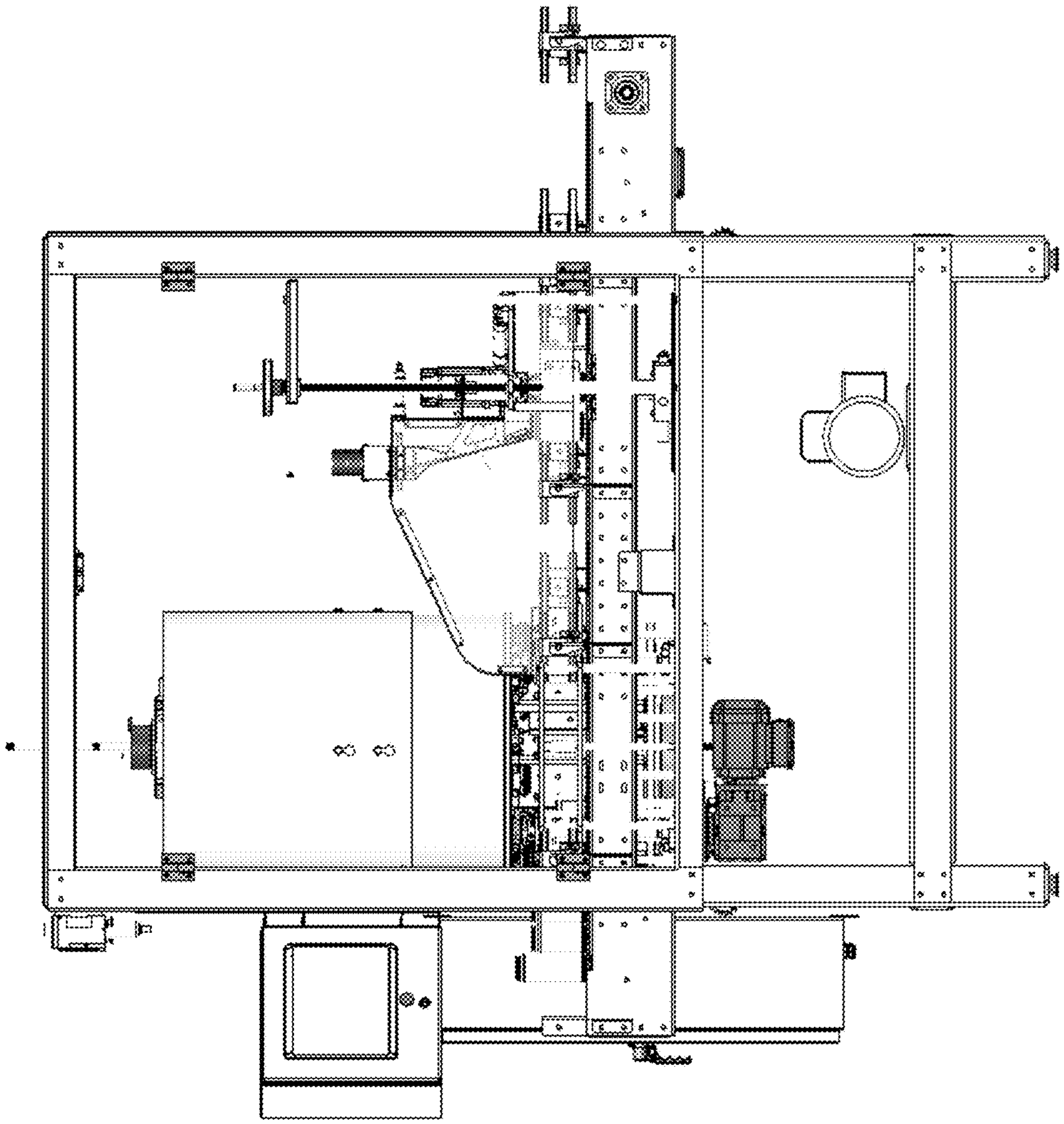
FIG. 6 is a side view illustration of a rotary container filling machine, in accordance with the first exemplary embodiment of the present disclosure.
Figure 7:
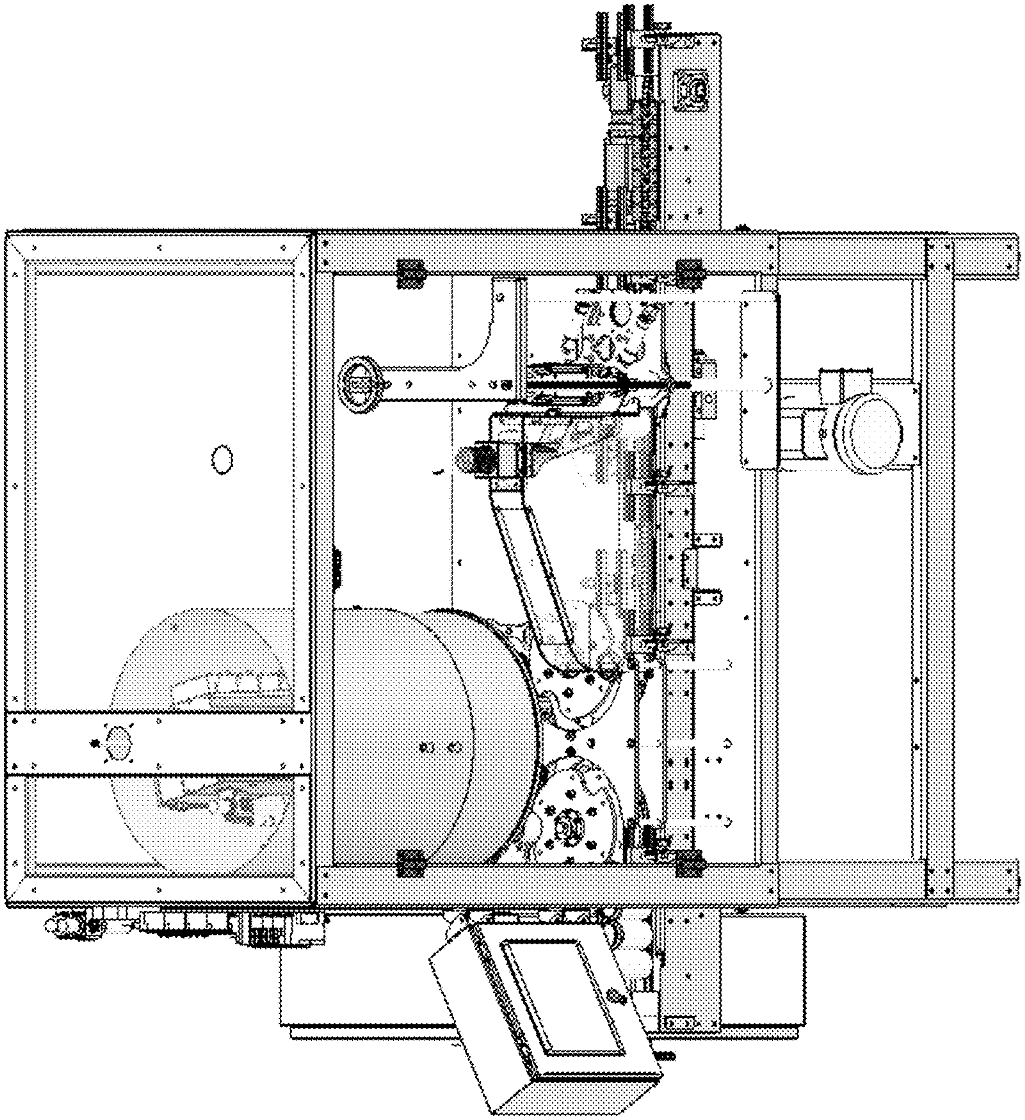
FIG. 7 is an elevated, front isometric view illustration of the rotary container filling machine of FIG. 6, in accordance with the first exemplary embodiment of the present disclosure.
Figure 8:
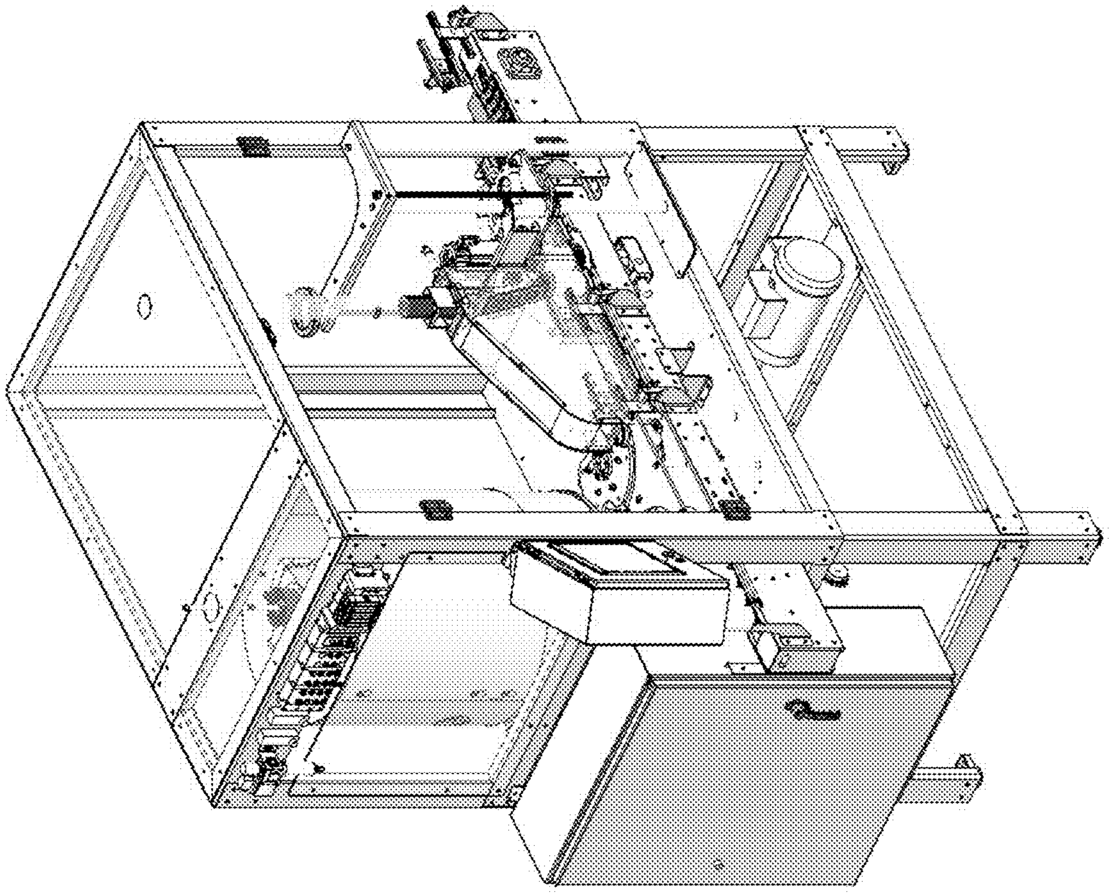
FIG. 8 is an elevated, side isometric view illustration of the rotary container filling machine of FIG. 6, in accordance with the first exemplary embodiment of the present disclosure.

FIG. 6 is a side view illustration of a rotary container filling machine, in accordance with the first exemplary embodiment of the present disclosure. FIG. 7 is an elevated, front isometric view illustration of the rotary container filling machine of FIG. 6, in accordance with the first exemplary embodiment of the present disclosure. FIG. 8 is an elevated, side isometric view illustration of the rotary container filling machine of FIG. 6, in accordance with the first exemplary embodiment of the present disclosure. In comparison to FIGS. 1-5B, which disclose an inline filling machine 10, FIGS. 6-8 disclose a rotatory filling machine whereby the containers are moved along a rotary path during the fill operation. It is noted that the structures, devices, and functionality of the machine 10 as described relative to the inline filling machine 10 FIGS. 1-5B can be equally applied to the use of a rotary filling machine as depicted in FIGS. 6-8, whereby a narrow belt design with a lifting device can be used to raise and lower the containers off the narrow belt as needed during the processing operation.

Figure 9:
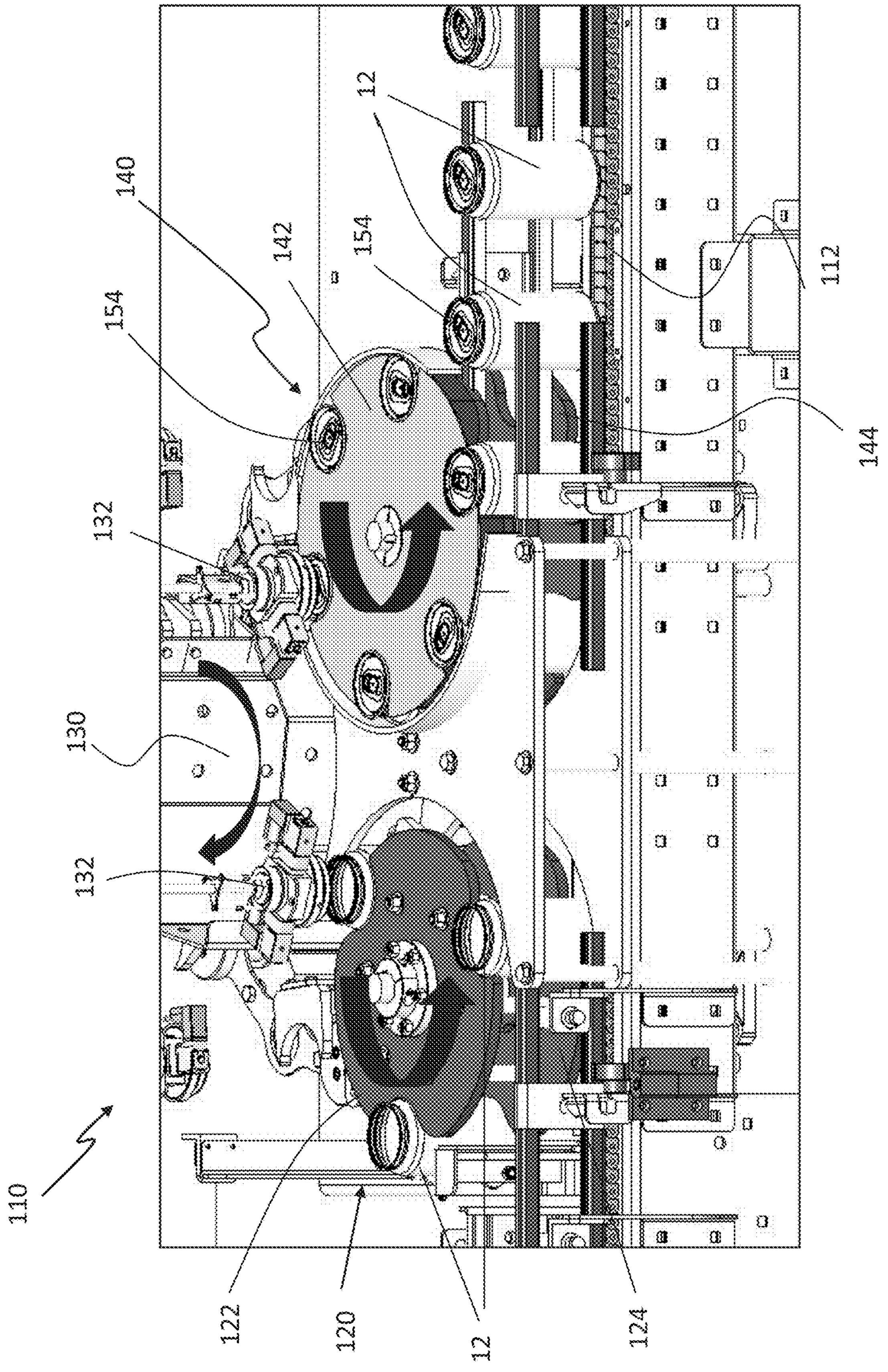
FIGS. 9-10 are plan view illustrations of a container filling machine, in accordance with a second exemplary embodiment of the present disclosure.
Figure 10:
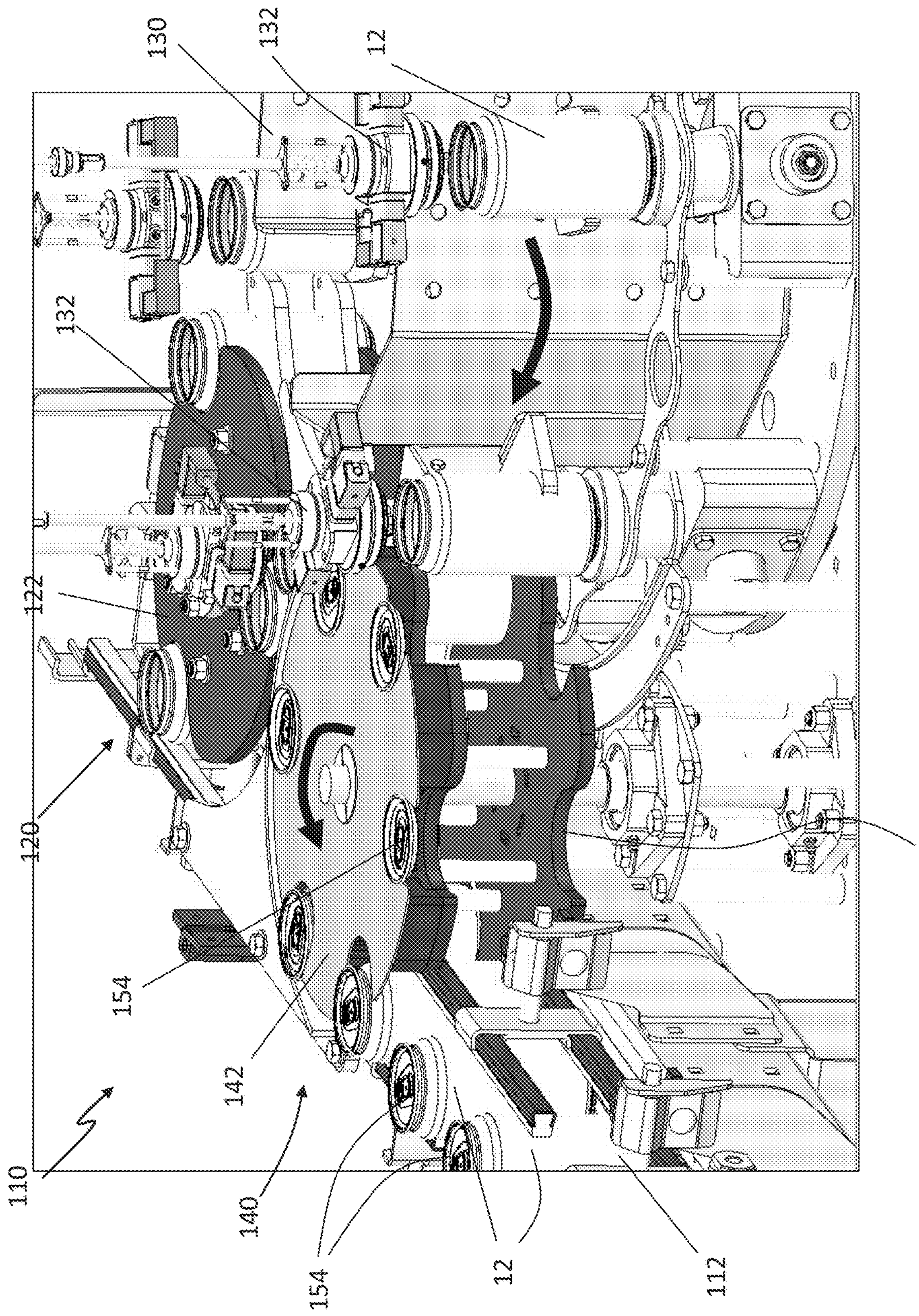

FIGS. 9-10 are plan view illustrations of a container filling machine 110, in accordance with a second exemplary embodiment of the present disclosure. The second exemplary embodiment may have numerous similarities to the first exemplary embodiment of FIGS. 1-8, all of which are considered within the scope of either embodiment. As shown in FIGS. 9-10, a container filling machine 110, which may be referred to herein as 'machine 110', includes at least three rotary stations, including a rotary entry station 120, a rotary filling station 130, and a rotary gassing station 140, which are used to fill containers 12 with a fluid, then gas and seal the containers 12. The rotary entry station 120 receives an empty container 12 which has an open top (no lid). The rotary entry station 120 includes upper and lower plates 122, 124 which hold the container 12 and move it in a counter-clockwise direction, as indicated by the arrow in FIG. 9. The empty containers 12 travel around the rotary entry station 120 and to the rotary filling station 130 which holds the containers 12 and fills them with fluid using one or more filling heads 132, as the containers 12 move around the rotary filling station 130.

Once the containers 12 are filled, they are transferred to the rotary gassing station 140 which supply a quantity of $CO_2$ gas to the containers 12 (to prevent oxygen from negatively affecting the fluid within the containers 12) and place a lid 154 on the containers 12. The rotary gassing station 140 may be positioned at an immediate exit of the filling station 130, such that the containers 12 transfer directly from the filling station 130 to the rotary gassing station 140 without traversing on additional lengths of belts, conveyers, or other devices. In one example, the gassing station 140 is rotationally interfacing with the filling station 130 such that as containers 12 move around the filling station 130, they exit the rotary filling station 130 and are transferred directly to the rotary gassing station 140. The rotary gassing station includes top and bottom plates 142, 144 which hold the containers 12 as they move in a counter-clockwise rotational direction, as shown by the arrow in FIG. 9. During the rotation of the containers 12 around the rotary gassing station 140, $CO_2$ gas (or another gas) is supplied through the rotary gassing station 140 itself while a lidding system (not shown) places a lid 154 on the fluid and gas filled container 12. The container 12 then exits the rotary gassing station 140 and the full containers 12 with lids 154 placed thereon are moved along a belt 112 towards a seaming station where the lids 154 are sealed to the top of the containers 12.

The details, components, and operation of the rotary gassing station 140 are described in further detail in FIGS. 11-22.

Figure 12:
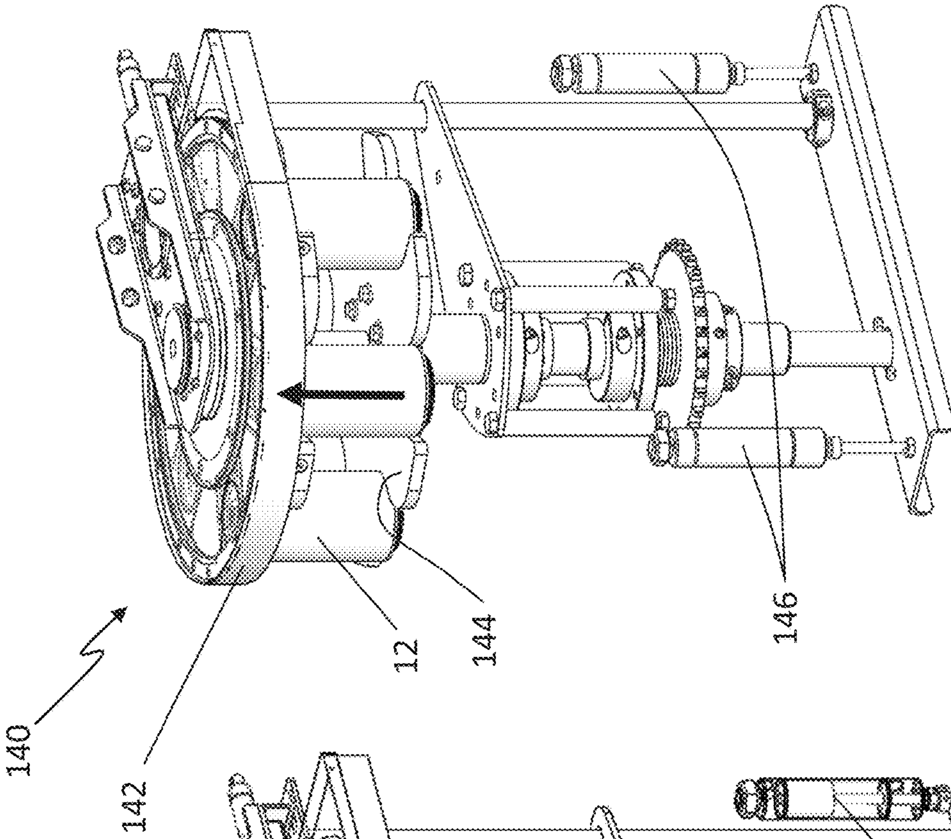
FIGS. 11-22 are illustrations of components and operation of the rotary gassing station of the container filling machine of FIGS. 9-10, in accordance with the second exemplary embodiment of the present disclosure.
Figure 11:
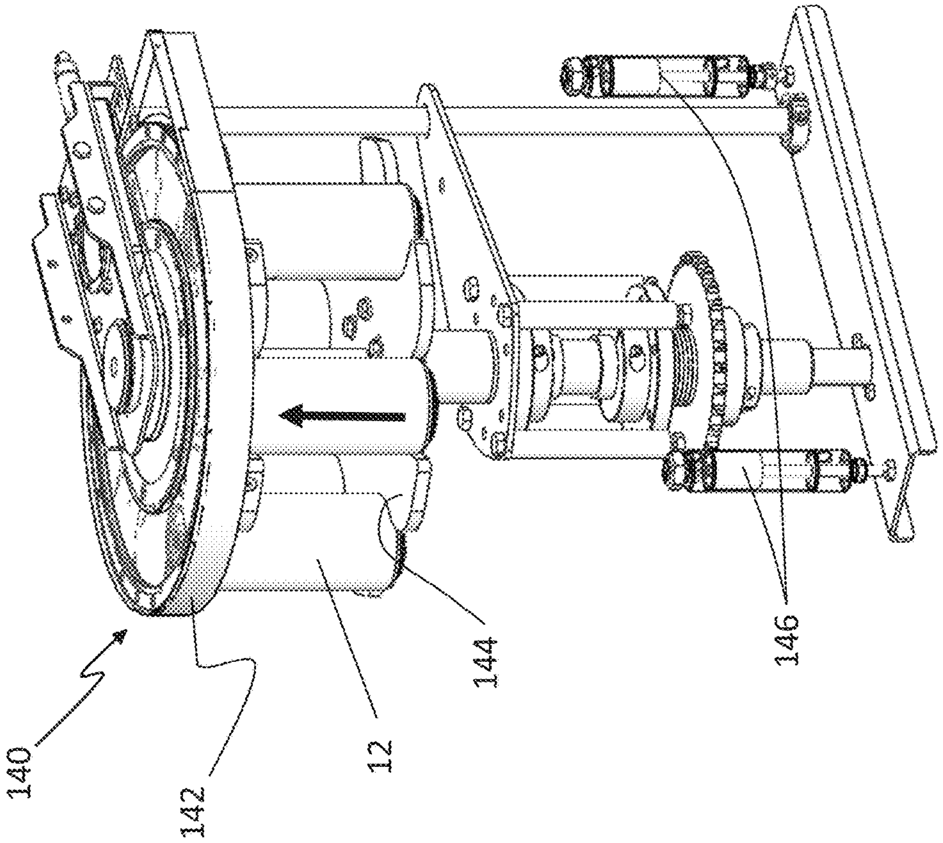

As shown in FIG. 11 and FIG. 12, the top and bottom plates 142, 144 of the rotary gassing station 140 are positioned substantially at a bottom and top of the containers 12. Each of these plates 142, 144 may be supported with one or more bars which are connected to one or more lift cylinders 146, such that the relative vertical position of the top plate 142 and the bottom plate 144 are adjustable. This ability to move the top and bottom plates 142, 144 relative to one another allows for the rotary gassing station 140 to be adjustable to differently-sized containers 12, such as 12 oz aluminum cans versus 16 oz aluminum cans. For example, FIG. 11 illustrates the rotary gassing station 140 in use with 16 oz containers whereas FIG. 12 illustrates the rotary gassing station 140 in use with 12 oz containers 12, which have a smaller height. The lift cylinders 146 may allow for movement of the top plate 142 while the bottom plate 144 remains substantially vertically stationary.

As can also be seen in the figures, the top plate 142 and the bottom plate 144 may have star wheel pockets which allow for the top and/or bottom of the container 12 to be exposed or accessible. In particular, the bottom plate 144 may have pockets which allow the container 12 to be raised in a linear motion upwards to engage with the lid that is placed on top of the top star wheel 142. When the bottom of the container 12 is moved rotatably by the rotary gassing station 140, it comes in contact with a raising ramp (discussed later) which causes the container 12 to move vertically upwards. This action allows the container 12 to be lidded, as discussed further herein.

Figure 13:
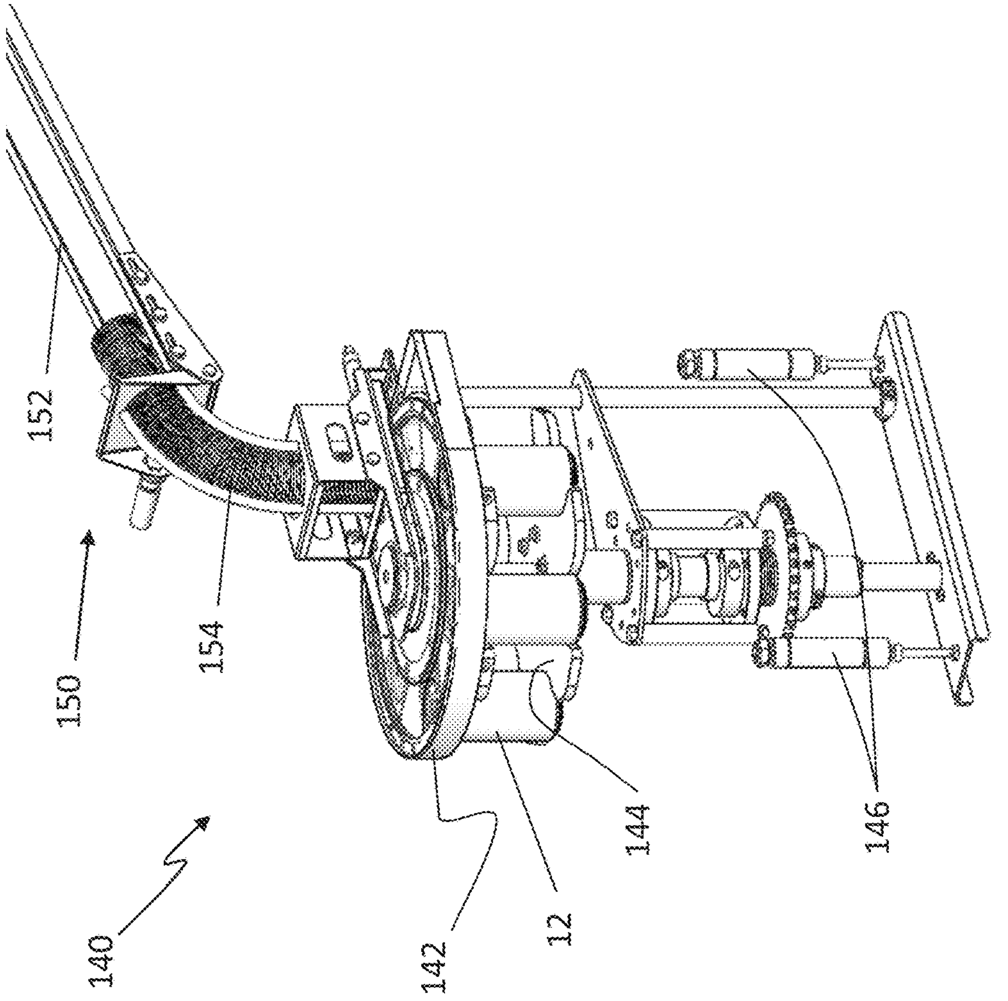

FIG. 13 illustrates the rotary gassing station 140 in use with a lidding system 150, which supplies a quantity of lids 154 through a chute 152, such that the lids 154 are dispensed on to the top plate 142 of the rotary gassing station 140.

Figure 15:
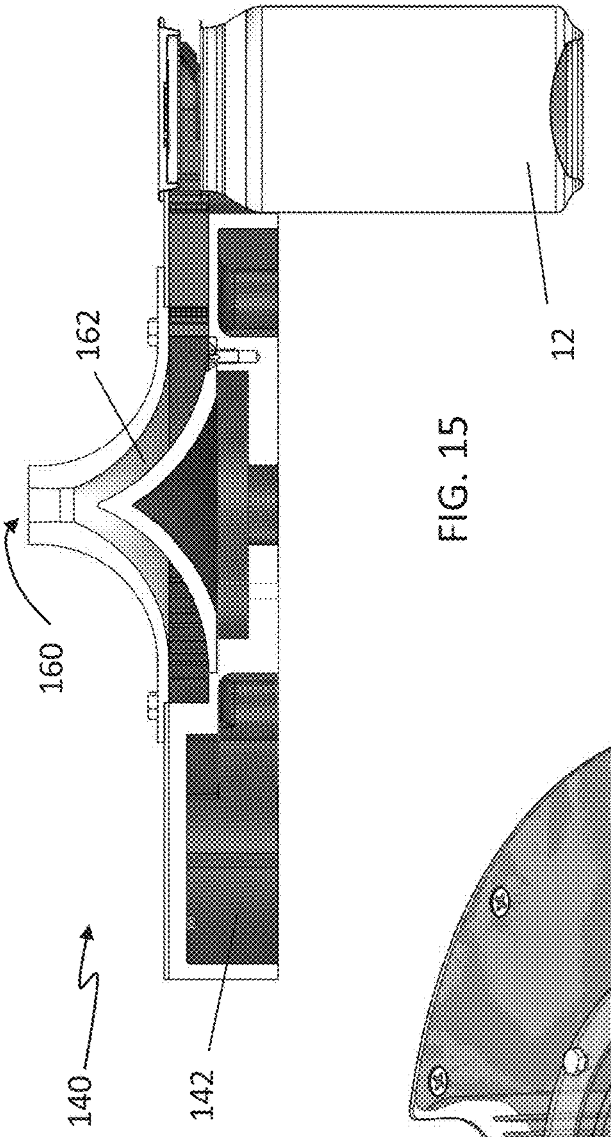
Figure 14:
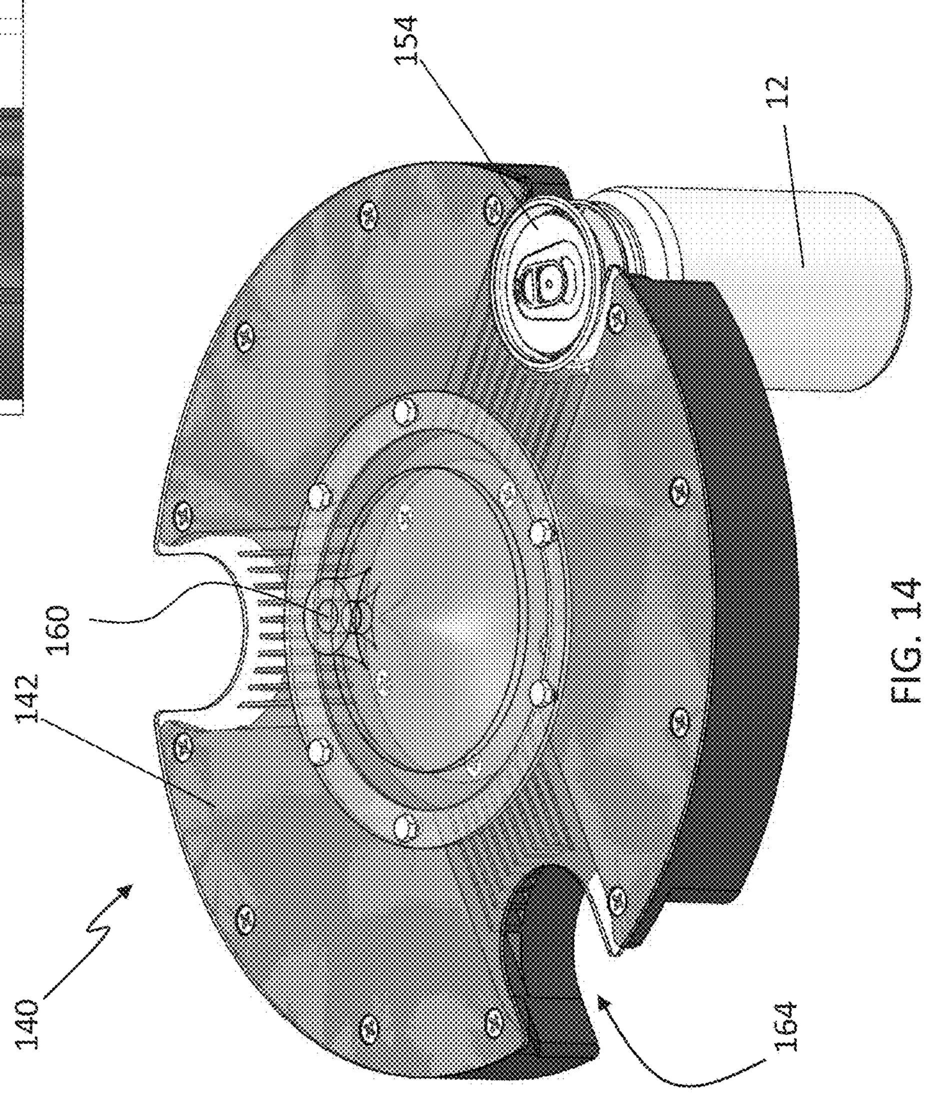
Figure 16B:
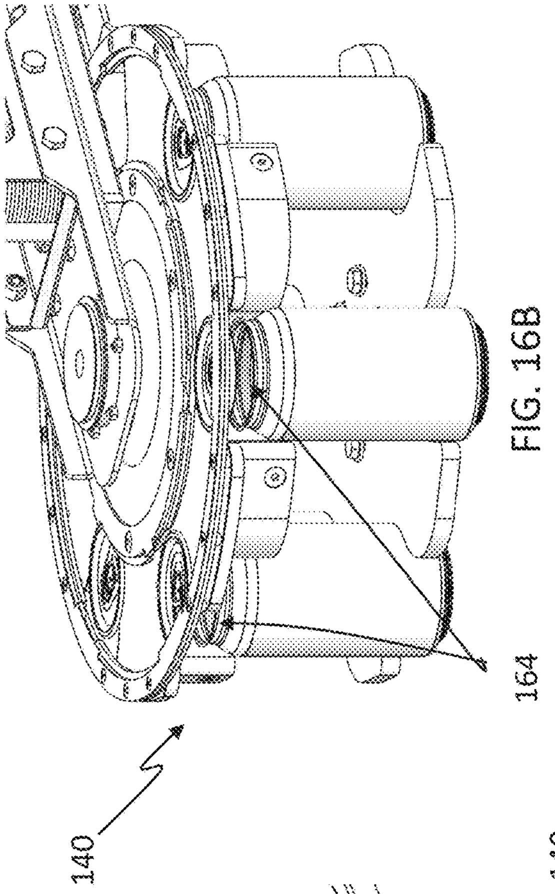
Figure 16C:
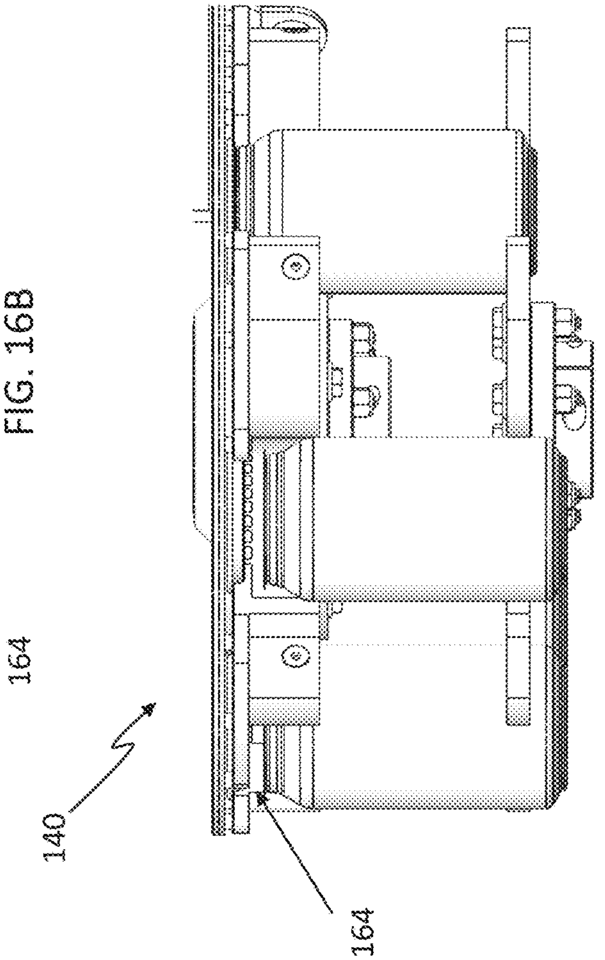
Figure 16A:
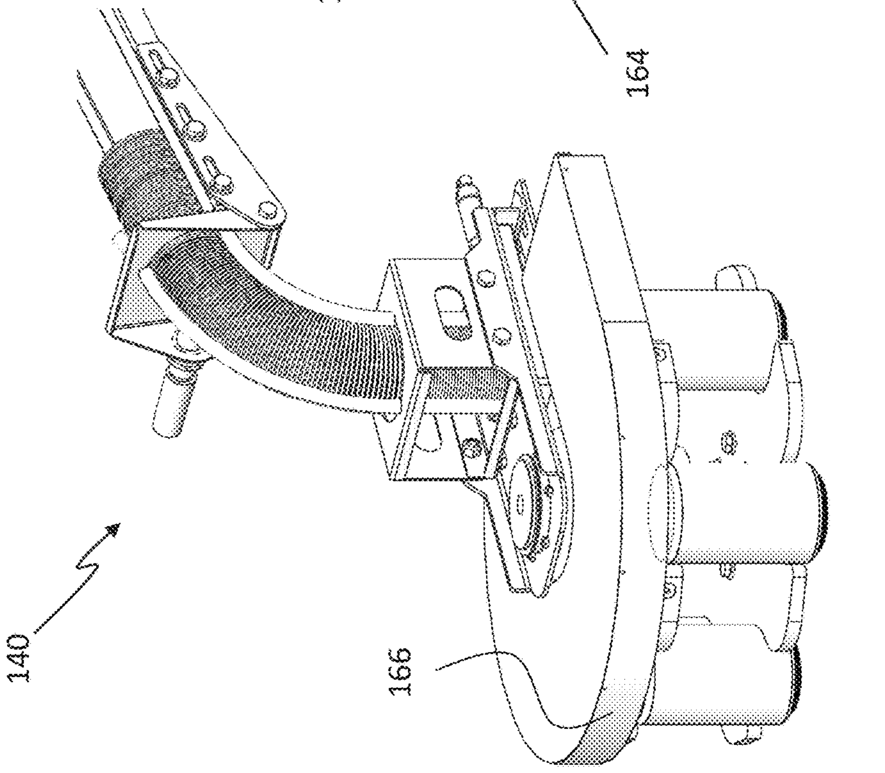

FIGS. 14-15 illustrate the gassing structures of the rotary gassing station 140. As shown, the top plate 142 includes a central gas inlet 160 which receives the CO2 gas (or another gas) and directs the gas to flow into a manifold 162. The manifold 162 transfers the gas to the degassing pockets 164 of the top plate 142, in which a container 12 may be positioned. One or more fins or flow structures may be positioned within the manifold 162 to assist with preventing cross flow or other gas movement which is undesirable. As a constant or near-constant supply of gas is provided through the manifold 162, the exposed tops of the containers 12 are gassed which prevents ambient air or oxygen from gaining access to the containers 12. The goal is to replace atmosphere from the "head space", the area from the top of the fluid in the container, to the bottom of the lid 154, and replace it with CO2 gas before the lid 154 is placed on top of the container 12. While this occurs, the lid 154 may be positioned on the top plate 142, and the container 12 is moved upwards to make contact with the lid 154 and remove it from the top plate 142, with the lid 154 positioned over the opening of the container 12. Even when the lid 154 is not sealed, its position on the opening of the container 12 may act as a physical barrier to prevent gas flow into or out of the container 12. FIGS. 16A-16C illustrate additional images of the degassing process, where the top plate 142 holds down the lids 154 that are placed into the top plate 142 pockets. As the gas is moved through the manifold, a side shield (FIG. 16A) keeps the gas confined at the degassing pockets 164.

Figure 17A:
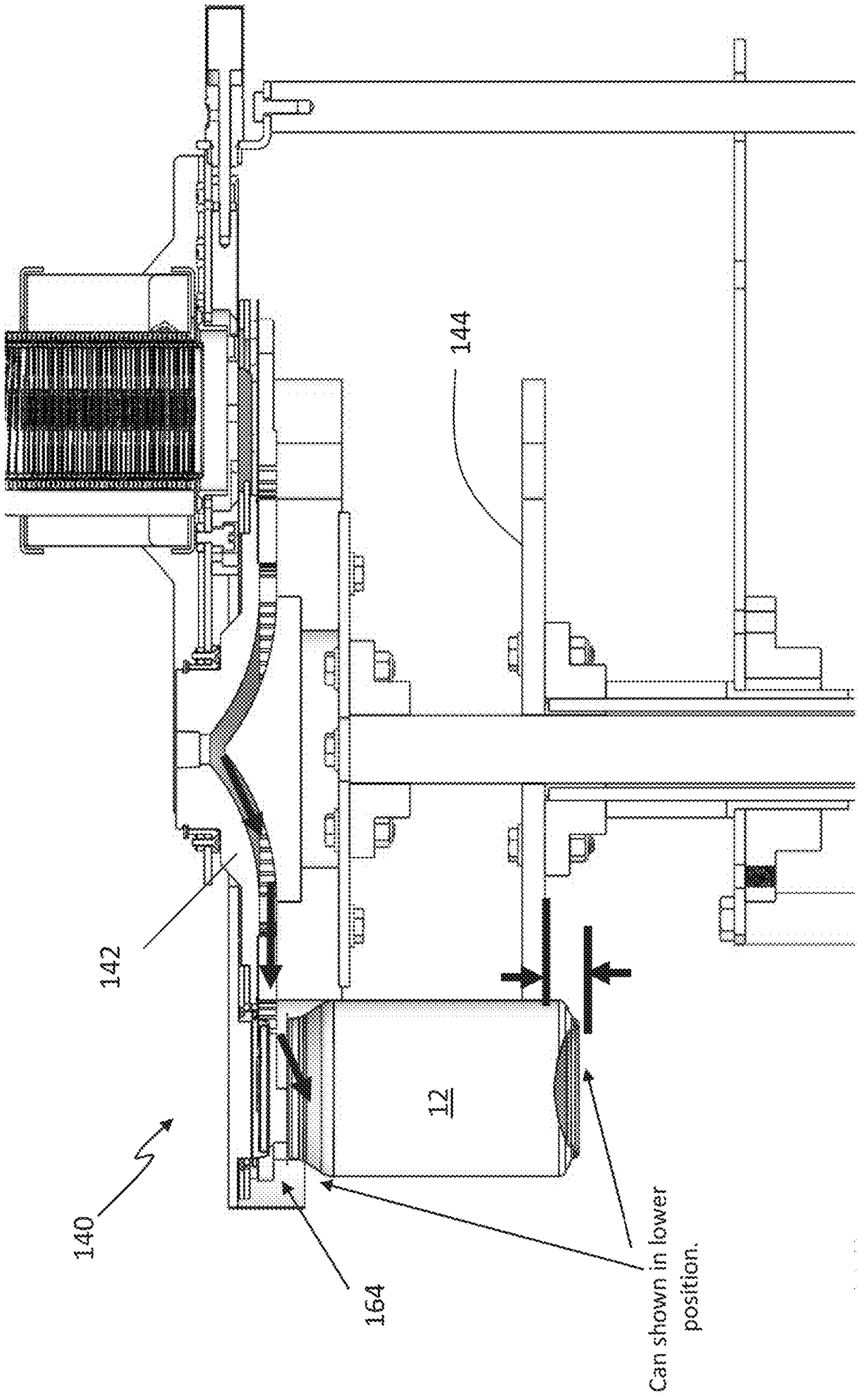
Figure 17B:
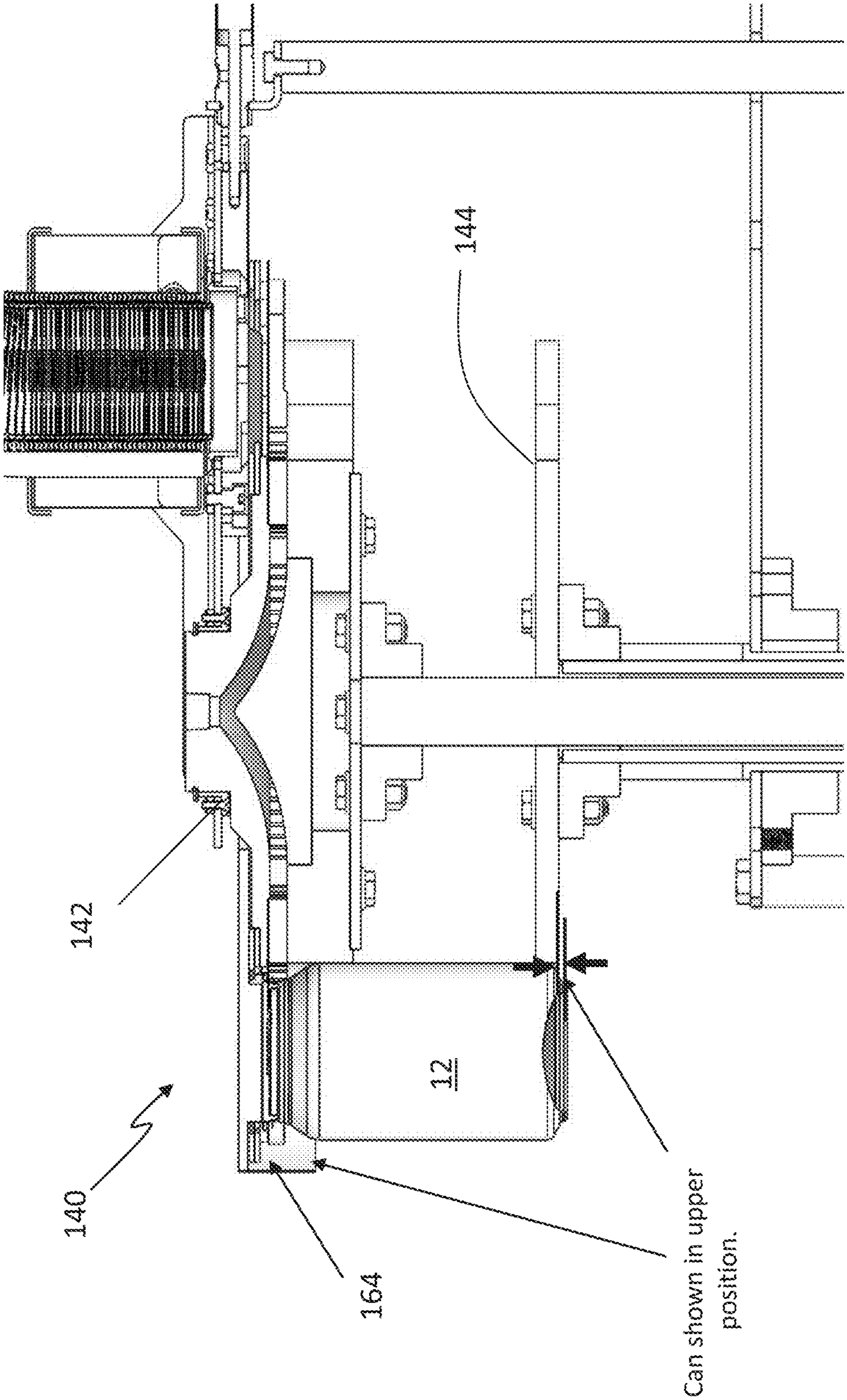
Figure 17C:
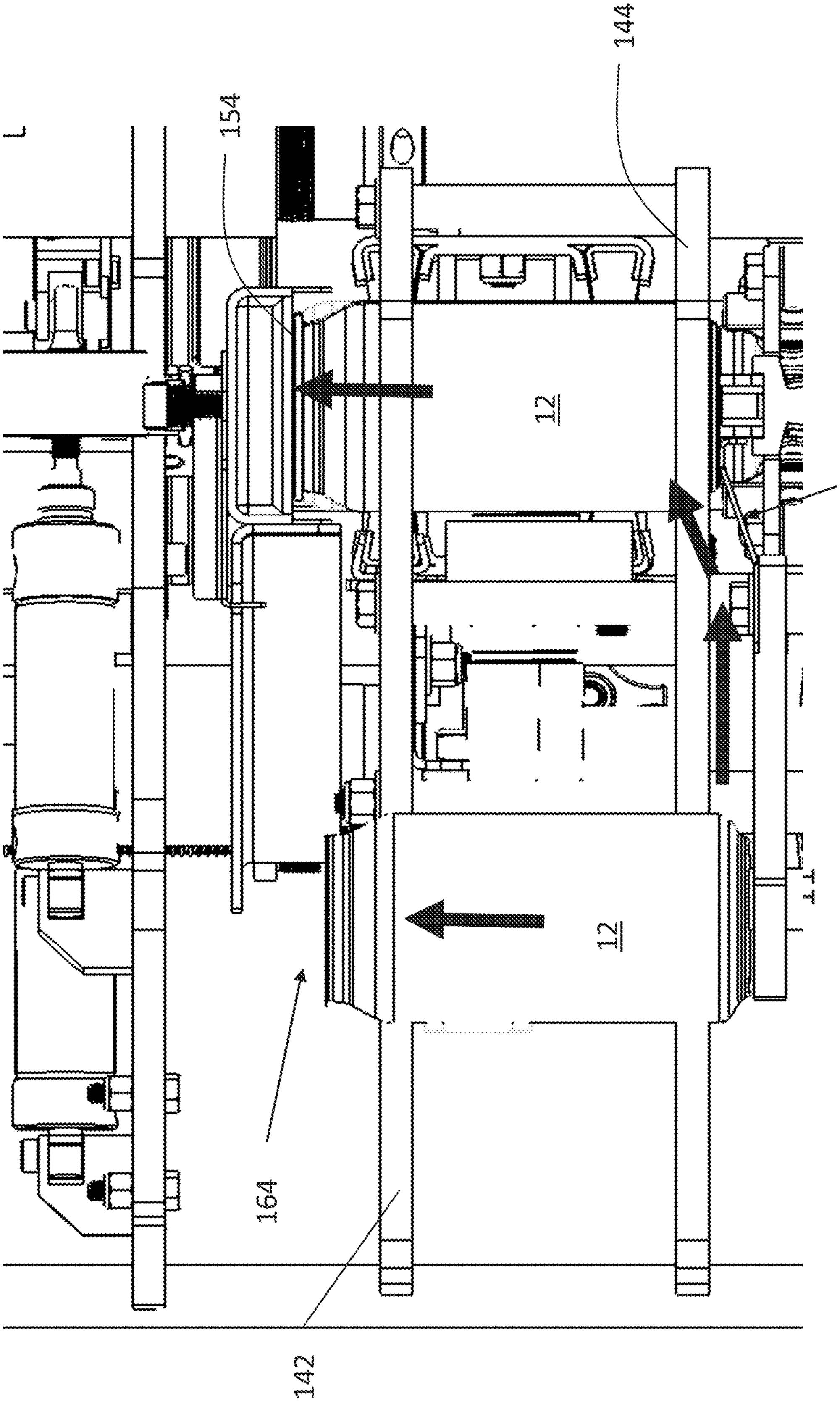
Figure 18D:
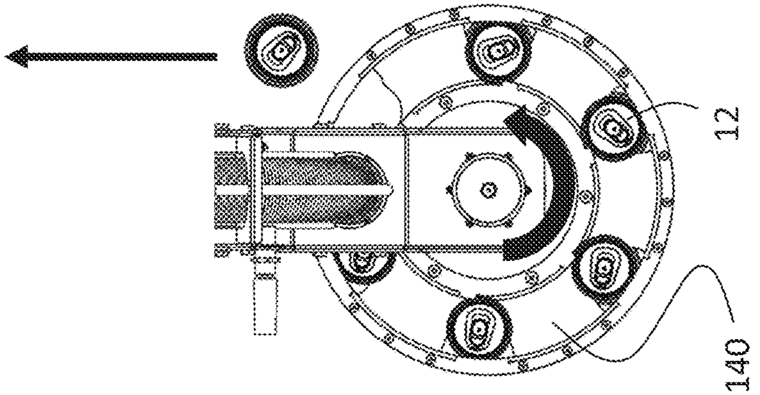
Figure 18C:
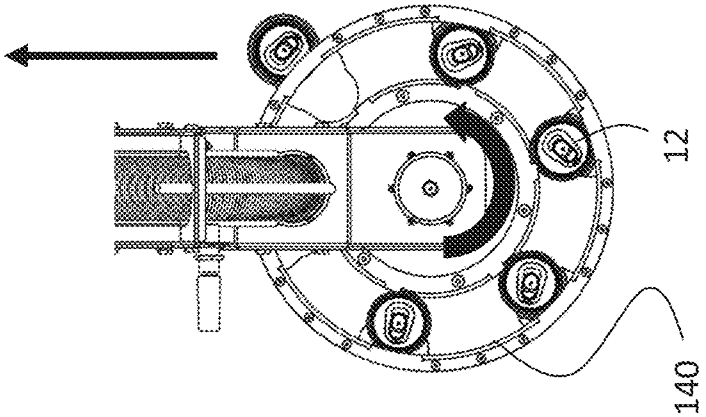
Figure 18B:
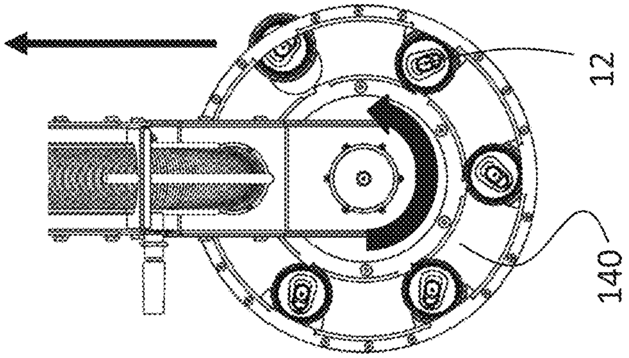
Figure 18A:
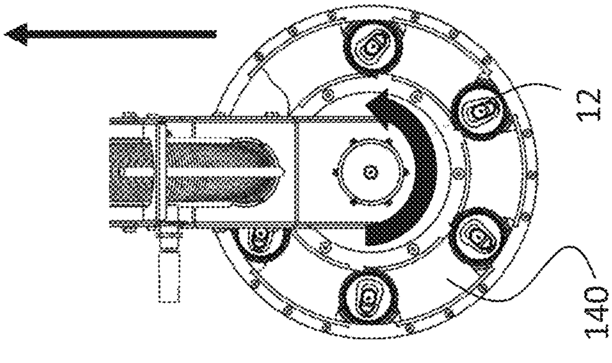

FIGS. 17A-17C illustrate the movement of the container 12 to capture the lid 154 during the degassing process. As shown in FIG. 17A, as the gas is flowed into the degassing pockets 164, the headspace of the container 12 is filled with the gas. Initially, the container 12 is positioned in a lowered position (FIG. 17A) such that the headspace is open to receiving the gas. As the container 12 rotates around the rotary gassing system 140, the container 12 is moved up a ramp 170 (FIG. 17C) which moves the top of the container 12 vertically. This position is shown in FIG. 17B. In one example, the container 12 will raise up approx. ½ inch within 1 second to meet the lid 154. During this process, the upper plate 142 and the lower plate 144 remain substantially fixed in vertical height (but the upper plate 142 is adjustable for different container sizes) but the containers 12 are moveable within the pockets of the plates 142, 144 to allow for contact with the ramp to move the container 12 upwards. FIG. 17C illustrates the movement of the container 12 on the ramp 170, whereby as the container 12 is rotated with the top and bottom plates 142, 144, the bottom of the container 12 contacts an inclined ramp 170 and is moved vertically upwards (as indicated by the arrows in FIG. 17C). This movement of the container 12 on the ramp 170 decreases the headspace of the container 12 and causes the top of the container 12 to contact the lid. The ramp 170 may be positioned to raise the container 12 from the plane of the discharge from the rotary filling system 130 to the plane of the belt 112 (FIG. 9), such that the transition closes the gap between the top of the container 12 and the bottom of the lid 154 to trap the gas within the container 12 headspace. Once on the belt 112, the container 12 with lid 154 may be moved to a closing or seaming station, which seals the lids 154 to the containers 12.

FIGS. 18A-18D are illustrations of the progression of the container 12 through the rotary gassing system 140. As can be seen, the rotary gassing system 140 moves counter clockwise and the containers 12 enter towards the left. As the container 12 moves around the rotary filling system 140 it is gassed. When the container 12 reaches the right-hand side of the rotary filling system 140, it is evacuated from the rotary filling system 140 by removing the container 12 with lid from the wheel. The container 12 then moves along a belt to the seaming station, or another station. The star wheels of the rotary gassing station 140 may move at various speeds. In one example, they move at 20 RPM. The containers 12 enter the wheel with no lid, and the fluid is positioned about ⅜" from the top of the container 12. The containers 12 then exit the wheel with a lid on top at approximately 50 containers per minute.

Figure 19:
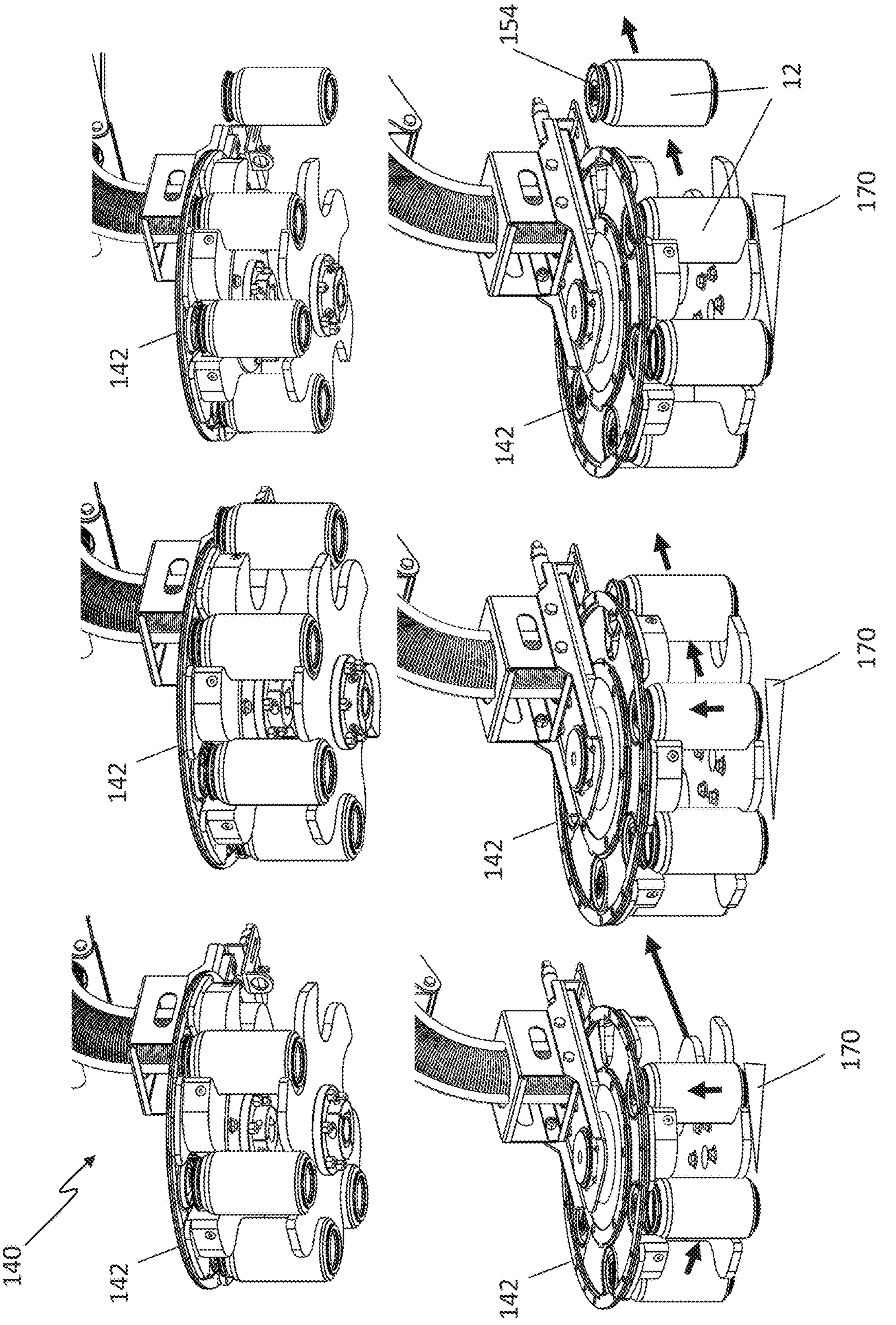

During the rotation of the containers 12 and the vertical movement by means of the ramp, the containers 12 effectively pick up the lid from the top wheel 142. FIG. 19 illustrates a progression of the container 12 picking up the lid from the top wheel 142 and being evacuated from the rotary gassing station 140.

Figure 20A:
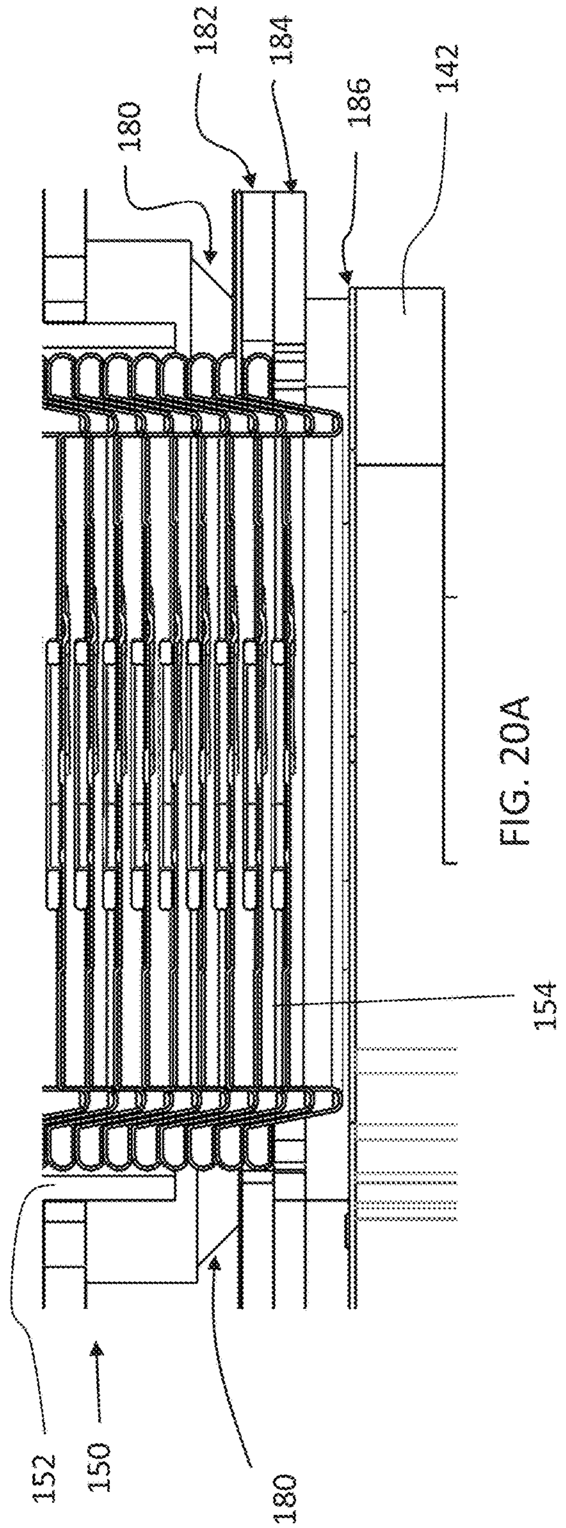
Figure 20B:
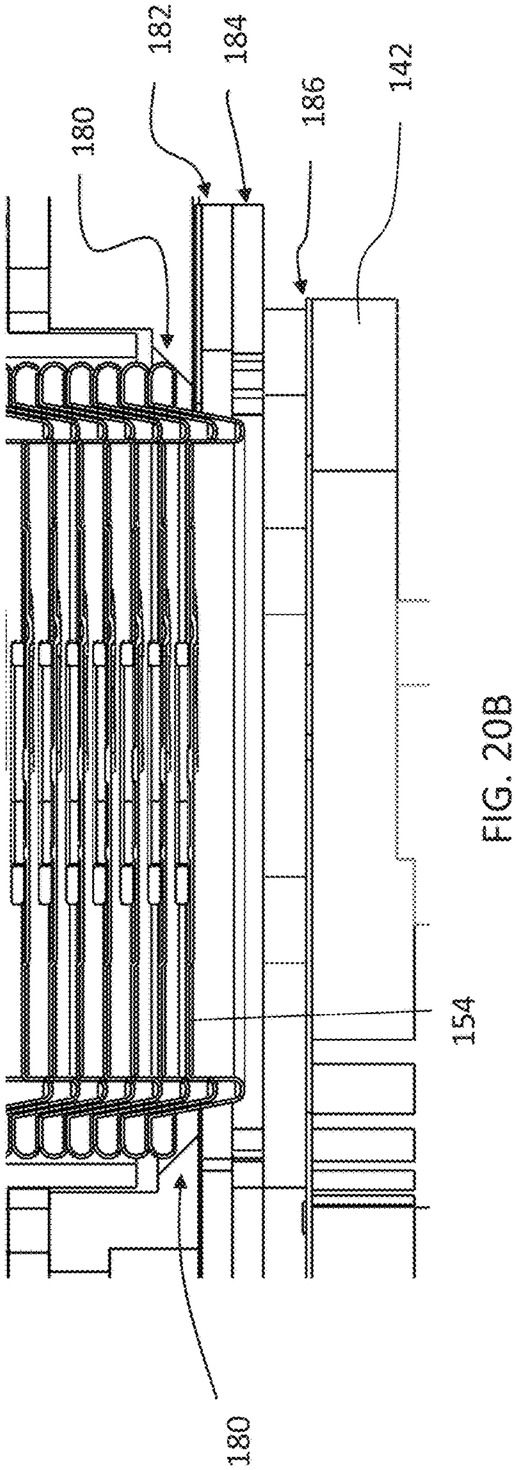

FIGS. 20A-20B illustrate how the lid 154 is released from the top wheel 142 to the container 12. As shown, a stack of lids 154 are held within a chute 152 of the lidding system 150. As the lids 154 are moved down towards the container (not shown) by gravity, a lid stop feeding gate 180 stops the feed of the stack of lids 154 and allows one lid 154 to pass below. The lid stop feeding gate 180 may move horizontally relative to the movement of the lids 154 which allow it to separate the stacked lids 154. The lid stop feeding gate 180 has a lid separator knife shelf 182 which contacts the lids 154 to separate them, allowing the one lid 154 to drop below through a lid delivery shelf 184 and to rest on a lid resting shelf 186. At this point, when a container (not shown) is positioned within the pocket of the top plate 142 of the rotary gassing system 140, the single lid 154 is held on the lid resting shelf 186 until the container is moved vertically upwards by the ramp (FIG. 19). The top edge of the container makes contact with the lid 154 to move it off the lid resting shelf 186, at which point the container with lid 154 are evacuated from the rotary gassing system 140, as shown by the progression in FIG. 19.

Figure 20C:
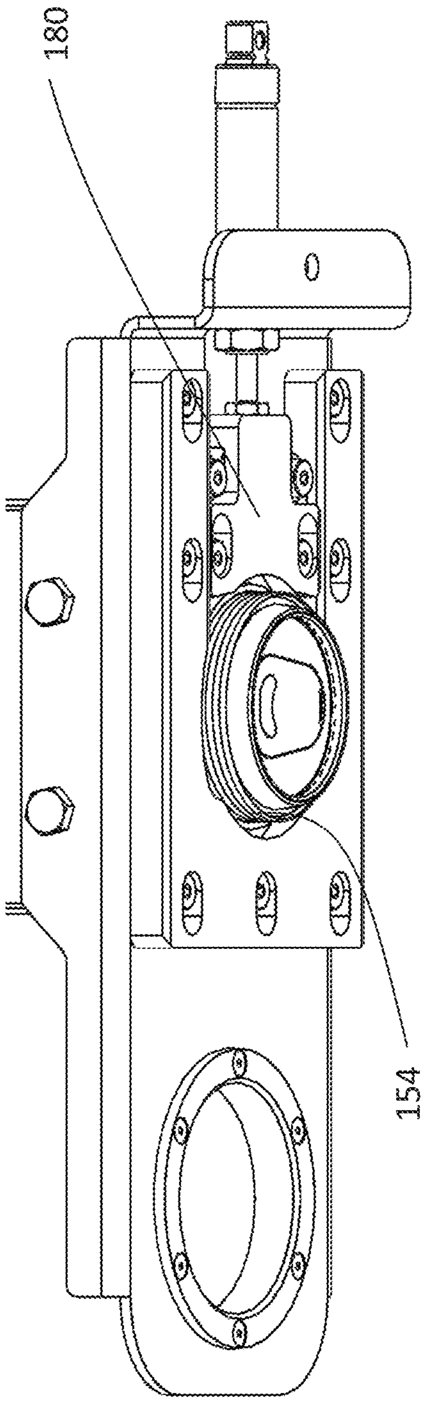
Figure 20D:
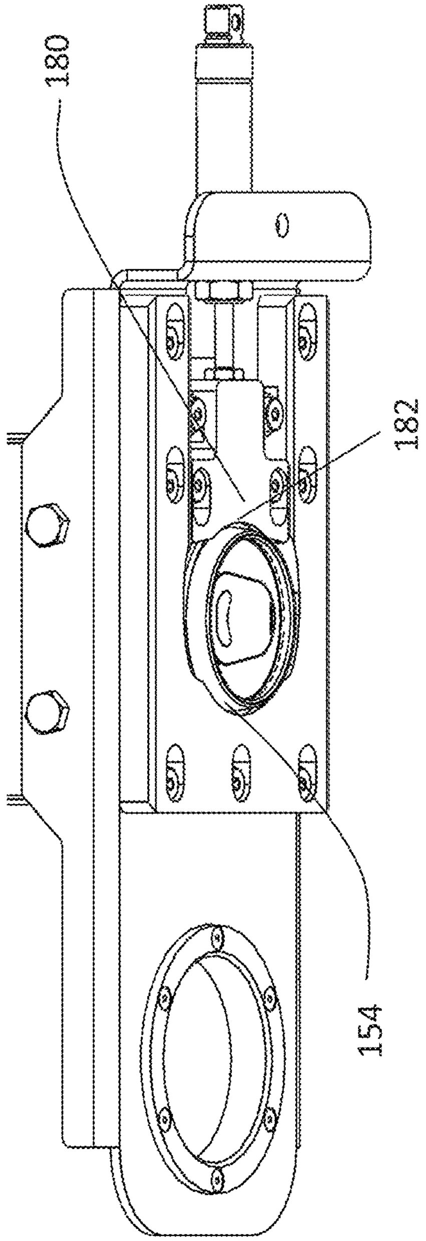

FIG. 20A illustrates the lid stop feeding gate 180 in an open position, whereby the stack of lids 154 can move vertically downwards, whereas FIG. 20B illustrates the lid stop feeding gate 180 in a closed position, preventing the stack of lids 154 from moving downwards (while allowing a single lid 154 to move downwards). FIGS. 20C-20D illustrate another view of the lid stop feeding gate 180, where the mechanical aspects of the device can be seen. FIG. 20C illustrates the lid stop feeding gate 180 in an open position, where the lid stop feeding gate 180 is horizontally removed from the stack of lids 154 while FIG. 20D illustrates the lid stop feeding gate 180 in a closed position, where it is moved horizontally inwards towards the stack of lids 154 and lid separator knife shelf 182 separates one lid (not shown) from the remaining stack of lids 154.

Figure 21A:
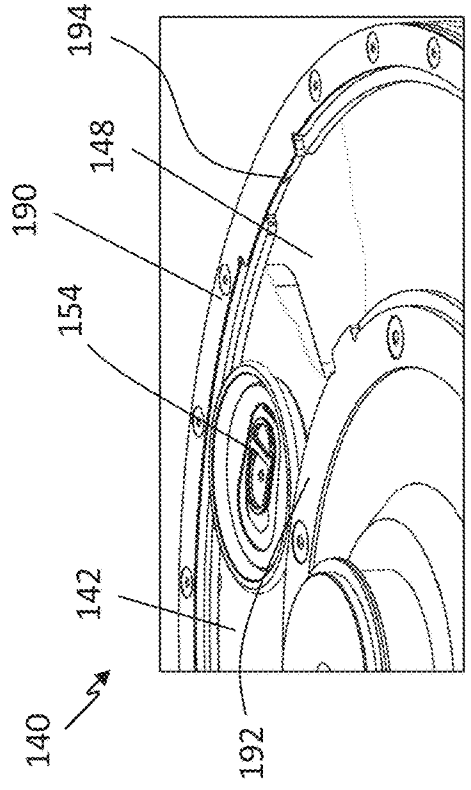
Figure 21B:
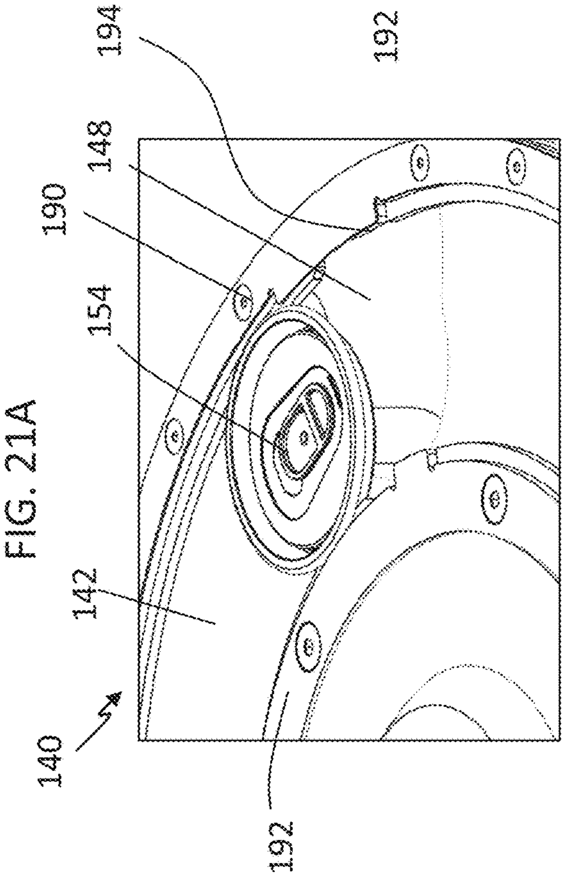
Figure 21C:
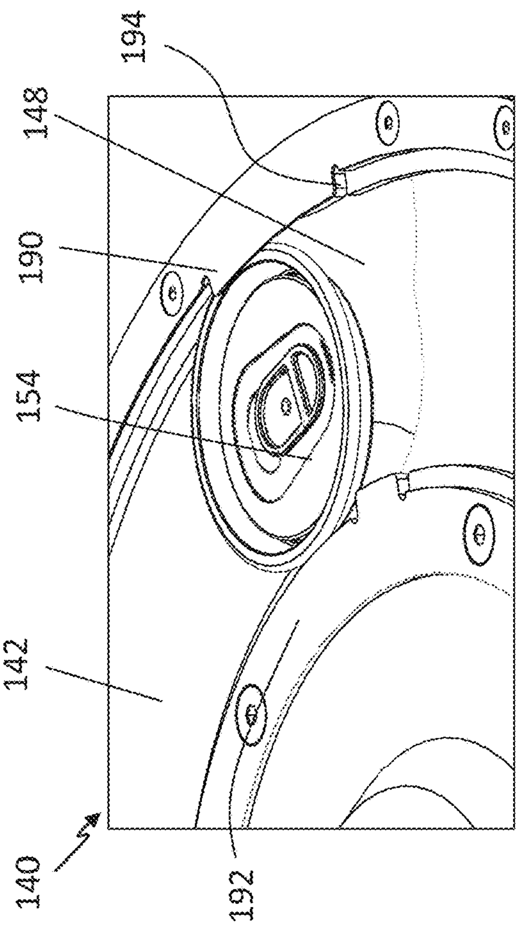
Figure 21D:
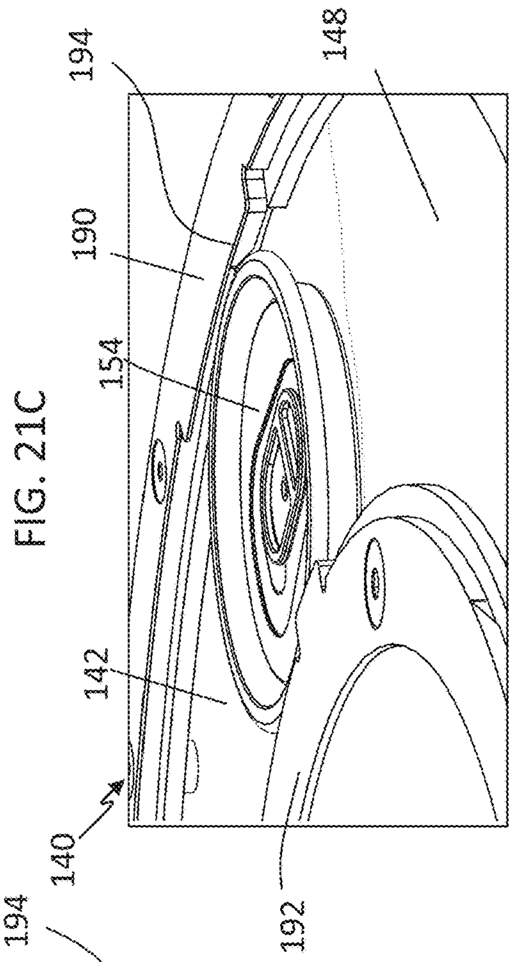
Figure 21E:
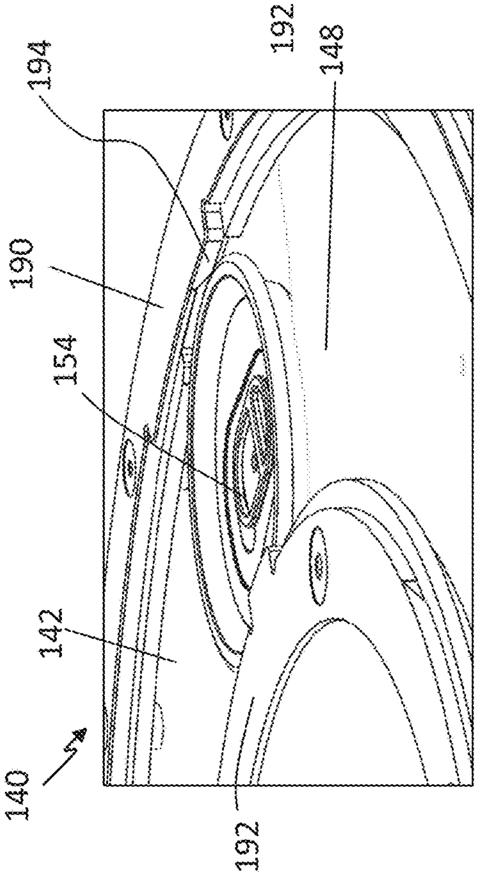
Figure 21F:
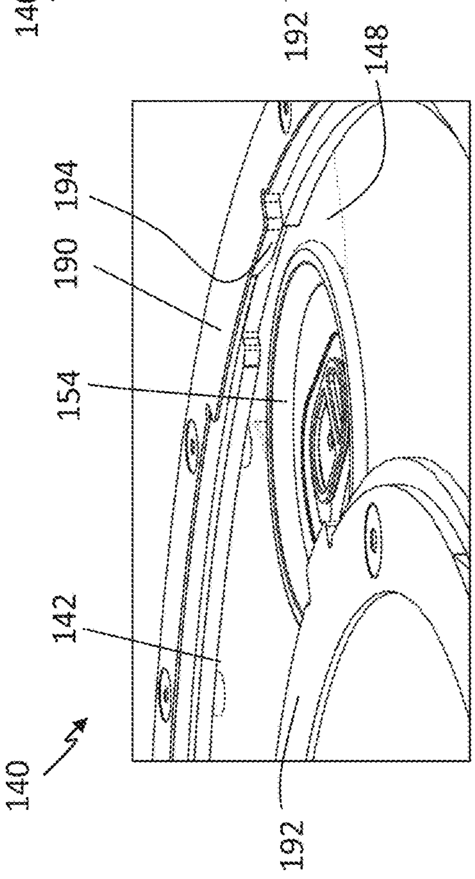
Figure 21G:
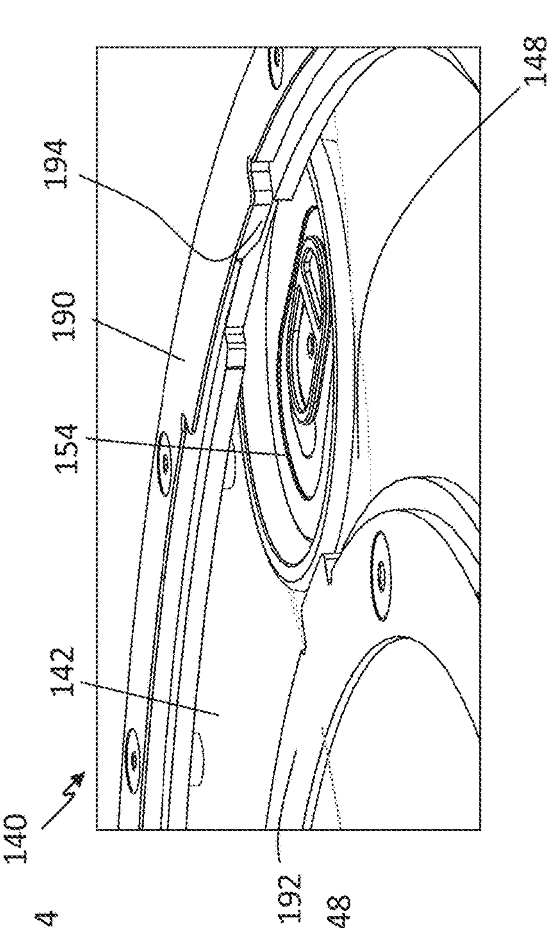
Figure 21H:
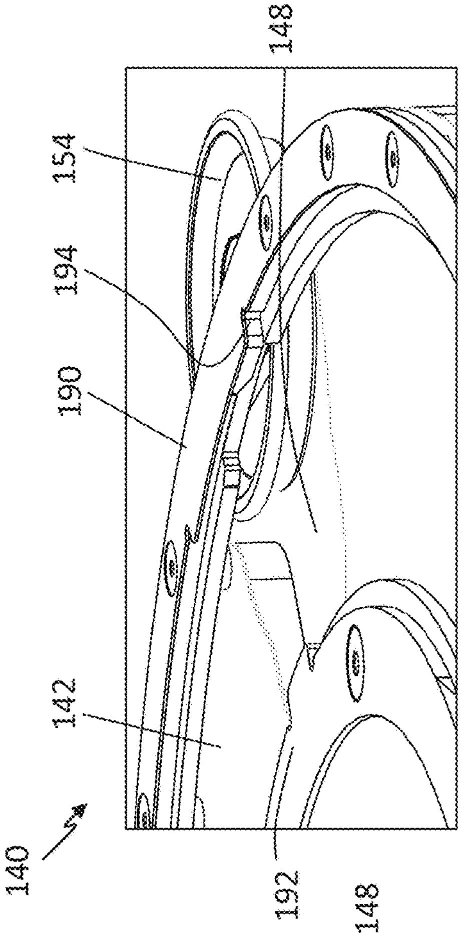
Figure 21K:
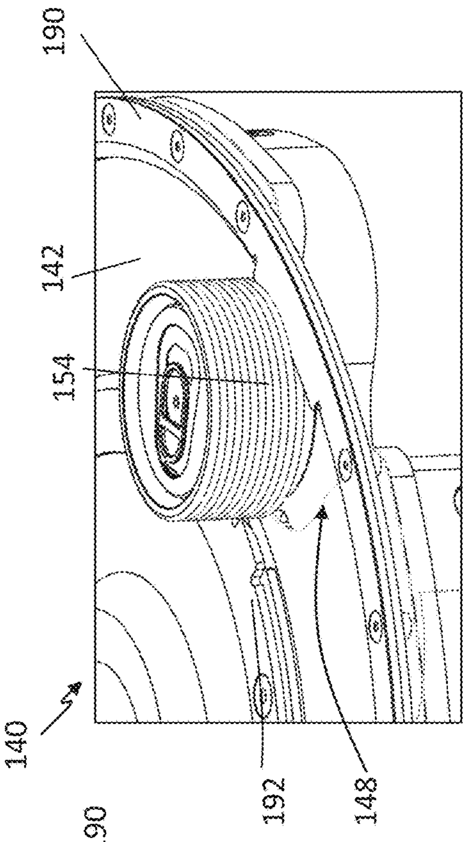
Figure 21L:
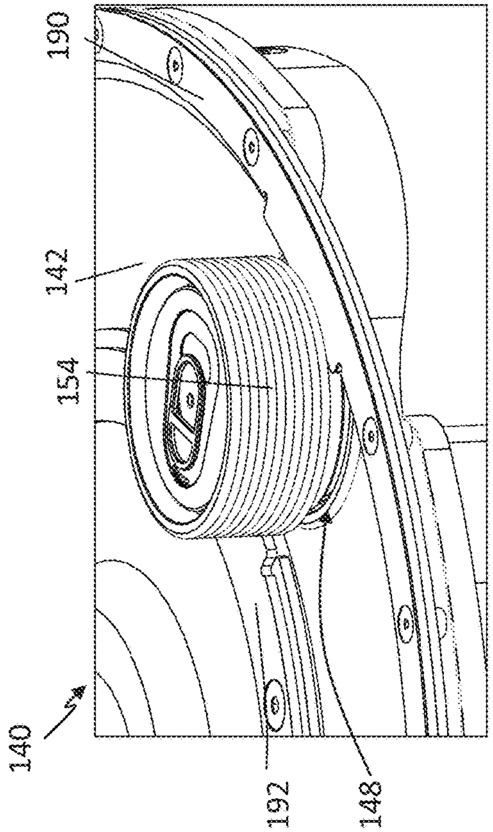
Figure 21I:
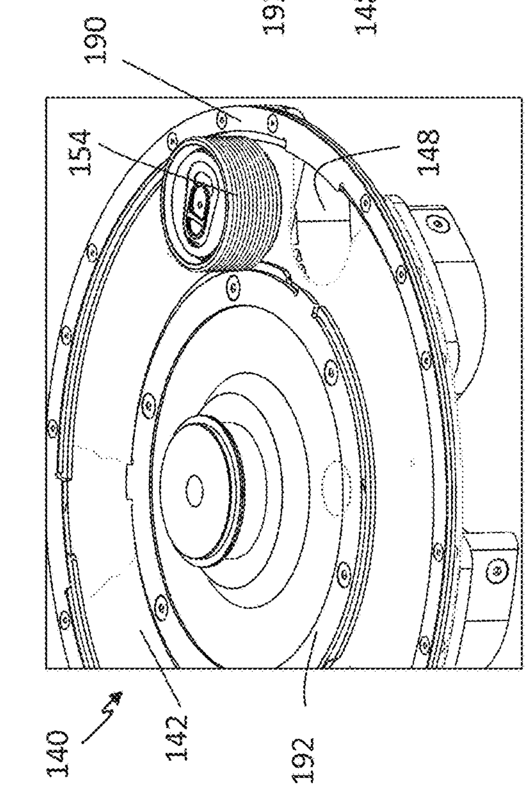
Figure 21J:
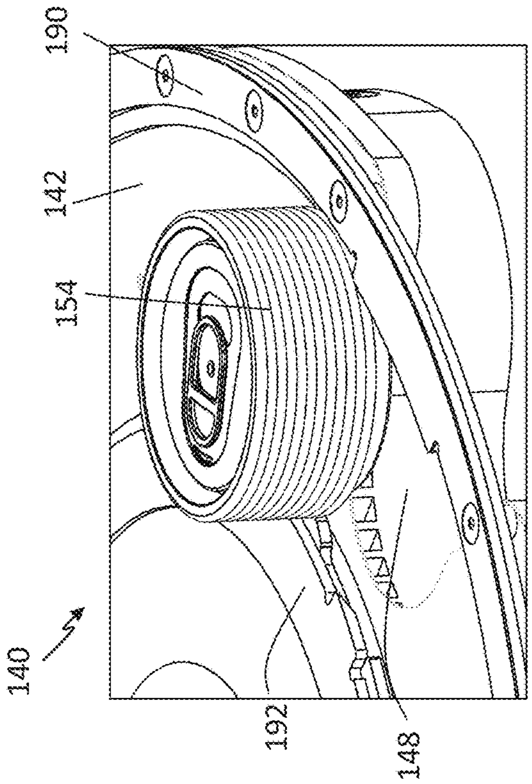

FIGS. 21A-21L illustrate additional images of the progression of the lid 154 being evacuated from the rotary gassing system 140 with a container (not shown for clarity). As can be seen, the lid 154 is moved along an outer guide 190 and an inner guide 192 of the top plate 142 towards a pocket 148 formed through the top plate 142. The lid 154 is held by the edges of the lid 154 contacting the outer and inner guides 190, 192. When the lid 154 is moved and approaches the pocket 148, the edges of the lid 154 contact an inverted ramp 194 which pushes the lid 154 vertically downwards. As the top plate 142 rotates, the lid 154 is pushed further into the pocket 148 and the inverted ramp 194 biases the lid 154 downwards until the top edge of the lid 154 is positioned substantially below the bottom edge of the outer guide 190, as shown in FIG. 21F. At this point, the lid 154 is evacuated from the top plate 142 in a substantial radial direction, where the lid 154 passes under the outer guide 190, as shown in FIGS. 21G-21H. FIGS. 21I-21L depict the same progression but with a stack of lids 154.

Figure 22:
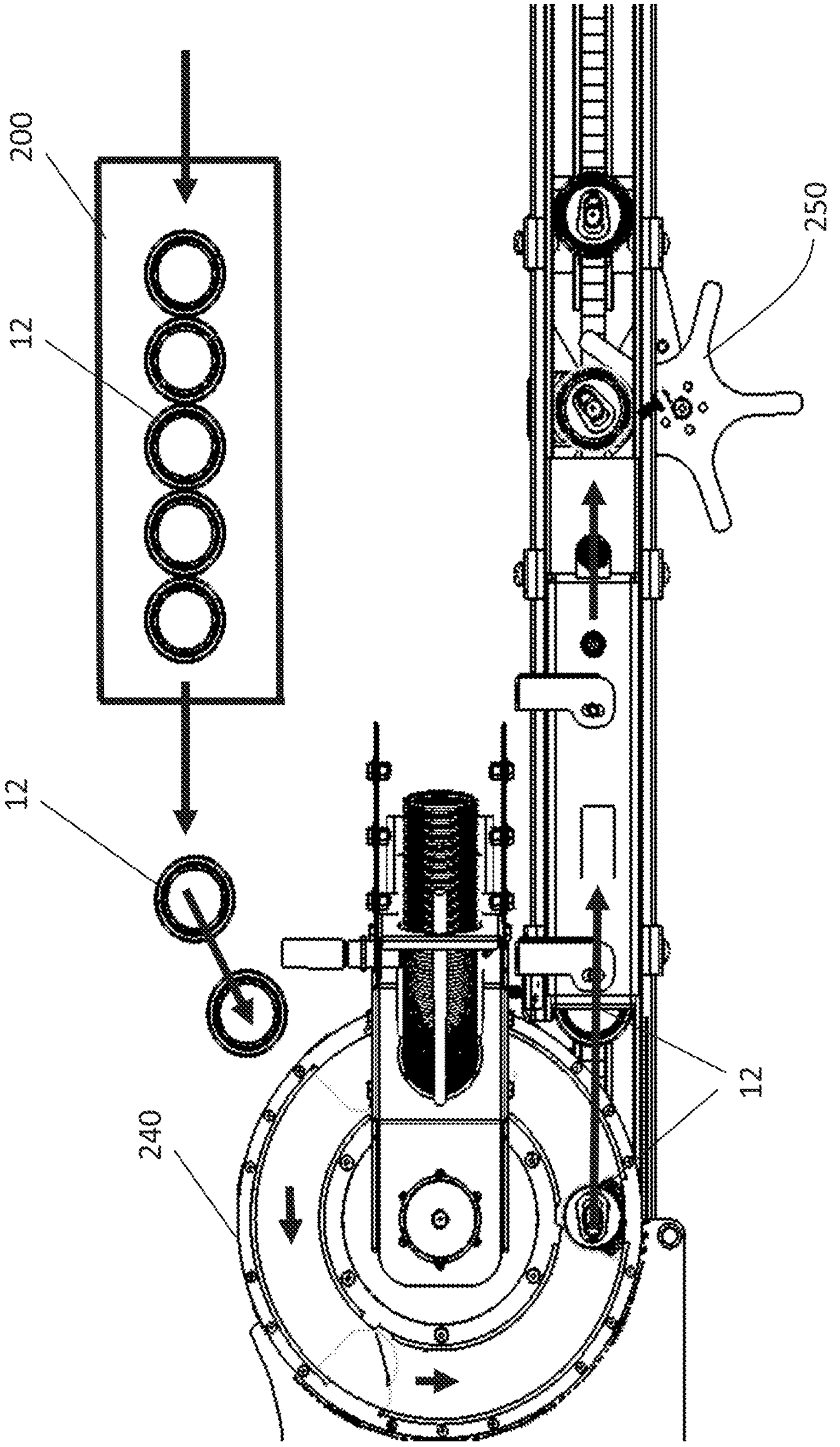

While some of the figures of this embodiment, including FIGS. 9-10, depict the rotary gassing system being used with a rotary filling system, it is noted that the rotary gassing system can also be used with an in-line filling system. For example, FIG. 22 depicts the rotary gassing system used with an inline filler having a counter pressure filling tank 200 which fills containers 12. The containers 12 are moved from the inline filler tank 200 to the rotary gassing system 240 which operates in the same manner as previously described. When the containers 12 are evacuated from the rotary gassing system 240, they are moved along a belt to the next operation, such as a seaming station which seals the lids to the containers 12.

FIG. 22 further shows the use of a star wheel 250 which can be used to manage the flow of containers 12 thought the system. The star wheel 250 is positioned along the path of movement of the containers 12 and proximate to various stations. For example, in FIG. 22, the star wheel 250 may be positioned at a seaming station, where as the container 12 progresses on the belt, the container 12 enters one pocket of the star wheel 250 which captures the container 12 and prevents it from bouncing backwards out of position of the seaming head (shown in FIGS. 3A-3B). After the seaming head completes the seam of the lid to the container 12, as described relative to FIGS. 3A-3B, the next container 12 enters the next pocket of the star wheel 250 which helps move the recently seamed container 12 from the seaming head. Without the star wheel 250, when the recently seamed container 12 lowers on to the belt, it may sit there for a longer period of time than desired, i.e., a period of time until it gets traction on the belt to move out of the way. While the use of the stop gate (reference character 40 in FIGS. 3A-3B) can be used to control movement of the containers 12, the containers 12 may be susceptible to bouncing, moving slightly backwards, or other imprecise movements when they contact the stop gate. Thus, the use of the star wheel 250 helps increase the throughput of the containers 12 through the seaming station by controlling the movement of the containers 12 better and more precisely. The star wheel 250 may also be used in other locations along the processing system to provide more precise container 12 movement control.

Figure 23A:
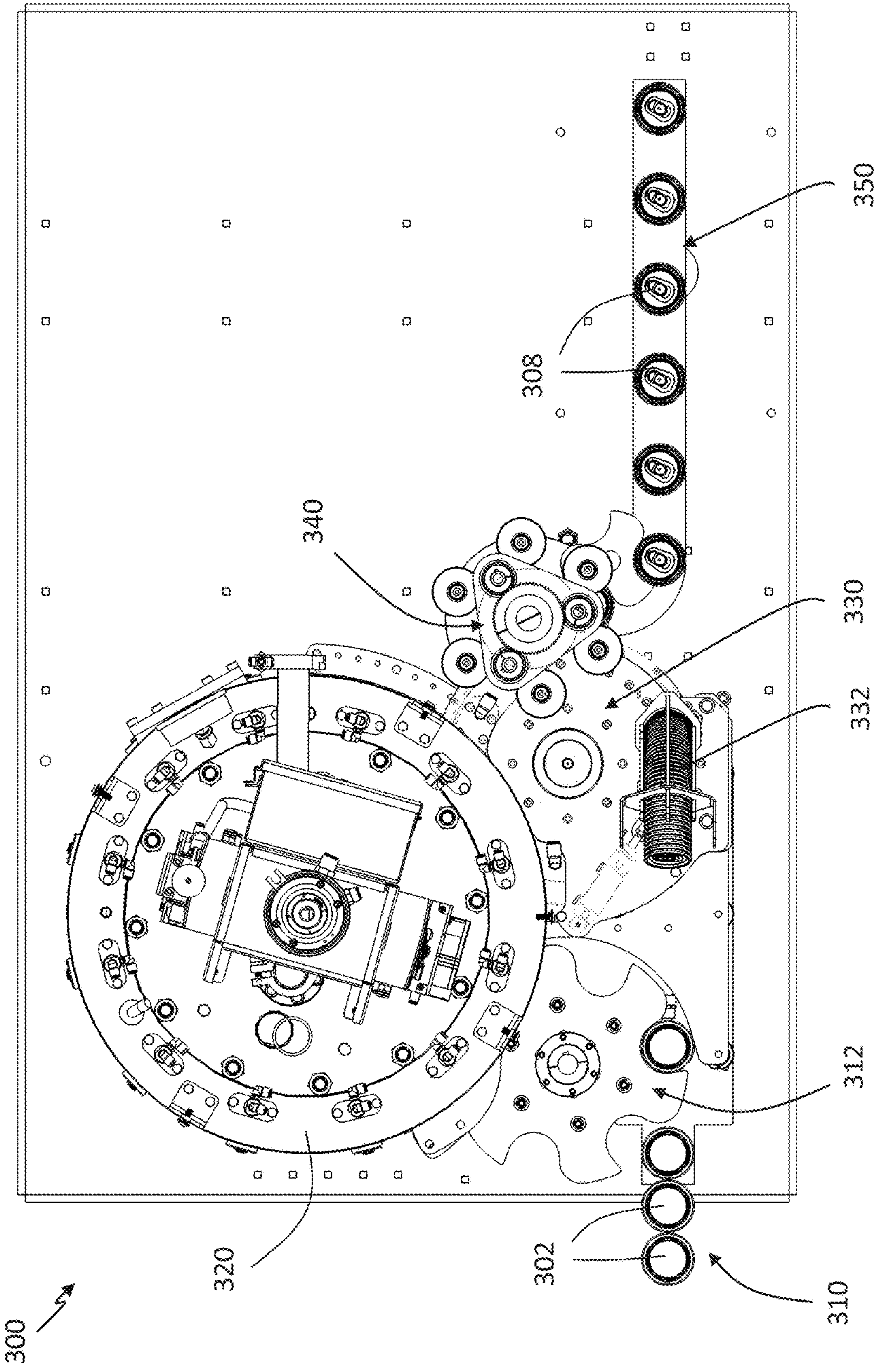
FIG. 23A is a top view illustration of an apparatus for closing fluid containers, in accordance with a third exemplary embodiment of the present disclosure.
Figure 23B:
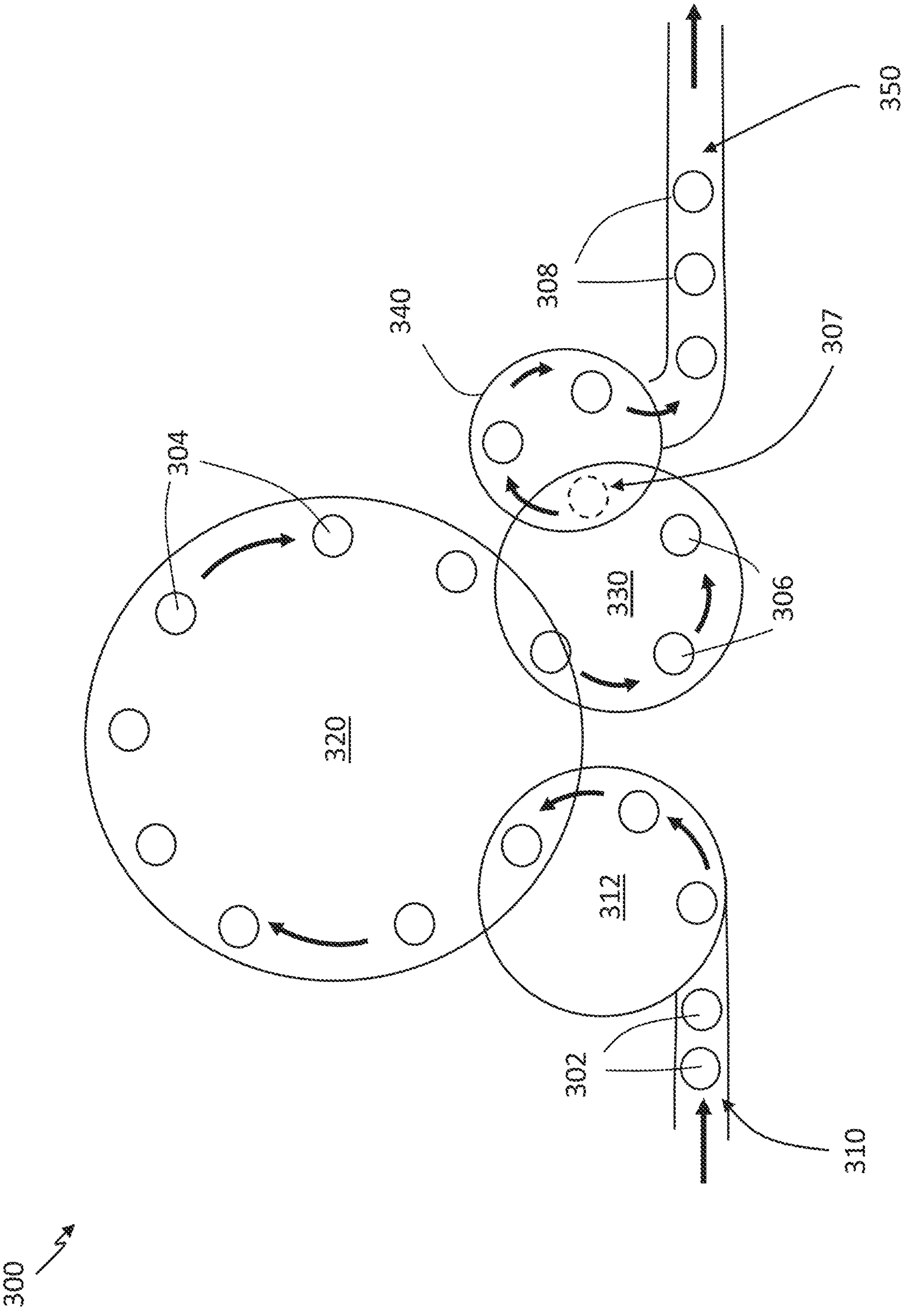
FIG. 23B is a top view diagram of the apparatus for closing fluid containers of FIG. 23A, in accordance with the third exemplary embodiment of the present disclosure.

In a third exemplary embodiment of the present disclosure, an apparatus for closing fluid containers is provided to overcome the shortcomings identified in the Background of the present disclosure. FIG. 23A is a top view illustration of an apparatus for closing fluid containers, in accordance with a third exemplary embodiment of the present disclosure, and FIG. 23B is a top view diagram of the apparatus for closing fluid containers of FIG. 23A, in accordance with the third exemplary embodiment of the present disclosure. In particular, FIG. 23B illustrates a simplified operation of the apparatus for closing fluid containers 300, which may be referred to herein as apparatus 300. As shown in FIGS. 23A-23B, a container infeed 310 is used to receive a plurality of empty fluid containers 302 in the apparatus 300. The empty fluid containers 302 are delivered from the container infeed 310 to a filling station 320 using a transfer star wheel 312, where the empty fluid containers 302 are diverted from the substantially linear path of the container infeed 310 to a rotational path of the filling station 320. Within the filling station, the empty fluid container 302 is at least partially filled with a quantity of fluid in an interior space of the fluid container 302, which results in the empty fluid container 302 becoming a fluid filled container 304.

The fluid filled container 304 then passes to a rotary gassing station 330 which receives the fluid filled container 304 from the filling station 320. In the rotary gassing station 330, the fluid filled container 304 is subjected to a degassing operation, where a quantity of gas, such as CO2, is applied to the opening of the fluid filled container 304 to replace ambient air which is proximate to the fluid within the top space of the fluid filled container 304, such that the interior space of the fluid filled container 304 contains fluid and gas therein, to thereby provide a fluid and gas filled container 306, as shown in FIG. 23B. A lid from a lid chute 332 is then provided to the fluid and gas filled container 306 within the rotary gassing station 330 in a fast manner to close the opening of the fluid and gas filled container 306 before the CO2 gas or other gas escapes.

After the fluid and gas filled container 306 has a lid positioned on an opening thereof, it is then transferred directly to a rotary seaming station 340 which is positioned proximate to the rotary gassing station 330. The rotary seaming station 340, in general operation, receives the fluid and gas filled container 306 and seams the lid to the container 306, to thereby produce a closed container 308. When the lid is seamed to the opening of the container 306, the fluid and the gas in the interior space of the container 306 is sealed from the outside atmosphere. Seaming the lid to the fluid and gas filled container 306 may include the use of a seaming chuck and roller wheels, as described in greater detail relative to FIGS. 24-26C and 28A-28B. While the subject disclosure discloses the use of a seaming station to seam a lid to a container, it is noted that the rotary seaming station 340 may also be capable of closing containers by other processes and techniques, such as with caps, threadable lids, or other structures.

The lid seaming operation occurs in the rotary seaming station 340, but the fluid and gas filled container 306 is initially placed in contact with the rotary seaming station 340 while it is still located in the rotary gassing station 330. In particular, while the fluid and gas filled container 306 is positioned in a recess of a star wheel of the rotary gassing station 330, at least one container piston of the rotary seaming station 340 contacts the fluid and gas filled container 306 and moves it into the radial path of the rotary seaming station 340, where the fluid and gas filled container 306 has the lid seamed. After the lid is sealed to the opening, the closed container 308 may then exit the rotary path of the rotary seaming station 340 on a container discharge path 350.

In many instances, it is highly desirable to place the lid on the opening of the fluid and gas filled container 306 at the earliest opportunity possible, and then seam the container 306 without delay. As previously described relative to other figures, the apparatus 300 may utilize a rotary gassing station where the lid is dropped through a top plate and on to the opening of the container 306. To ensure that the lid is sealed at the earliest time possible, the container 306 is to be transferred to the rotary sealing station 340 at the quickest time possible. To achieve this fast timing of the handoff between the gassing and the seaming stations, as shown in FIG. 23B, the pitch diameters of the rotary gassing station 330 and the rotary seaming station 340 may be coincidence, in that, the footprints of the rotary structures forming the rotary gassing station 330 and the rotary seaming station 340 overlap. In this overlapping position, where the rotary seaming station 340 is at a direct output of the rotary gassing station 330, an unsealed but lidded container 307 may be transferred from the rotary gassing station 330 to the rotary seaming station 340.

Figure 24:
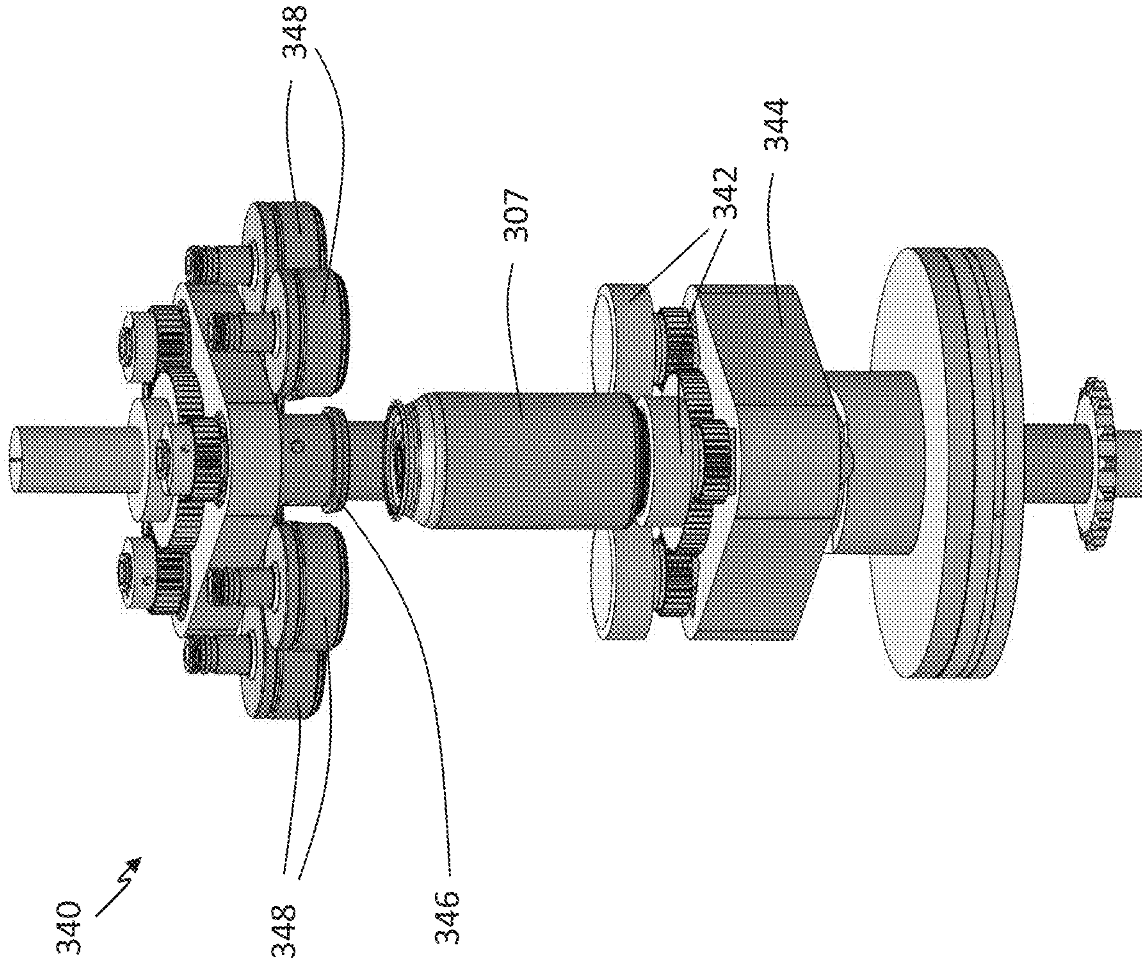
FIG. 24 is a plan view illustration of a rotary seaming station of the apparatus for closing fluid containers, in accordance with the third exemplary embodiment of the present disclosure.
Figure 25:
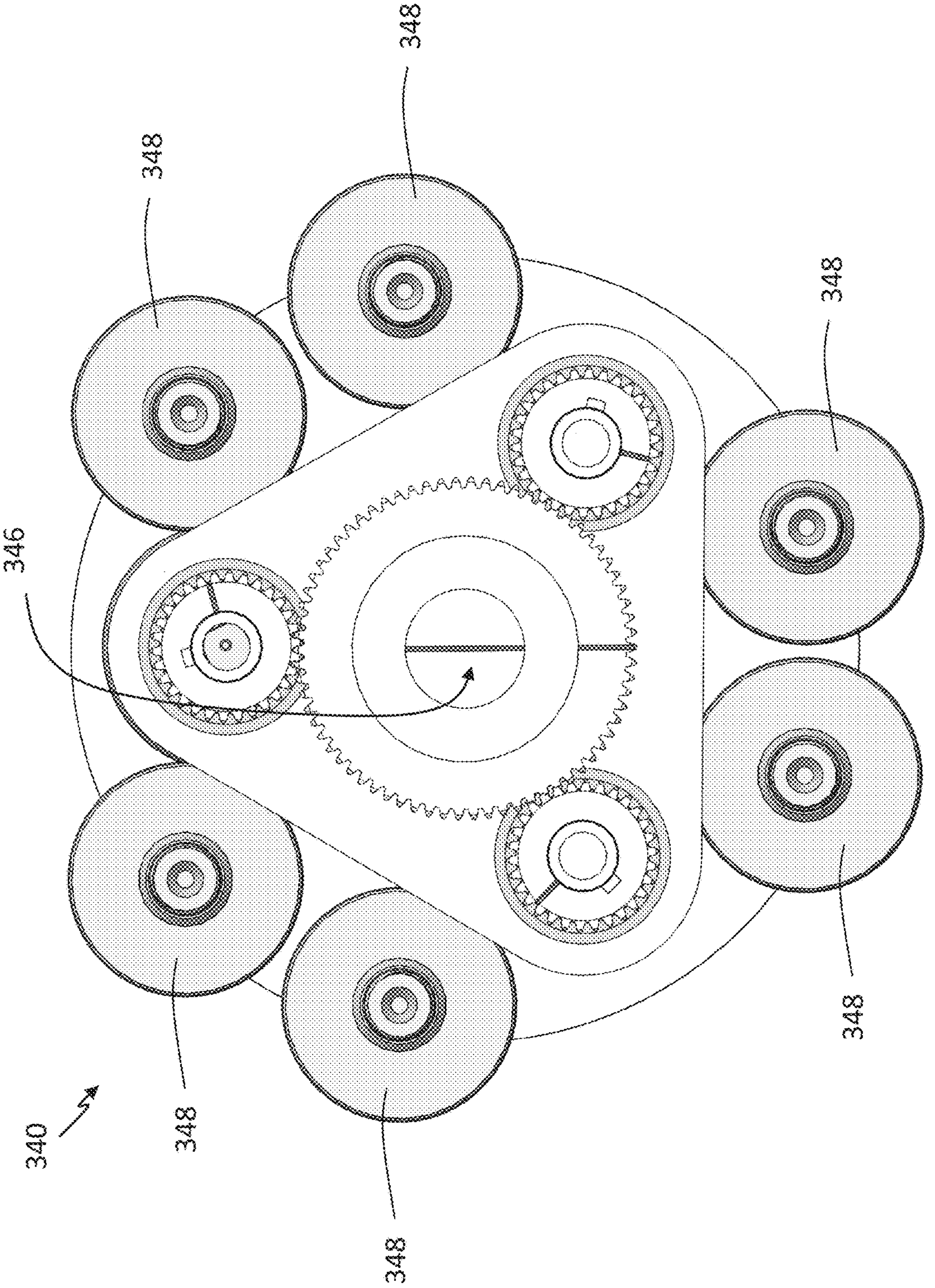
FIG. 25 is a top view illustration of the rotary seaming station of FIG. 24, in accordance with the third exemplary embodiment of the present disclosure.
Figure 26B:
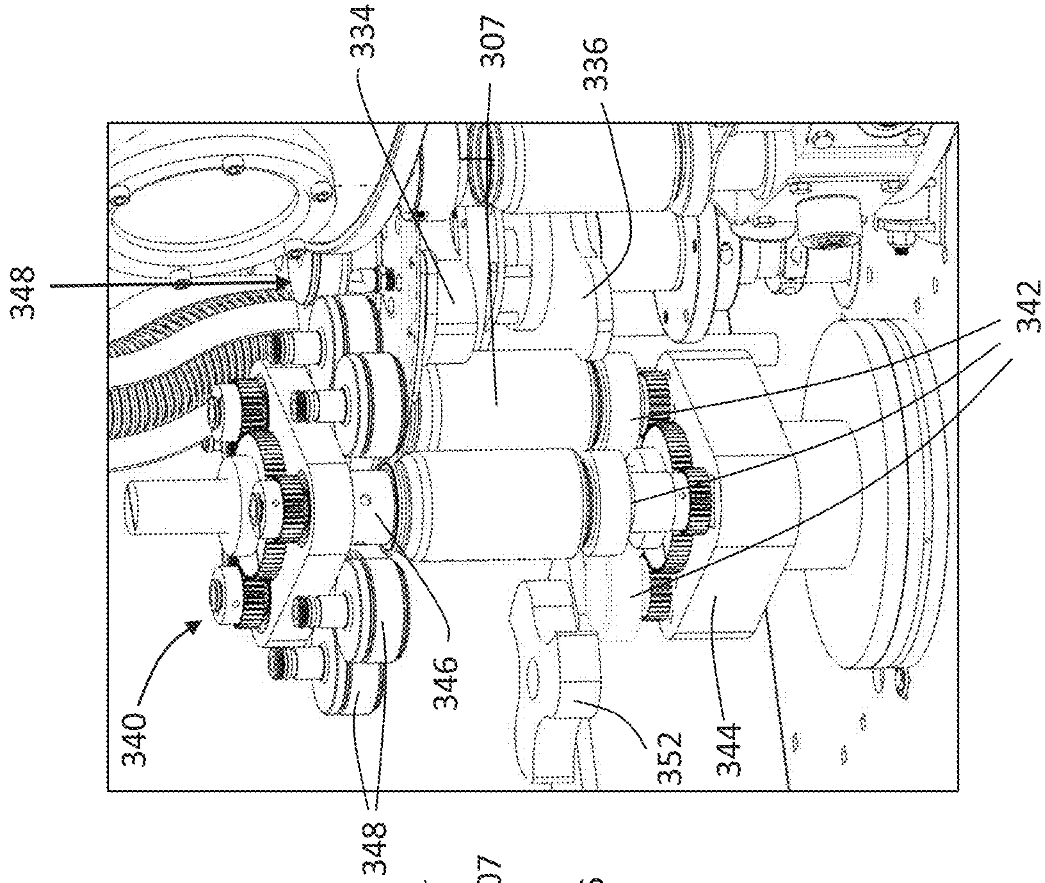
FIGS. 26A-26C are plan view illustrations of the rotary seaming station of the apparatus for closing fluid containers, in accordance with the third exemplary embodiment of the present disclosure.
Figure 26A:
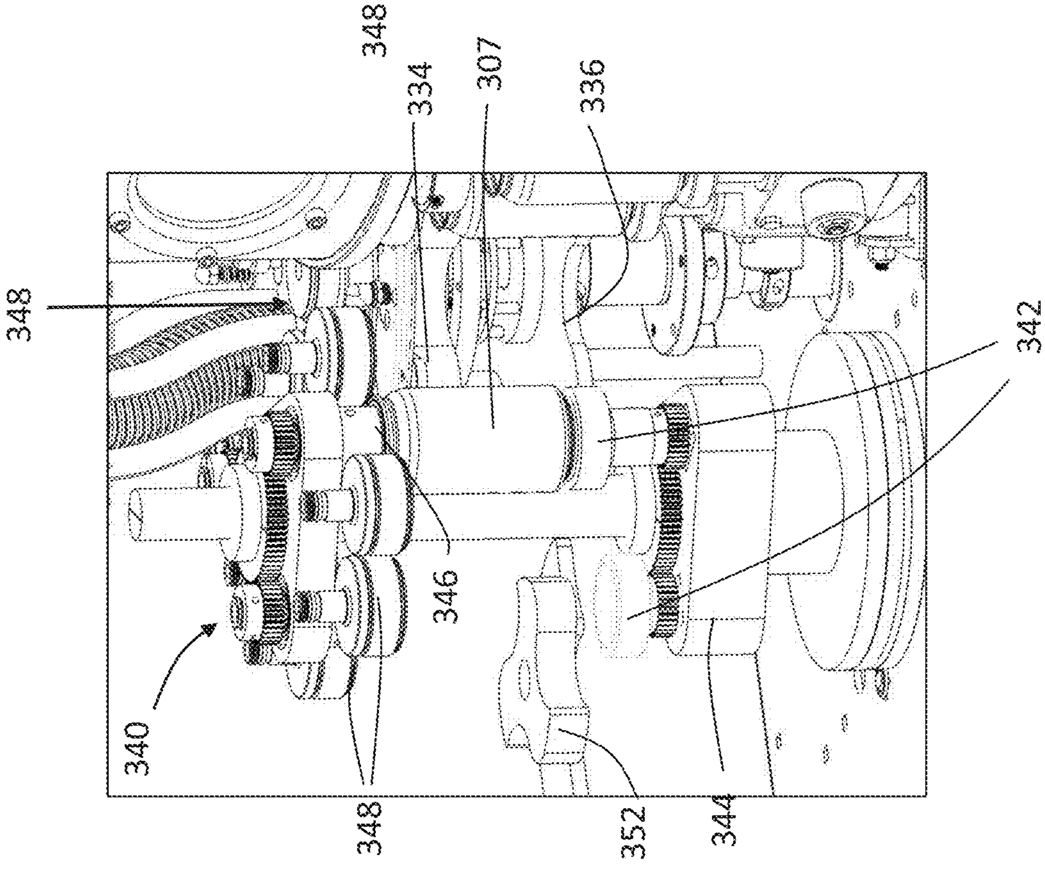
Figure 26C:
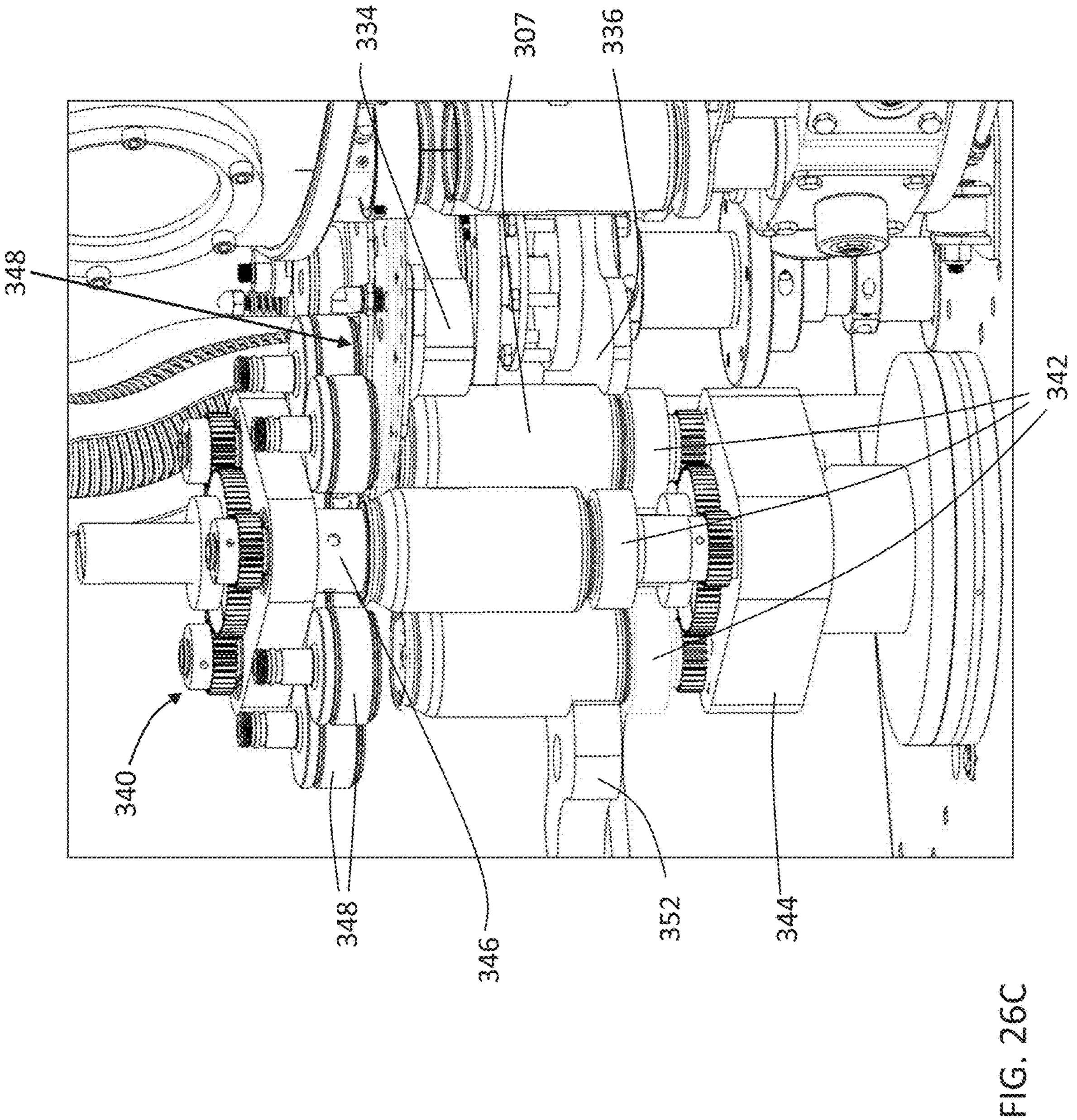

FIGS. 24-26C further describe the handoff process of the unsealed but lidded container 307. With reference to FIGS. 23A-26C, the rotary seaming station 340 has at least one container piston 342 which is positioned on a carriage 344 which rotates around a central vertical axis of the rotary seaming station 340. The lidded but unsealed container 307 is positionable on the top of the container piston 342, as shown in FIG. 24. It is noted that the rotary seaming station 340 may include any number of container pistons 342, such as three container pistons 342 as shown in the figures. The container piston 342 is positioned vertically below at least one seaming chuck 346 and a plurality of seaming wheels 348. The seaming chuck 346 and the seaming wheels 348 are used to removably contact the container 307 in order to seam the lid to the opening of the container 307. As shown in FIGS. 24-25, in the exemplary instance of the apparatus 300, the rotary seaming station 340 may have at least three container pistons 342 and at least six seaming wheels 348, where the container 307 is moved to contact at least two of the at least six seaming wheels 348 and the seaming chuck 346 simultaneously when the lid is seamed to the opening of the container 307.

Each of the container pistons 342 are movable fully around a center axis of the rotary seaming station 340, such that they can rotate without limitation around the center axis of the rotary seaming station 340 in a repeatable manner to provide continuous seaming of the containers 307. It is noted that it may be preferable for the container pistons 342 to be container lift pistons 342 which raise and lower in a vertical direction, such that the container 307 can be raised or lowered vertically during the seaming operation. In another example, it may be possible to maintain the container pistons 342 as vertically stationary structures where other components of the rotary seaming station 340 move vertically. It is noted that the turret of the various rotary stations may be adjustable to account for containers 307 having different heights and sizes.

With reference to FIGS. 23A-23B and 26A-26C, the handoff operation of the container 307 is described. The rotary gassing station 330 may include at least one star wheel with a plurality of container receiving areas, but in most situations, the rotary gassing station 330 will include an upper star wheel 334 and a lower star wheel 336, where each of the star wheels 334, 336 have a container receiving area, e.g., a portion of the star wheel 334, 336 which is contoured or has a cut-out portion which is sized to fit the container 307, such that when the star wheels 334, 336 are rotated, the container 307 is in contact with the container receiving area and moves in the rotational path.

The movement of the container 307 by the container piston 342 of the rotary seaming station can be understood as being between at least two radial positions: a first radial position where the container 307 is positioned within one of the plurality of container receiving areas of the star wheels 334, 336, and thus still within the rotary gassing station, and a second radial position where the lid is seamed to the opening of the container 307. The container piston 342 may also move the container 307 to additional positions, such as a third radial position where a guide star wheel 352 exits the container 307 from the rotary seaming station 340 to the container discharge path 350.

The container piston 342 first contacts the container 307 while it is in the rotary gassing station 330 from a position underneath the container 307. While the container 307 is still within the rotary gassing station 330, the container piston 342 maintains contact with the container 307 and moves it away from the rotary gassing station 330, e.g., out of the rotational path of the rotary gassing station 330, and on to the rotary path of the rotary seaming station 340. The container piston 342 maintains contact with the container 307 while it is moved around the rotary seaming station 340, such as during a raising and a lowering vertically of the container 307 to the seaming chuck 346 and seaming wheels 348. As such, the container piston 342 effectively holds the container 307 between the two aforementioned radial positions, including the first radial position when the container 307 is within the rotary gassing station 330 to the second radial position when the lid is seamed to the opening of the container 307 at or near the conclusion of the seaming process. In the first radial position, the container 307 may be in contact with at least one of the plurality of container receiving areas of the upper and lower star wheels 334, 336 while it is positioned in contact with the container piston 342 of the rotary seaming station 340.

Unlike conventional seaming apparatuses which utilize a belt or similar conveyance mechanism to transport containers from a gassing station to a seaming station, where the conventional seaming station is positioned a distance away from the gassing station, the apparatus 300 does not use a belt or intermediary conveyance mechanism. In particular, the apparatus 300 utilizes rotary gassing and seaming stations 330, 340 which are in direct working operation with one another, since the rotary gassing and seaming stations 330, 340 have a pitch diameter which is coincident with one another, and the container piston 342 of the rotary seaming station 340 can move the container 307 from the rotary gassing station 330 directly to the rotary seaming station 340 without a belt or conveyance device. Specifically, as described herein, the use of the container piston 342 to transport the container 307 from the pockets or recesses of the star wheels 334, 336 of the rotary gassing system 330 to the rotary seaming station 340 means that a traditional conveyance belt which is used with conventional devices is neither needed nor used.

Figure 27A:
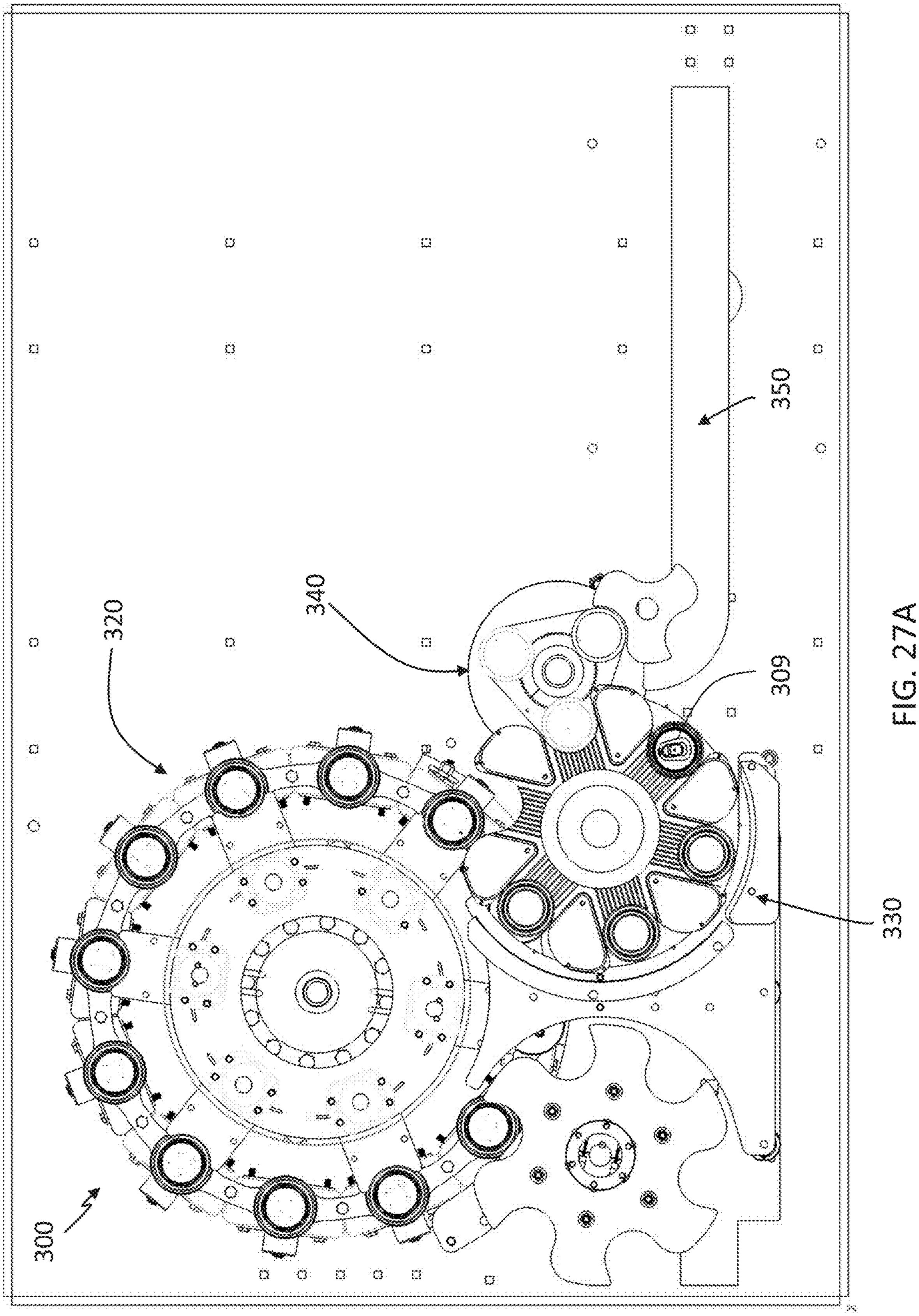
FIGS. 27A-27F are top view illustrations of the rotary seaming station of the apparatus for closing fluid containers showing a sequential process, in accordance with the third exemplary embodiment of the present disclosure.
Figure 27B:
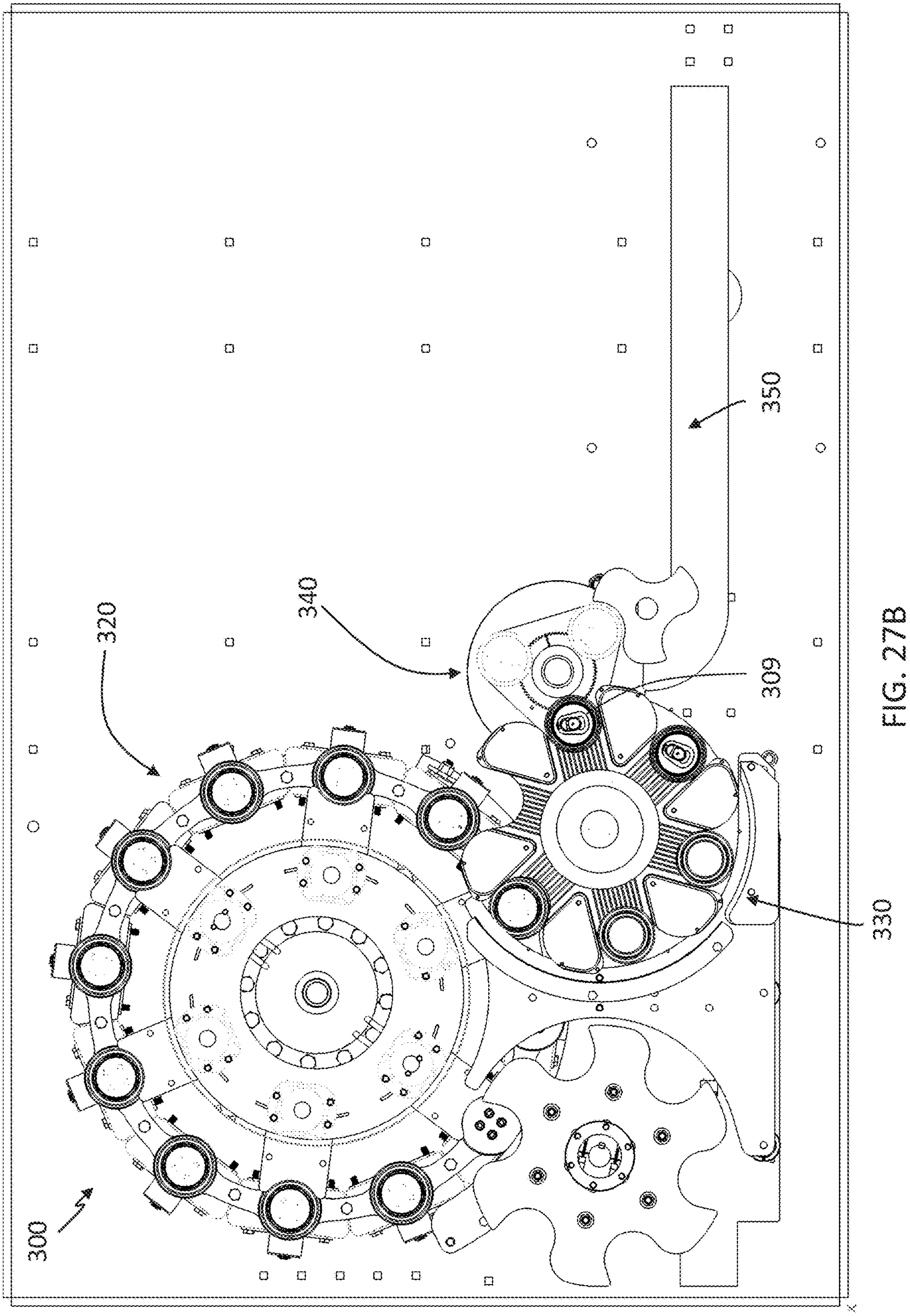
Figure 27C:
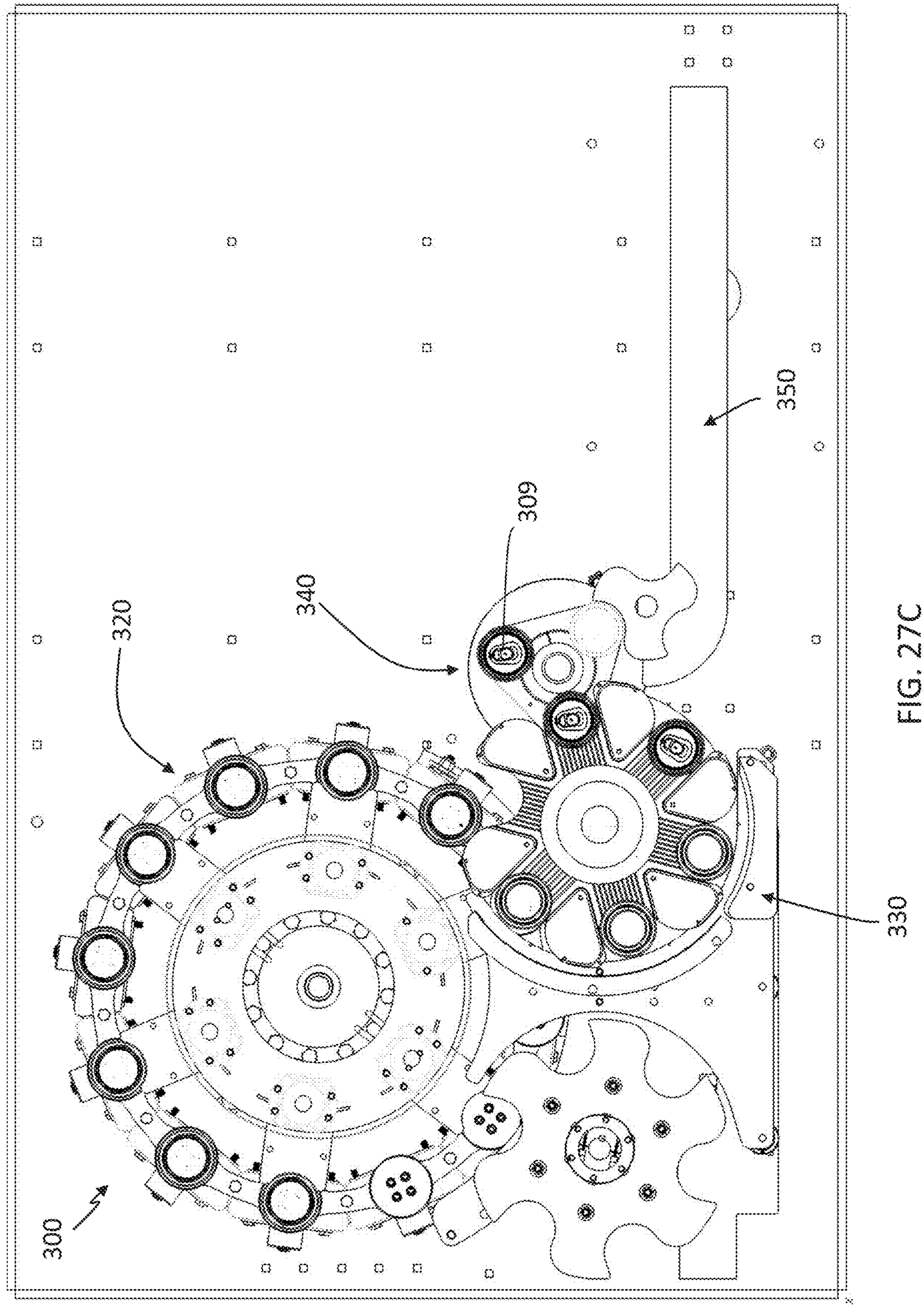
Figure 27D:
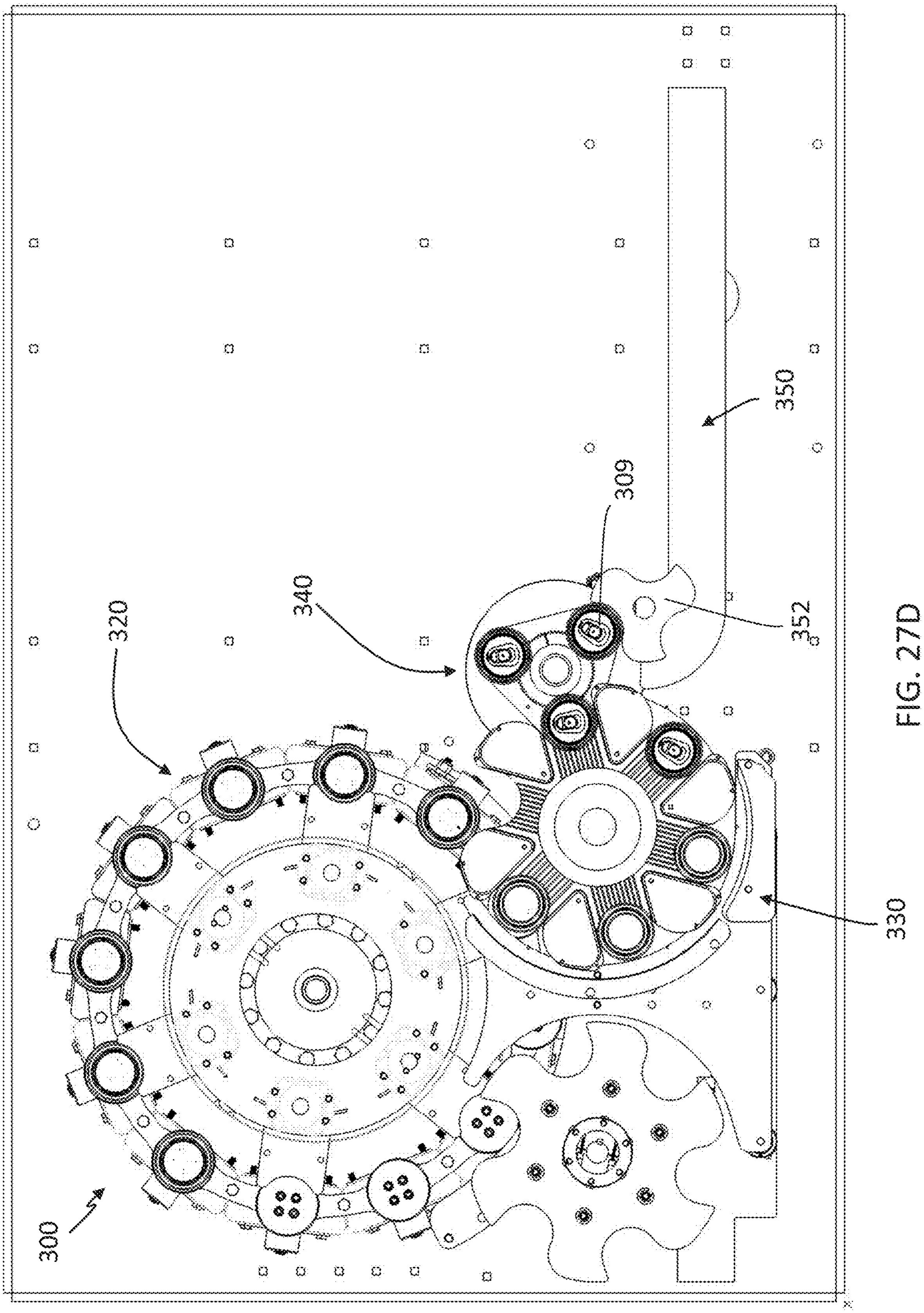
Figure 27E:
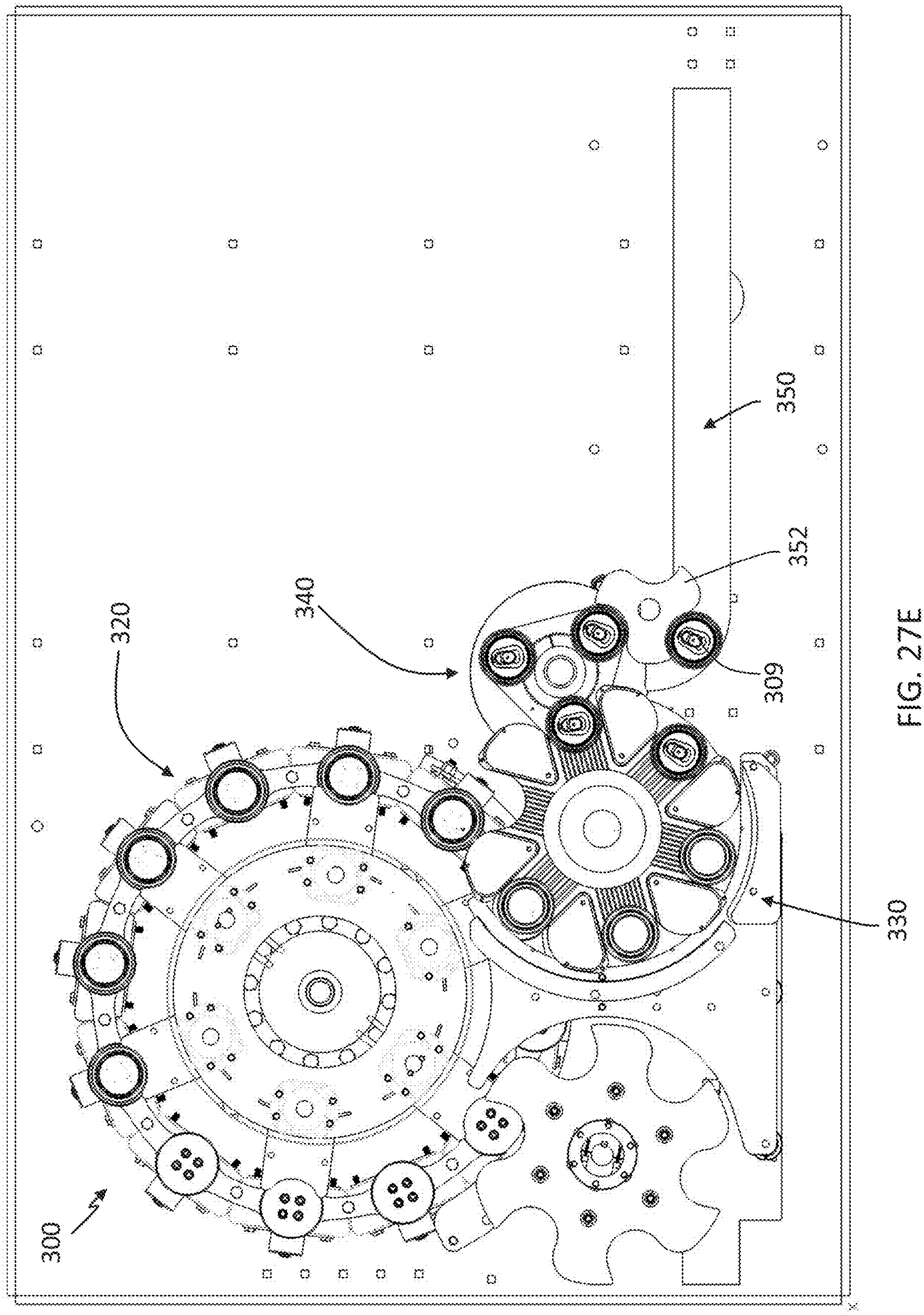
Figure 27F:
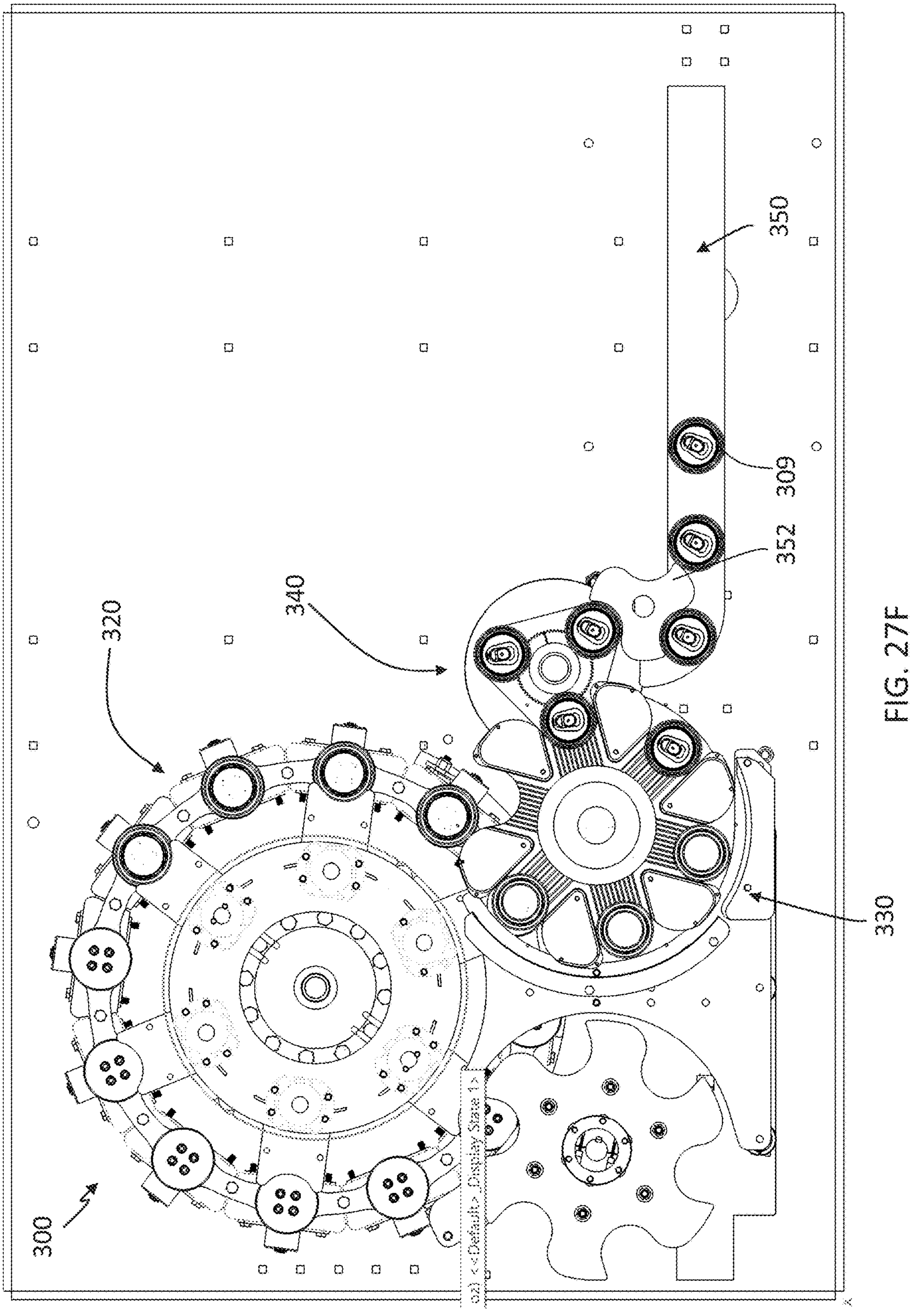

A sequential depiction of the process is shown in FIGS. 27A-27F, which are top view illustrations of the rotary seaming station of the apparatus for closing fluid containers 300, in accordance with the third exemplary embodiment of the present disclosure. In particular, FIGS. 27A-27F depict the processing of an exemplary container 309. As shown in FIG. 27A, the container 309 is positioned within the rotary gassing station 330, as it has already been filled with fluid in the rotary filling station 320. The container 309 has also been supplied with a lid positioned over the top opening of the container 309, but the lid has not yet been sealed or seamed to the container 309. In FIG. 27B, the container 309 has been moved into the position where it is contacted by a container piston 342 (not shown in FIG. 27B, but shown in FIGS. 24-26C). In this location, the container 309 is positioned in the coincidence position of the pitch diameters of the rotary gassing and seaming stations 330, 340, such that it is contacted by the star wheels of the rotary gassing station 330 and the container piston of the rotary seaming station 340. In FIG. 27C, the container 309 has been moved by the container piston 342 from the rotary gassing station 330 and to the rotary seaming station 340, where it is seamed to seal the fluid and gas inside the container. In FIG. 27D, the container 309 has moved to an exit location of the rotary seaming station 340, where it contacts a guide star wheel 352 of the discharge path 350. In FIG. 27E, the container 309 has started moving on the discharge path 350, and in FIG. 27F, the container 309 is moving down the discharge path 350 to the next operation, such as cleaning or packaging.

Figure 28A:
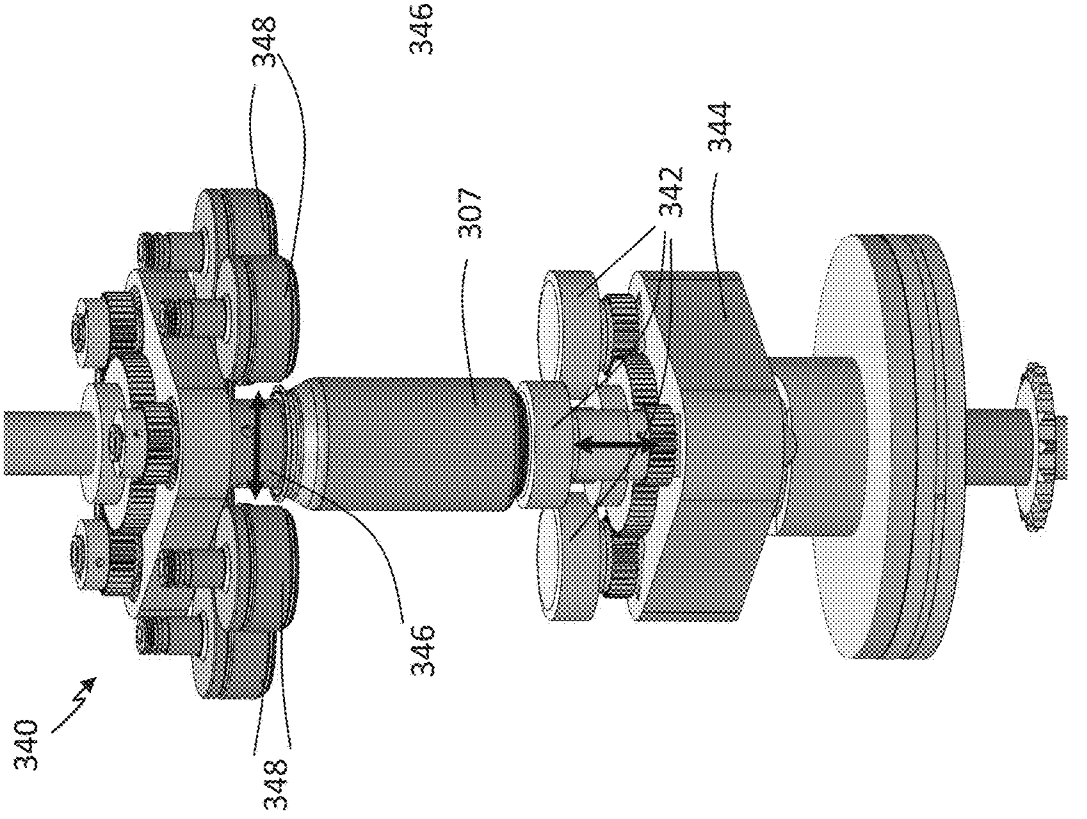
FIGS. 28A-28B are plan view illustrations of the rotary seaming station of the apparatus for closing fluid containers, in accordance with the third exemplary embodiment of the present disclosure.
Figure 28B:
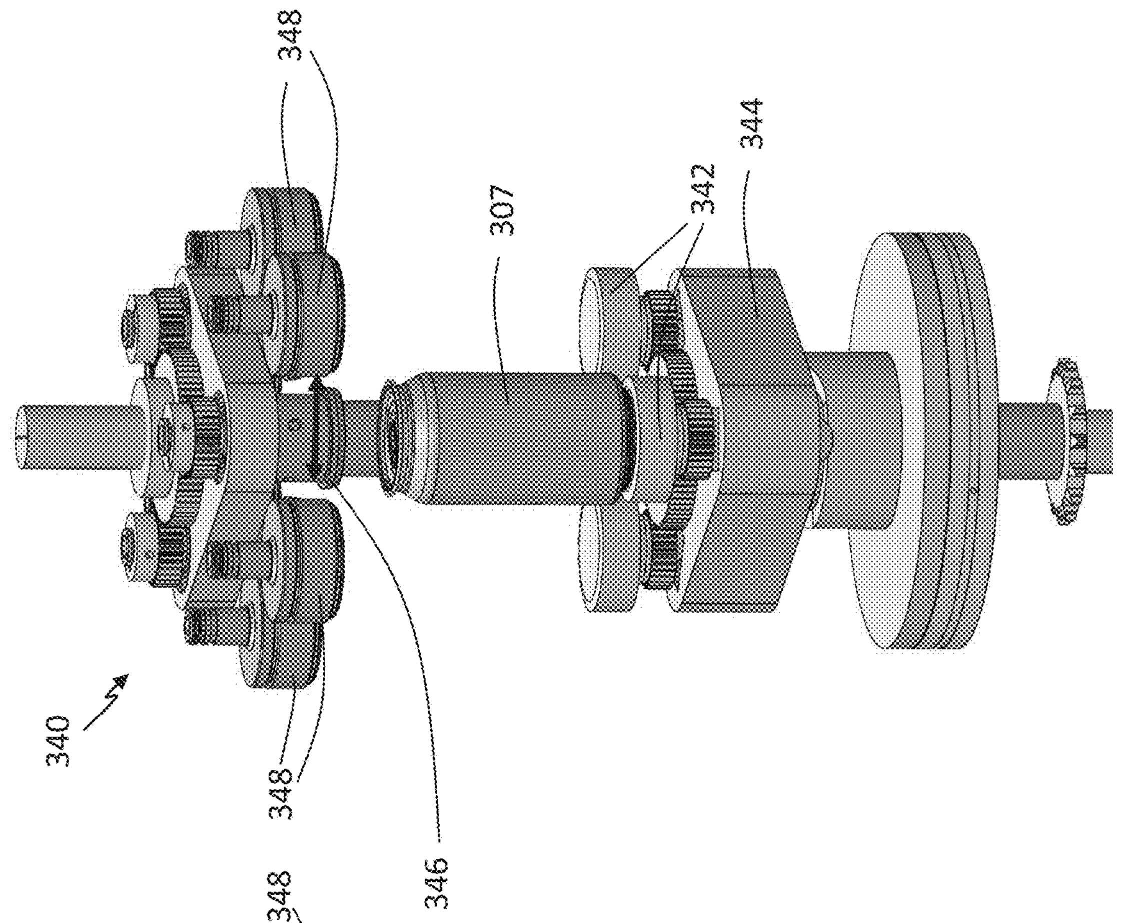

FIGS. 28A-28B are plan view illustrations of the rotary seaming station of the apparatus for closing fluid containers 300, in accordance with the third exemplary embodiment of the present disclosure. In particular, FIGS. 28A-28B illustrate the container pistons 342 being capable of moving in a vertical direction, such that the container 307 can be positioned to contact the seaming chuck 346 and the seaming wheels 348 of the rotary seaming station 340. As shown, in FIG. 28A the container 307 on the container piston 342 moves vertically upwards to position the top of the container 307 proximate to the seaming chuck 346 and seaming wheels 348. In this position, the seaming wheels 348 may move inwards towards each other to contact the container 307 and seam the lid to the container 307 sidewall. When the operation is complete, the seaming wheels 348 may move apart, as shown in FIG. 28B, and the container piston 342 moves vertically downwards towards the carriage 344. The container 307 may then be offloaded from the rotary seaming station 340 to the discharge path.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An apparatus for closing fluid containers, the apparatus comprising:

a rotary gassing station, wherein in the rotary gassing station, at least one container containing a quantity of fluid within an interior space thereof receives a quantity of gas in the interior space;

a rotary seaming station positioned proximate to the rotary gassing station, wherein in the rotary seaming station, a lid is seamed to an opening of the at least one container to seal the quantity of fluid and the quantity of gas in the interior space; and at least one container piston of the rotary seaming station movable around a center axis of the rotary seaming station, the at least one container piston holding the at least one container between a first radial position when the at least one container is within the rotary gassing station to at least a second radial position when the lid is seamed to the opening of the at least one container.

2. The apparatus of claim 1, wherein the rotary gassing station further comprises a star wheel with a plurality of container receiving areas, wherein in the first radial position, the at least one container is positioned within one of the plurality of container receiving areas.

3. The apparatus of claim 2, wherein the star wheel of the rotary gassing station further comprises upper and lower star wheels, each with the plurality of container receiving areas, wherein the at least one container is in contact with at least one of the plurality of container receiving areas of the upper and lower star wheels while it is positioned in contact with the at least one container piston of the rotary seaming station.

4. The apparatus of claim 1, wherein the at least one container piston further comprises a container lift piston, wherein the container lift piston raises and lowers in a vertical direction.

5. The apparatus of claim 1, wherein the rotary seaming station further comprises a seaming chuck and at least one seaming wheel removably in contact with the at least one container when the lid is seamed to the opening of the at least one container.

6. The apparatus of claim 5, wherein the rotary seaming station further comprises at least three container pistons and at least six seaming wheels, wherein the at least one container contacts at least two of the at least six seaming wheels and the seaming chuck simultaneously when the lid is seamed to the opening of the at least one container.

7. The apparatus of claim 1, wherein a pitch diameter of the rotary gassing station coincides with a pitch diameter of the rotary seaming station.

8. An apparatus for closing fluid containers, the apparatus comprising:

a container infeed;

a filling station receiving at least one container from the container infeed, wherein in the filling station, the at least one container is at least partially filled with a quantity of fluid in an interior space of the at least one container;

a rotary gassing station receiving the at least one container from the filling station, wherein in the rotary gassing station, the at least one container containing the quantity of fluid within the interior space thereof receives a quantity of gas in the interior space;

a rotary seaming station positioned proximate to the rotary gassing station, wherein in the rotary seaming station, a lid is seamed to an opening of the at least one container to seal the quantity of fluid and the quantity of gas in the interior space; and at least one container piston of the rotary seaming station movable fully around a center axis of the rotary seaming station, the at least one container piston holding the at least one container between at least first radial position when the at least one container is within the rotary gassing station to at least a second radial position when the lid is seamed to the opening of the at least one container.

9. The apparatus of claim 8, wherein the rotary gassing station further comprises a star wheel with a plurality of container receiving areas, wherein in the first radial position, the at least one container is positioned within one of the plurality of container receiving areas.

10. The apparatus of claim 9, wherein the star wheel of the rotary gassing station further comprises upper and lower star wheels, each with the plurality of container receiving areas, wherein the at least one container is in contact with at least one of the plurality of container receiving areas of the upper and lower star wheels while it is positioned in contact with the at least one container piston of the rotary seaming station.

11. The apparatus of claim 8, wherein the at least one container piston further comprises a container lift piston, wherein the container lift piston raises and lowers in a vertical direction.

12. The apparatus of claim 8, wherein the rotary seaming station further comprises a seaming chuck and at least one seaming wheel removably in contact with the at least one container when the lid is seamed to the opening of the at least one container.

13. The apparatus of claim 12, wherein the rotary seaming station further comprises at least three container pistons and at least six seaming wheels, wherein the at least one container contacts at least two of the at least six seaming wheels and the seaming chuck simultaneously when the lid is seamed to the opening of the at least one container.

14. The apparatus of claim 8, wherein a pitch diameter of the rotary gassing station coincides with a pitch diameter of the rotary seaming station.

15. An apparatus for closing fluid containers, the apparatus comprising:

a rotary seaming station; and at least one container lift piston in the rotary seaming station, wherein the at least one container lift piston holds at least one container at and between a first radial position when the at least one container is within a rotary gassing station to at least a second radial position when a lid is seamed to an opening of the at least one container in the rotary seaming station.

16. The apparatus of claim 15, wherein the rotary gassing station further comprises a star wheel with a plurality of container receiving areas, wherein in the first radial position, the at least one container is positioned within one of the plurality of container receiving areas.

17. The apparatus of claim 16, wherein the star wheel of the rotary gassing station further comprises upper and lower star wheels, each with the plurality of container receiving areas, wherein the at least one container is in contact with at least one of the plurality of container receiving areas of the upper and lower star wheels while it is positioned in contact with the at least one container piston of the rotary seaming station.

18. The apparatus of claim 15, wherein the at least one container lift piston raises and lowers in a vertical direction to move the at least one container vertically.

19. The apparatus of claim 15, wherein the rotary seaming station further comprises a seaming chuck and at least one seaming wheel removably in contact with the at least one container when the lid is seamed to the opening of the at least one container.

20. The apparatus of claim 15, wherein a pitch diameter of the rotary gassing station coincides with a pitch diameter of the rotary seaming station.

* * * * *